US011928867B2

(12) United States Patent
Abeloe

(10) Patent No.: US 11,928,867 B2
(45) Date of Patent: *Mar. 12, 2024

(54) GROUP OF NEURAL NETWORKS ENSURING INTEGRITY

(71) Applicant: Apex AI Industries, LLC, Centreville, VA (US)

(72) Inventor: Kenneth Austin Abeloe, Carlsbad, CA (US)

(73) Assignee: APEX AI INDUSTRIES, LLC, Centreville, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/805,730

(22) Filed: Jun. 7, 2022

(65) Prior Publication Data

US 2023/0019834 A1    Jan. 19, 2023

Related U.S. Application Data

(63) Continuation of application No. 17/456,038, filed on Nov. 22, 2021, now Pat. No. 11,367,290, which is a
(Continued)

(51) Int. Cl.
*G06N 3/045* (2023.01)
*G06F 9/445* (2018.01)
(Continued)

(52) U.S. Cl.
CPC .......... *G06V 20/58* (2022.01); *G06F 9/44536* (2013.01); *G06F 18/2193* (2023.01); *G06N 3/045* (2023.01)

(58) Field of Classification Search
CPC .................................................. G06V 20/58
See application file for complete search history.

(56) References Cited

U.S. PATENT DOCUMENTS 5,048,100 A    9/1991    Kuperstein
5,179,631 A    1/1993    Guddanti et al.
(Continued)

FOREIGN PATENT DOCUMENTS

CN    101763033    6/2010
CN    102522945    6/2012
(Continued)

OTHER PUBLICATIONS

Hugo et al. "Evaluation of multilayer perceptron and self-organizing map neural network topologies applied on microstructure segmentation from metallographic images", NDT&E, 2009, pp. 644-651.*
(Continued)

*Primary Examiner* — Li Wu Chang
(74) *Attorney, Agent, or Firm* — KNOBBE, MARTENS, OLSON & BEAR LLP

(57) ABSTRACT

Methods and systems for controlling an autonomous machine. The autonomous machine has sensors generating input data, while the controller includes two or more neural networks that inference using the input data and generate output data. The neural networks can be trained using an identical set of training data set. The output data from each of the neural networks are monitored to ensure that the integrity of the operation is maintained by, for example, the output data from one neural network is compared with the output data from another neural network to verify the consistency. If the comparison yields that the integrity of the system is not maintained at an acceptable level, the controller can stop using the output in controlling the autonomous machine.

20 Claims, 19 Drawing Sheets

Related U.S. Application Data continuation-in-part of application No. 17/074,464, filed on Oct. 19, 2020, which is a continuation-in-part of application No. 16/907,999, filed on Jun. 22, 2020, now Pat. No. 10,956,807, which is a continuation-in-part of application No. 16/848,683, filed on Apr. 14, 2020, now Pat. No. 11,366,434, which is a continuation-in-part of application No. 16/734,074, filed on Jan. 3, 2020, now Pat. No. 10,691,133.

(60) Provisional application No. 62/940,762, filed on Nov. 26, 2019.

(51) Int. Cl.
*G06F 18/21* (2023.01)
*G06V 20/58* (2022.01)

(56) References Cited

U.S. PATENT DOCUMENTS

| | | | |
|---|---|---|---|
| 5,255,347 | A | 10/1993 | Matsuba et al. |
| 5,371,809 | A | 12/1994 | Desieno |
| 5,668,926 | A | 9/1997 | Karaali |
| 5,845,271 | A | 12/1998 | Thaler |
| 5,870,729 | A | 2/1999 | Yoda |
| 6,574,754 | B1 | 6/2003 | Smith |
| 6,601,051 | B1 | 7/2003 | Lo et al. |
| 7,010,513 | B2 | 3/2006 | Tamura |
| 7,063,476 | B1 | 6/2006 | Mims |
| 7,800,490 | B2 | 9/2010 | Allen et al. |
| 7,979,173 | B2 | 7/2011 | Breed |
| 8,677,071 | B2 | 3/2014 | Gibson et al. |
| 8,761,991 | B1 | 6/2014 | Ferguson et al. |
| 8,775,341 | B1 | 7/2014 | Commons |
| 8,782,653 | B2 | 7/2014 | Gibson et al. |
| 8,892,485 | B2 | 11/2014 | Aparin et al. |
| 9,025,140 | B2 | 5/2015 | Zhu et al. |
| 9,460,382 | B2 | 10/2016 | Canoy et al. |
| 9,875,440 | B1 | 1/2018 | Commons |
| 10,200,875 | B2 | 2/2019 | O'Shea |
| 10,284,432 | B1 | 5/2019 | Kuo et al. |
| 10,347,127 | B2 | 9/2019 | Droz et al. |
| 10,429,486 | B1 | 10/2019 | O'Shea et al. |
| 10,444,754 | B2 | 10/2019 | Fairfield et al. |
| 10,451,712 | B1 | 10/2019 | Madhow et al. |
| 10,531,415 | B2 | 1/2020 | O'Shea et al. |
| 10,581,469 | B1 | 3/2020 | O'Shea et al. |
| 10,872,433 | B2 | 12/2020 | Stein et al. |
| 11,080,809 | B2 | 8/2021 | Baluja |
| 2003/0217021 | A1 | 11/2003 | Jacobson |
| 2009/0276385 | A1 | 11/2009 | Hill |
| 2010/0194593 | A1 | 8/2010 | Mays |
| 2012/0259804 | A1 | 10/2012 | Brezzo et al. |
| 2013/0073497 | A1 | 3/2013 | Akopyan et al. |
| 2013/0141233 | A1 | 6/2013 | Jacobs et al. |
| 2013/0231824 | A1 | 9/2013 | Wilson et al. |
| 2013/0325776 | A1 | 12/2013 | Ponulak et al. |
| 2014/0156568 | A1 | 6/2014 | Ganguly et al. |
| 2015/0042491 | A1 | 2/2015 | Burnison et al. |
| 2017/0308800 | A1 | 10/2017 | Chichon et al. |
| 2018/0025268 | A1 | 1/2018 | Teig et al. |
| 2018/0246853 | A1 | 8/2018 | Fowers et al. |
| 2018/0259345 | A1 | 9/2018 | Wang et al. |
| 2018/0268291 | A1 | 9/2018 | Turner et al. |
| 2018/0300556 | A1 | 10/2018 | Varerkar et al. |
| 2018/0307950 | A1 | 10/2018 | Nealis et al. |
| 2018/0322365 | A1 | 11/2018 | Rohekar |
| 2018/0322382 | A1 | 11/2018 | Mellempudi et al. |
| 2019/0035125 | A1 | 1/2019 | Bellows et al. |
| 2019/0065951 | A1 | 2/2019 | Luo et al. |
| 2019/0087726 | A1 | 3/2019 | Greenblatt et al. |
| 2019/0138829 | A1 | 5/2019 | Gurghian et al. |
| 2019/0147298 | A1 | 5/2019 | Rabinovich et al. |
| 2019/0156180 | A1 | 5/2019 | Nomura et al. |
| 2019/0176841 | A1 | 6/2019 | Englard et al. |
| 2019/0311597 | A1 | 10/2019 | Sohn et al. |
| 2019/0347567 | A1 | 11/2019 | Njie et al. |
| 2019/0392268 | A1 | 12/2019 | Tariq et al. |
| 2020/0033868 | A1 | 1/2020 | Palanisamy et al. |
| 2020/0043197 | A1 | 2/2020 | Bazin et al. |
| 2020/0241834 | A1 | 7/2020 | Boeen et al. |

FOREIGN PATENT DOCUMENTS

| | | | | |
|---|---|---|---|---|
| CN | 107272705 | | 10/2017 | |
| CN | 113306554 A | * | 8/2021 | ............ B60W 10/18 |

OTHER PUBLICATIONS

"The Internet of Things: Opportunities and Applications across Industries—Discussion Summary" International Institute for Analytics, 8 pages (Dec. 2015).
Bengio et al., "Greedy Layer-Wise Training of Deep Networks," University of Montreal, 8 pages.
Broomhead et al., "Radial Basis Functions, Multi-Variable Functional Interpolation and Adaptive Networks," Royal Signals & Radar Establishment, RSRE Memorandum No. 4148, 39 pages (Mar. 28, 1988).
Chang et al., "CLKN: Cascaded Lucas-Kanade Networks for Image Alignment," 9 pages (2017).
Chang et al., Interchangeable Hebbian and Anti-Hebbian STDP Applied to Supervised Learning in Spiking Neural Network, 2018 IEEE International Electron Devices Meeting (IEDM), pp. 15.5.1-15.5.4, Dec. 2018.
Chen et al., "Big Data Deep Learning: Challenges and Perspectives," IEEE Access, vol. 2, pp. 514-525 (2014).
Chen et al., "DeepDriving: Learning Affordance for Direct Perception in Autonomous Driving," Princeton University paper, 9 pages.
Chung et al., "Empirical Evaluation of Gated Recurrent Neural Networks on Sequence Modeling," University of Montreal, arXiv:1412.3555v1, 9 pages (Dec. 11, 2014).
Cortes et al., "Support-Vector Networks," Machine Learning, 20, pp. 273-297 (1995).
Dai et al., "Dynamic Learning from Adaptive Neural Network Control of a Class of Nonaffine Nonlinear Systems," IEEE Transactions on Neural Networks and Learning Systems, vol. 25, No. 1 (Jan. 2014).
Desai et al., "A Survey of Image Registration Techniques Using Neural Networks", Int'l Journal of Computer Sciences & Engineering, vol. 3(12), pp. 57-60 (Dec. 2015).
Dixit et al., "Autonomous Vehicles: Disengagements, Accidents and Reaction Times," Plos One, 15 pages (Dec. 20, 2016).
Durrant-Whyte et al., "Simultaneous Localization and Mapping: Part I," IEEE Robotics & Automation Magazine, 10 pages (Jun. 2006).
Durrant-Whyte et al., "Simultaneous Localization and Mapping: Part II," IEEE Robotics & Automation Magazine, 10 pages (Sep. 2006).
Elman, J.L., "Finding Structure in Time," Cognitive Science 14, pp. 179-211 (1990).
Eykholt et al., "Robust Physical-World Attacks on Deep Learning Visual Classification," arXiv:1707.08945v5, 11 pages (Apr. 10, 2018).
Fischer et al. "Descriptor Matching with Convolution Neural Networks: a Comparison to SIFT," arXiv:1405.5769v1, 10 pages (May 22, 2014).
Florian, R.V., "Reinforcement learning through modulation of spike-timing-dependent synaptic plasticity," Center for Cognitive and Neural Studies, Romania, 36 pages.
Freuder E.C., "Explaining Ourselves: Human-Aware Constraint Reasoning," Proceedings of the 31st AAAI Conference on Artificial Intelligence (AAAI-17), pp. 4858-4862 (2017).
Gao et al., "Unsupervised learning to detect loops using deep neural networks for visual SLAM system," Auton Robot 41, pp. 1-18 (2017).
Goodfellow et al., "Explaining and Harnessing Adversarial Examples," published as a conference paper at ICLR 2015, ArXiv:1412.6572v3, 11 pages (Mar. 20, 2015).

(56) References Cited

OTHER PUBLICATIONS

Goodfellow et al., "Generative Adversarial Nets," University of Montreal, arXiv:1406.2661v1, 9 pages (Jun. 10, 2014).
Graves et al., "Neural Turing Machines," Google DeepMind, London, United Kingdom, arXiv:1410.5401v2, 26 pages (Dec. 10, 2014).
Han et al., "A structure optimisation algorithm for feedforward neural network construction," Neurocomputing, 99, pp. 347-357 (2013).
He et al., "Deep Residual Learning for Image Recognition," arXiv:1512.03385v1, 12 pages (Dec. 10, 2015).
Hinton et al., "Learning and Relearning in Boltzmann Machines," Chapter 7, Basic Mechanics, pp. 282-317.
Hopfield, J.J., "Neural Networks and Physical Systems with Emergent Collective Computational Abilities," PNAS vol. 79, pp. 2554-2558 (Apr. 1982).
Huval et al., "An Empirical Evaluation of Deep Learning on Highway Driving," arXiv:154:01716v3, 7 pages (Apr. 17, 2015).
Jaeger et al., "Harnessing Nonlinearity: Predicting Chaotic Systems and Saving Energy in Wireless Communication," Science 304, 78, 4 pages (2004).
Kim, G.K., "Deep Learning," book review, Healthcare Informatics Research, 2016 The Korean Society of Medical Informatics, vol. 22, No. 4. pp. 351-354 (2016).
Kingma et al., "Auto-Encoding Variational Bayes," arXiv:1312.6114v10, 14 pages (May 1, 2014).
Kohonen, T., "Essentials of the self-organizing map," Neural Networks 37, pp. 52-65 (2013).
Kohonen, T., "Self-Organized Formation of Topologically Correct Feature Maps," Biol. Cybern. 43, pp. 59-69 (1982).
Kulkarni et al., "Deep Convolutional Inverse Graphics Network," arXiv:1503.03167v4, 10 pages (Jun. 22, 2015).
LeCun et al., "Deep Learning—Review" Nature, vol. 521, pp. 436-444 (May 28, 2015).
LeCun et al., "Gradient-Based Learning Applied to Document Recognition," Proc. Of the IEEE, pp. 1-46 (Nov. 1998).
Libelium Smart World, 1 page, downloaded Jun. 2, 2018, www.libelium.com.
Ma et al., "Multimodal Convolutional Neural Networks for Matching Image and Sentence," ICCV paper, pp. 2623-2631 (2015).
Maass et al., "Real-Tim Computing Without Stable States: A New Framework for Neural Computation Based on Perturbations," Neural Computation 14, pp. 2531-2560 (2002).
Mehri et al., "SampleRNN: An Unconditional End-to-End Neural Audio Generation Model," published as a conference paper at ICLR 2017, arXiv:1612.07837v2, 11 pages (Feb. 11, 2017).
Nasr et al., "Neural network control of nonlinear dynamic systems using hybrid algorithm—Review article", Applied Soft Computing 24, pp. 423-431 (2014).
Oh et al., "A design of granular-oriented self-organizing hybrid fuzzy polynomial neural networks," Neurocomputing, 119, pp. 292-307 (2013).

Pecevski et al., "Probabilistic Inference in General Graphical Models through Sampling in Stochastic Networks of Spiking Neurons," PloS Computational Biology, vol. 7, Issue 12, 1-25 (Dec. 2011).
Rahman et al., "Emerging Technologies with Disruptive Effects: A Review," Perintis eJournal, vol. 7, No. 2, pp. 111-128 (2017).
Ranzato et al., "Efficient Learning of Sparse Representations with an Energy-Based Model," Courant Institute of Mathematical Sciences, New York University, 8 pages.
Rosenblatt, F., "The Perceptron: A Probabilistic Model for Information Storage and Organization in the Brain," Psychological Review, vol. 65, No. 6, pp. 386-408 (1958).
Schuster et al., "Bidirectional Recurrent Neural Networks," IEEE Transactions on Signal Processing, vol. 45, No. 11, pp. 2673-2681 (Nov. 1997).
Seff et al., "Learning from Maps: Visual Common Sense for Autonomous Driving," arXiv:1611.08583v1, 7 pages (Nov. 25, 2016).
Smolensky, P., "Information Processing in Dynamical Systems: Foundations of Harmony Theory," University of Colorado at Boulder, Department of Computer Science, 56 pages (Feb. 1986).
Svetlov et al., "A New Implementation of the Algorithm of Adaptive Construction of Hierarchical Neural Network Classifiers," Optical Memory and Neural Networks (Information Optics), vol. 24, No. 4, pp. 288-294 (2015).
Svetlov et al., "Development of the Algorithm of Adaptive Construction of Hierarchical Neural Network Classifiers," Optical Memory and Neural Networks (Information Optics), vol. 26, No. 1, pp. 40-46 (2017).
Szegedy et al., "Intriguing properties of neural networks," arXiv:1312.6199v4, 10 pages (Feb. 19, 2014).
Wang, Y., "Deep Learning in Real Time—Inference Acceleration and Continuous Training," 17 pages, downloaded Dec. 28, 2017, https://medium.com/@Synced/deep-learning-in-real-time-inference-acceleration-and-cont . . . .
Zeiler et al., "Deconvolutional Networks," Dept. of Computer Science, Courant Institute, New York University, 8 pages.
Zhou et al., "VoselNet: End-to-End Learning for Point Cloud Based 3D Object Detection," arXiv:1711.06396v1, 10 pages (Nov. 17, 2017).
NDP100 Neural Decision Processor Syntiant.
O'Shea et al. "An Introduction to Deep Learning for the Physical Layerr", Deep Learning Basics, pp. 1-13.
Shafin et al., "Artificial Intelligence-Enabled Cellular Networks: A Critical Path to Beyond-5G and 6G".
Rappaport et al., "Wireless Communication and Applications Above 100 GHz: Opportunities and Challenges for 6G and Beyond", Powerpoint presentation, NYU Wireless.
Shafin et al., "Self-Tuning Sectorization: Deep Reinforcement Learning Meets Broadcast Beam Optimization".
Hilburn et al., "DeepSig: Deep Learning for Wireless Communications", Received from https://developer.nvidia.com/blog/deepsig-deep-learning-wireless-communications/.
An et al., "A novel rear-end collision warning system using neural network ensemble", IEEE IVS, 2016, pp. 1265-1270.

* cited by examiner

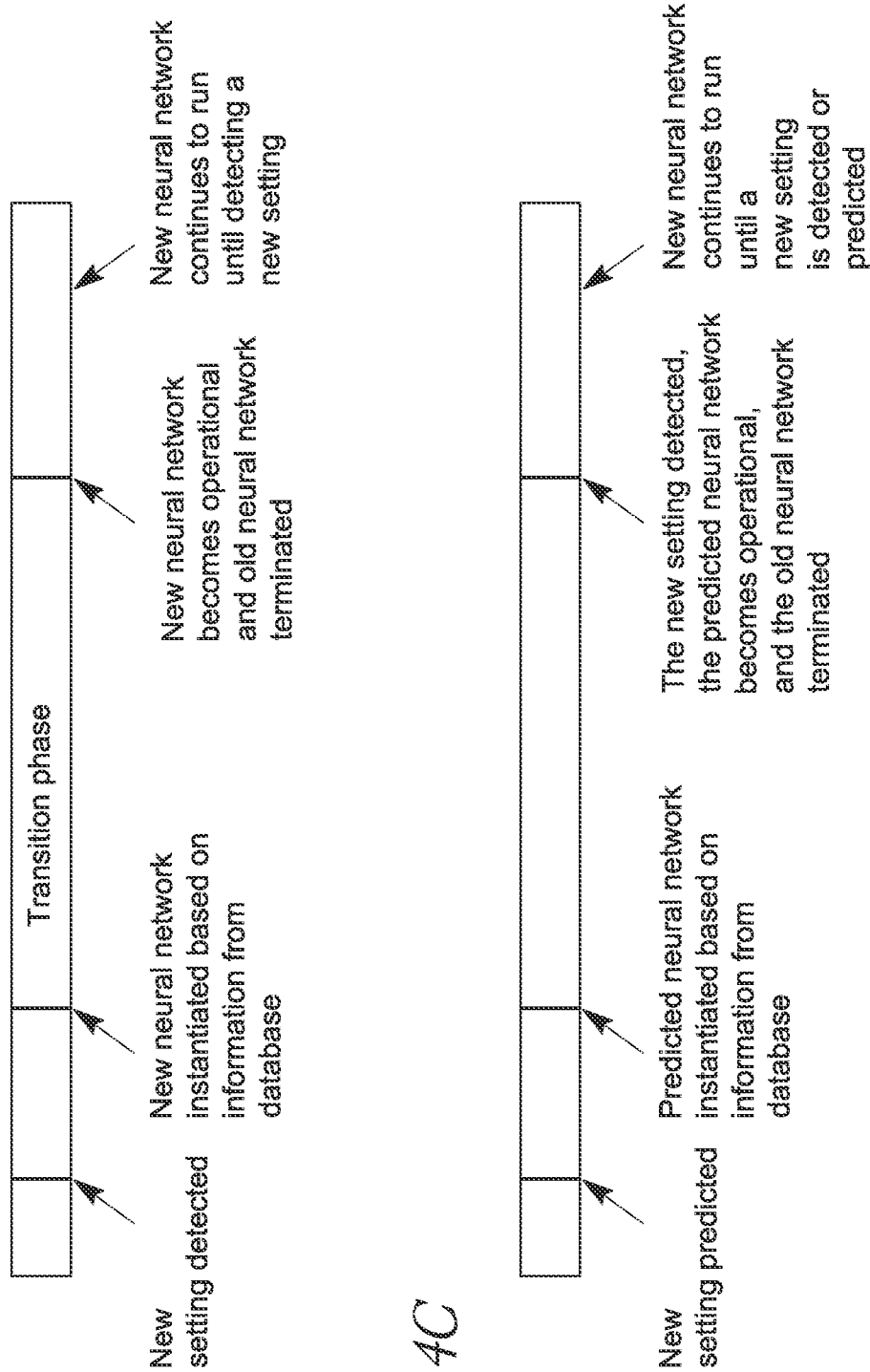

GROUP OF NEURAL NETWORKS ENSURING INTEGRITY

INCORPORATION BY REFERENCE TO ANY PRIORITY APPLICATIONS

This application is a continuation of U.S. application Ser. No. 17/456,038, filed Nov. 22, 2021 (U.S. Pat. No. 11,367,290), which is a continuation-in-part of U.S. application Ser. No. 17/074,464, filed on Oct. 19, 2020, which is a continuation-in-part of U.S. application Ser. No. 16/907,999, filed on Jun. 22, 2020 (U.S. Pat. No. 10,956,807), which is a continuation-in-part U.S. application Ser. No. 16/848,683, filed on Apr. 14, 2020 (U.S. Pat. No. 11,366,434), which is a continuation-in-part of U.S. application Ser. No. 16/734,074, filed on Jan. 3, 2020 (U.S. Pat. No. 10,691,133), which claims the benefit of U.S. Provisional Application No. 62/940,762, filed on Nov. 26, 2019. The entire disclosure of each of the above-identified applications is incorporated by reference herein.

Any and all applications for which a foreign or domestic priority claim is identified in the Application Data Sheet as filed with the present application are hereby incorporated by reference under 37 CFR 1.57.

BACKGROUND OF THE INVENTION

Technical Field

This invention relates to self-adapting/self-adjusting neural network system. Observing a different environment/condition/situation under which the neural network system finds itself operating from a previously observed environment/condition/situation, the system automatically reconfigures one or more neural networks—reconfiguring may include using a different set of coefficients for a neural network running within the neural network system.

Description of the Related Art

As illustrated in FIG. 1, a conventional Neural Network (NN) 101 receives an input (a single vector, in this example) at an input layer 102, and transforms it through a series of one or more hidden layers 103. Each hidden layer includes a set of "neurons" or "nodes," where each neuron is connected to all neurons in the previous layer (e.g., the input layer or another hidden layer), and where neurons in a single layer function completely independently and do not share any connections. The last fully-connected layer is called the "output layer" 105, where each of the neurons in the output layer can provide a portion of the output information (or signal), and in classification applications the output layer information (or setting(s)) represents the class scores (e.g., the score of the input(s) being classified). Based on the class scores, an output of the neural network can be determined as the class having the highest score. In other neural networks, the output may consist of an indication of the class having the highest score as the one selected and a confidence level of the selected class for given input data being the correct one based on the relative scores with other classes. This confidence level is referred to as an output confidence level, herein.

As illustrated in FIG. 2, a "convolutional" Neural Network 201 can take 3D images as input, for instance. In particular, unlike the neural network described in connection with FIG. 1, the layers of a convolutional neural network have neurons arranged in 3 dimensions: width, height, depth. Note that the word depth here refers to the third dimension of an activation volume, not to the depth of a full neural network, which can refer to the total number of layers in a network. The neurons in a layer can be configured to be connected to a small region of the layer before it, instead of all of the neurons in a fully-connected manner. The convolutional neural network reduces the full image into a single vector of class scores 203, arranged along the depth dimension.

Neural networks have been employed to operate in complex and widely varying settings (e.g., different environments, conditions, situations, and/or etc.). As such, ever increasing quantities of train data sets have been used to train prior art neural networks to operate in as many different settings as possible. When the size of training data set is increased to include training data samples from many different settings, a prior art neural network can begin to lose its accuracy and can encounter a catastrophic memory loss, which causes the neural network to cease to operate as it was originally designed and trained for.

SUMMARY OF THE INVENTION

Various aspects of the present invention includes inventive features and embodiments to allow neural network systems of the present invention to maintain or increase operational accuracy in controlling a machine while being able to operate in various, different settings. In particular, a set of training data is collected over each of at least two different settings (e.g., a setting can be an environment, a condition, a situation, or the like in/under which a machine is to operate). Each setting can have its own characteristics. In some embodiments, these characteristics can be defined using a set of ranges of values. Examples of types of characteristics for the settings can be time, geographical location, and/or weather condition, etc. Using the training data set, a neural network having a particular structure can be trained for a given setting, which results in a set of coefficients for the particular neural network. For each setting, the characteristics for the setting are associated with the corresponding coefficients and/or the corresponding neural network structure trained with the training data set collected in/under the setting. Information relating to the characteristics, coefficients, and neural network structures for various settings can be stored in a database management system.

Operating in/under a setting, a neural network that has the coefficients and neural network structure associated with a set of characteristics corresponding to the setting, the neural network would yield optimal results for which it is designed/trained. In operation, various characteristics of the setting are monitored since the machine can move into or the environment/condition/situation may change to a new setting. That is, the setting may change from one setting to a new setting—the neural network coefficients and/or neural network structure (or the neural network executable module having the structure and/or the coefficients) associated with the new setting can be retrieved from a database management system. A new neural network can then be instantiated with those coefficients and may become operational, while the old neural network becomes inactive (e.g., becomes non-operational or terminated). In other words, various embodiments of the present invention allow adaptively changing the neural network(s) based on changing settings (e.g., changes in environment, condition and/or situation).

First variations of methods of controlling a machine include a process (or steps of), without requiring a particular order or sequence, storing at least two sets of neural network coefficients, each being different from the others with one or more characteristics of a setting, associating each of the at least two sets of neural network coefficients with at least one set of one or more ranges of values, receiving first data from one or more input devices of the machine, selecting one from the at least two sets of neural network coefficients based on the first data and the at least one set of one or more ranges of values. The methods of the various embodiments may also include the steps of instantiating a neural network with the selected one from the at least two sets of neural network coefficients, and controlling an aspect of the machine using an output from the instantiated neural network. As indicated above, the use of "step" herein when referring to a portion of a process does not itself indicate any particular sequence or order of the process portions, unless otherwise indicated explicitly or as required by the context of the described process.

First variations of methods of controlling a machine may also include, without requiring a particular order or sequence, the steps of associating a plurality among the at least two sets of neural network coefficients with a second set of one or more ranges of values, and/or storing information relating to a neural network structure associated each of the at least two sets of neural network coefficients. The methods may further include the step of selecting one from the at least two sets of neural network further comprises the step of matching the first data with one of the at least one set of one or more ranges of values. The matching step can further comprises the steps of comparing the first data with the at least one set of one or more ranges of values; and identifying the selected one of the at least one set among one or more ranges of values that has the first data fall within its ranges of values, wherein the neural network coefficients matched with the selected one are generated by using training data set collected within the corresponding particular setting.

Second variations of methods of controlling a machine may include the steps of, without requiring a particular order or sequence, storing at least two sets of neural network coefficients, each being different from the others with one or more characteristics of a setting, associating each of the at least two sets of neural network coefficients with one or more characteristics of a setting, receiving first data from one or more input devices of the machine, selecting one from the at least two sets of neural network coefficients based on the first data and the one or more characteristics of settings, instantiating a neural network with the selected one from the at least two sets of neural network coefficients, and controlling an aspect of the machine using an output from the instantiated neural network. Wherein, each of the one or more characteristics of settings is defined with a range of values.

Second variations of methods of controlling a machine may also include the steps of, without requiring a particular order or sequence, storing information relating to a neural network structure associated each of the at least two sets of neural network coefficients. The step of selecting one from the at least two sets of neural network coefficients further comprises the step of matching the first data with the one or more characteristics of settings, which may further include the steps of comparing the first data with the one or more characteristics of settings, wherein each of the one or more characteristics of settings is defined with a range of values, and identifying the selected one of the one or more characteristics of settings that the first data fall within the ranges of values.

Various embodiments of methods of controlling a machine may further include, without requiring a particular order or sequence, the steps of storing a set of one or more input range values associated each of the at least two sets of neural network coefficients, comparing the first data with the one or more input range values associated with the selected one from the at least two sets of neural network coefficients, and selecting a new set among the at least two sets of neural network coefficients if the first data is outside the input range values. In other variation, the methods may include the steps of storing a set of one or more output range values associated each of the at least two sets of neural network coefficients, comparing the output with the one or more output range values associated with the selected one from the at least two sets of neural network coefficients, and selecting a new set among the at least two sets of neural network coefficients if the output is outside the output range values.

First variations of apparatuses of controlling a machine may include a database management system stored with at least two sets of neural network coefficients being different from each other, at least one set of one or more ranges of values with one or more characteristics of a setting, and each of the at least two sets of neural network coefficients being associated with at least one set of one or more ranges of values; and means for controlling coupled to receive first data from one or more input devices of the machine, wherein the means for controlling includes means for selecting one from the at least two sets of neural network coefficients based on the first data and the at least one set of one or more ranges of values, and means for instantiating a neural network with the selected one from the at least two sets of neural network coefficients, wherein the neural network is configured to generate an output being used to control an aspect of the machine.

Second variations of apparatuses of controlling a machine may include a database management system stored with at least two sets of neural network coefficients being different from each other with one or more characteristics of a setting, at least one set of one or more ranges of values, and each of the at least two sets of neural network coefficients being associated with at least one set of one or more ranges of values, and a controlling device that is coupled to receive first data from one or more input devices of the machine, arranged to select one from the at least two sets of neural network coefficients based on the first data and the at least one set of one or more ranges of values, and arranged to instantiate a neural network with the selected one from the at least two sets of neural network coefficients, wherein the neural network is configured to generate an output being used to control an aspect of the machine.

In the first and second variations of apparatuses, the database management system may further store a plurality among the at least two sets of neural network coefficients associated with a second set of one or more ranges of values, and information relating to a neural network structure associated each of the at least two sets of neural network coefficients. In these embodiments, the database management system can be configured to match the first data with one of the at least one set of one or more ranges of values, to compare the first data with the at least one set of one or more ranges of values, and to identify the selected one of the at least one set among one or more ranges of values that has the first data fall within its ranges of values.

Third variations of apparatuses of controlling a machine may include a database management system stored with at least two sets of neural network coefficients being different from each other, at least one setting having one or more characteristics with one or more characteristics of a setting, and each of the at least two sets of neural network coefficients being associated with the at least one setting having one or more characteristics, and a controlling device that is coupled to receive first data from one or more input devices of the machine, arranged to select one from the at least two sets of neural network coefficients based on the first data and at one least one setting having one or more characteristics, and arranged to instantiate a neural network with the selected one from the at least two sets of neural network coefficients, wherein the neural network is configured to generate an output being used to control an aspect of the machine.

Fourth variations of apparatuses of controlling a machine may include a database management system stored with at least two sets of neural network coefficients being different from each other with one or more characteristics of a setting, at least one setting having one or more characteristics, and each of the at least two sets of neural network coefficients being associated with the at least one setting having one or more characteristics, and means for, coupled to receive first data from one or more input devices of the machine, selecting one from the at least two sets of neural network coefficients based on the first data and at one least one setting having one or more characteristics, and instantiating a neural network with the selected one from the at least two sets of neural network coefficients, wherein the neural network is configured to generate an output being used to control an aspect of the machine.

In the third and fourth variations of apparatuses, the database management system may further store each of at least one setting having one or more characteristics is defined with a range of values. The database management system also can be configured to match the first data with one of at least one setting having one or more characteristics, and may be further configured to compare the first data with the at least one setting having one or more characteristics defined with a range of values and to identify the selected one of the at least one set among one or more ranges of values that has the first data fall within its ranges of values.

In variations of apparatuses of controlling a machine, the database management system can further store a set of one or more input range values associated each of the at least two sets of neural network coefficients and the instantiated neural network with the selected one from the at least two sets of neural network coefficients, and the apparatuses can further include a first trigger event detector arranged to compare the first data with the one or more input range values associated with the selected one from the at least two sets of neural network coefficients and to send a signal to the controlling device to select a new set among the at least two sets of neural network coefficients if the first data is outside the input range values. The database management system can also store a set of one or more output range values associated each of the at least two sets of neural network coefficients and the instantiated neural network with the selected one from the at least two sets of neural network coefficients, and further includes a second trigger event detector arranged to compare the output with the one or more output range values associated with the selected one from the at least two sets of neural network coefficients and to send a signal to the controlling device to select a new set among the at least two sets of neural network coefficients if the output is outside the output range values.

Another innovation includes a method of controlling a machine using predictive information, the method comprising storing at least two sets of neural network coefficients, each being different from the other, receiving first data from one or more input devices of the machine; selecting one from the at least two sets of neural network coefficients based on the first data and the predictive information, instantiating a neural network with the selected one from the at least two sets of neural network coefficients, conducting nodal operations at nodes of the instantiated neural network, and controlling an aspect of the machine using an output from the instantiated neural network. Such methods can include other features and aspects described herein and illustrated in the figures.

For example, in some embodiments the method further comprises associating each of the at least two sets of neural network coefficients with one or more characteristics of a setting, wherein the one or more characteristics relates to the predictive information of said setting. Each of the one or more characteristics of a setting may be defined with a range of values. The method may further comprise storing information relating to a neural network structure associated each of the at least two sets of neural network coefficients. In some embodiments, the neural network structure may be one of a convolutional neural network, a feed forward neural network, a neural Turing machine, Hopfield neural network, or a Boltzmann machine neural network. In some embodiments, the setting is one of a temperate urban region, a desert rural region, a forested mountain region, or a coastal city. In various embodiments, selecting one from the at least two sets of neural network coefficients further comprises matching the first data with the one or more characteristics of settings. In some embodiments, the matching further comprises comparing the first data with the one or more characteristics of settings, wherein each of the one or more characteristics of settings is defined with a range of values, and identifying the selected one of the one or more characteristics of settings that the first data fall within the range of values. In some embodiments, the neural network coefficients matched with the selected one are generated by using training data set collected within the corresponding particular setting. In some embodiments, the first data includes data from a Global Positioning System (GPS). In some embodiments, the information relating to the at least two sets of neural network coefficients is stored in a standardized format to allow access by electronic devices manufactured by different manufacturers.

Another innovation includes a machine controller using predictive information, the machine controller comprising a computer memory that stores at least two sets of neural network coefficients, each being different from the other, an input interface device that receives first data from one or more input devices of the machine, wherein the machine controller is implemented to select one from the at least two sets of neural network coefficients based on the first data and predictive information, and a neural network that is instantiated with the selected one from the at least two sets of neural network coefficients, wherein the neural network conducts nodal operations at nodes, wherein the machine controller controls an aspect of the machine using an output from the neural network. In some embodiments, the controller is implemented to associate each of the at least two sets of neural network coefficients with one or more characteristics of a setting, and wherein the one or more characteristics relates to the predictive information of said setting. In some embodiments, each of the one or more characteristics of a setting may be defined with a range of values. In some embodiments, the controller further comprises a second memory that stores information relating to a neural network structure associated each of the at least two sets of neural network coefficients. In some embodiments, the neural network structure may be one of a convolutional neural network, a feed forward neural network, a neural Turing machine, Hopfield neural network, or a Boltzmann machine neural network. In some embodiments, the setting may be one of a temperate urban region, a desert rural region, a forested mountain region, and a coastal city.

Another innovation includes a method of controlling a machine, the method comprising storing at least two sets of neural network coefficients, each being different from the other, receiving first data from one or more input devices of the machine, selecting one from the at least two sets of neural network coefficients based on the first data, instantiating a neural network with the selected one from the at least two sets of neural network coefficients, conducting nodal operations at nodes of the instantiated neural network, and controlling an aspect of the machine using an output from the instantiated neural network. In some embodiments, the method further comprises associating each of the at least two sets of neural network coefficients with one or more characteristics of a setting, wherein the one or more characteristics relates to predicting information of said setting. In some embodiments, the method further comprises storing a set of one or more output range values associated each of the at least two sets of neural network coefficients, comparing the output with the one or more output range values associated with the selected one from the at least two sets of neural network coefficients, and selecting a new set among the at least two sets of neural network coefficients if the output is outside the output range values. In some embodiments, the method further comprises generating the set of one or more output range to be within a safe operational range of the aspect of the machine. In some embodiments, the method further comprises generating the set of one or more output range to be within a tolerable error range of the aspect of the machine. In some embodiments, the method further comprises generating the set of one or more output range to be within an optimal operational range of the aspect of the machine Another innovation includes a machine controller, comprising a memory that stores at least two sets of neural network coefficients, each being different from the other, an input interface is implemented to receives first data from one or more input devices of the machine, wherein the controller is implemented to select one from the at least two sets of neural network coefficients based on the first data, and a neural network is instantiated with the selected one from the at least two sets of neural network coefficients, wherein the neural network conducts nodal operations at nodes, wherein the controller controls an aspect of the machine using an output from the neural network. In some embodiments, the controller is implemented to associate each of the at least two sets of neural network coefficients with one or more characteristics of a setting, wherein the one or more characteristics relates to predicting information of said setting.

Another aspect of innovation includes using various automated machines in groups to identify an optimal neural network in achieving a particular goal. More specifically, this aspect of the innovation includes a method of controlling a first group of automated machines and a second group of automated machines. The method includes the steps of controlling each of the first group of automated machines using a first set of neural network coefficients for achieving a common goal, controlling each of the second group of the automated machines using a second set of neural network coefficients for achieving said common goal, changing, for a plurality of automated machines among the second group of automated machines, from the second set of neural network coefficients to the first set of coefficients while operating the plurality of automated machines among the second group, and then controlling the plurality of automated machines among the second group using the first set of neural network coefficients. A "goal" when used herein, is a broad term and may correspond to a desired classification or calculated result, or sets of results. For example, if a goal is for a group of drones to intercept another vehicle or moving platform, the goal may correspond to certain neural network configurations and results relating to one or more of speed, heading, time it took to intercept, speed of calculations (e.g., using floating point of integer calculations), accuracy of intercept (e.g., determined by location of an intercept point to a threshold), and the like, that are determined from the different configurations.

The method may also include the steps of generating first results by operating the first group of machines and generating second results by operation the second group of machines, evaluating the first results with the second results based on a criterion. The above mentioned executing step of changing from the second set of neural network coefficients to the first set of coefficients, if the first results are better compared with the second results based on the criteria.

The innovation may also include an automated machine configured to operate along with other automated machines to achieve a common goal. Such an automated machine may include a first neural network having a first structure and a first set of coefficients, a second neural network having a second structure and a second set of coefficients, and a controller device implemented to operate an aspect of the automated machine using the first neural network and to change over to using the second neural network while the automated machine is in operation upon receiving information that the second neural network yields better results in achieving the common goal. The automated machine may also include a receiver implemented to receive from a remote device the information that the second neural network yield better results in achieving the common goal. Such an automated machine can be a drone, a cell phone, or a device to provide cyber security. The common goal can be arriving at a target location, receiving or transmitting data speedily with a minimal error rate, or providing security for a computer network.

For the various preferred embodiments, the neural network structure can be one of a convolutional neural network, a feed forward neural network, a neural Turing machine, Hopfield neural network, and Boltzmann machine neural network. In these embodiments, a setting can be one of a temperate urban region, a desert rural region, a forested mountain region, and a coastal city and/or can be one of environment, condition, and situation in/under which the machine operates, and the information relating to the at least two sets of neural network coefficients is stored in a standardized format to allow access by electronic devices manufactured by different manufacturers or electronic devices belonging to different manufacturing entities. Also, the neural network coefficients matched with the selected one can be generated by using training data set collected within the corresponding setting.

Another aspect of the present invention may include a controller for an autonomous machine coupled to a plurality of sensors generating input data. The controller comprises a) a first neural network deployed on the autonomous machine, trained with a first training data set and configured to generate first output data after processing a set of input data, b) a second neural network deployed on the autonomous machine, trained with a second training data set and configured to generate second output data after processing said set of input data, wherein the first and second neural networks being executed simultaneously; and c) a comparator receiving and comparing the first output data and second output data, wherein the controller controls the autonomous machine using input that includes the first output data and a result of the comparator. It should be noted that the comparator can be further configured to detect a minimum difference between the first and second output data. The controller can also include a counter for counting instances of the comparator detecting the minimum difference between the first and second output data. The controller can stop using the first output data to control the autonomous machine when the counter counts more than a predetermined number during a predetermined time period. In some embodiments, the first and second training data sets are identical to each other. The controller can be further constructed to use the second output data to control the autonomous machine when the counter counts more than the predetermined number during the predetermined time period.

Yet another aspect of the present invention relates to a method of controlling an autonomous machine coupled to a plurality of sensors generating input data. The method may include: a) inferencing to generate first output data on a first neural network deployed on the autonomous machine and trained with a first training data set, b) inferencing to generate second output data on a second neural network deployed on the autonomous machine and trained with a second training data set, wherein the first output data and second output data are being generated simultaneously, c) comparing the first output data and second output data; and d) controlling the autonomous machine using input that includes the first output data and a result of the comparing step. The method may also include the steps of detecting a minimum difference between the first and second output data and counting the detection of the minimum difference between the first and second output data, wherein the controller stops using the first output data to control the autonomous machine when the counting steps results more than a predetermined number during a predetermined time period. Here, the controlling step can use the second output data to control the autonomous machine when the counter counts more than the predetermined number during the predetermined time period.

In some embodiments, the predetermined number can be set at one. In some embodiments, the predetermined time period can be set at one millisecond. In some embodiments, the first and second output data can be numerical values. In such embodiments, the minimum difference can be 0.1% of an average of the numerical values. In other words, ins some examples the minimum difference can be a very small non-zero percentage.

BRIEF DESCRIPTION OF THE DRAWINGS

FIG. 4*b* is a timing diagram illustrating steps performed by a preferred example embodiment of a setting change detector and controller;

FIG. 4*c* is a timing diagram illustrating steps performed by a preferred example embodiment of a setting change detector and controller that has a predicting setting feature;

DETAILED DESCRIPTION OF CERTAIN INVENTIVE ASPECTS

Figure 1:
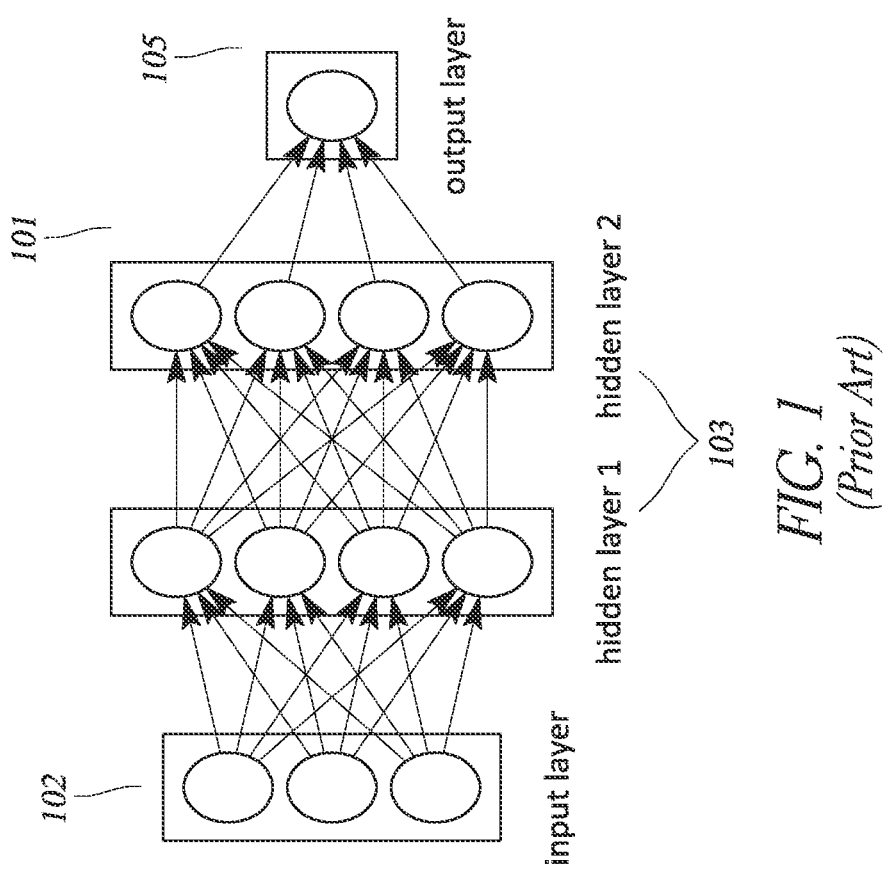
FIG. 1 is a schematic diagram illustrating a prior art neural network with hidden layers.
Figure 2:
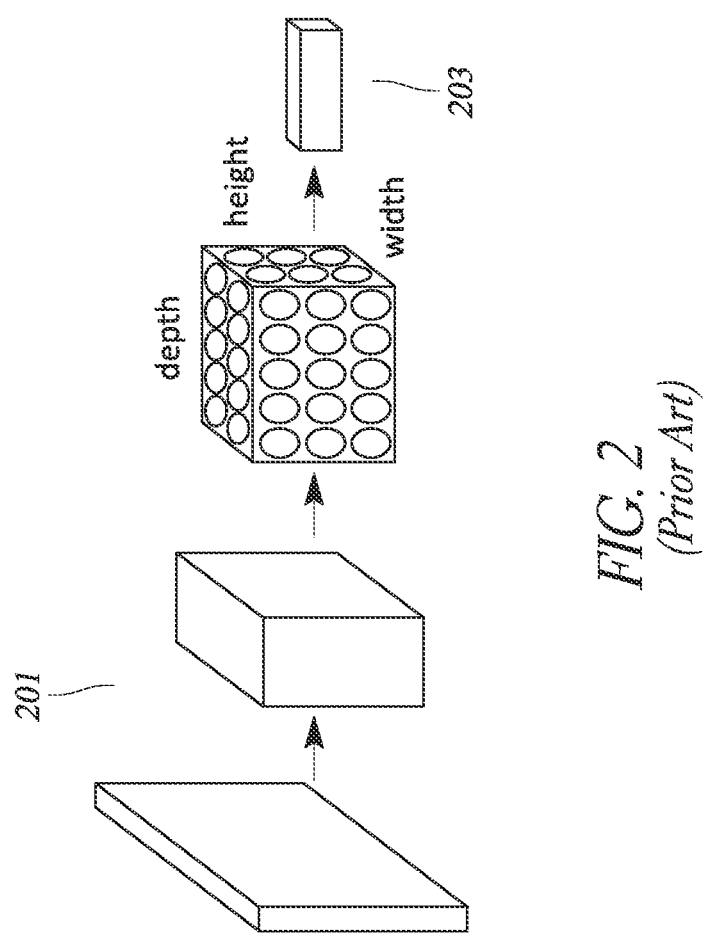
FIG. 2 is a schematic diagram illustrating a prior art convolutional neural network.

The detailed description of various exemplary embodiments below, in relation to the drawings, is intended as a description of various aspects of the various exemplary embodiments of the present invention and is not intended to represent the only aspects in which the various exemplary embodiments described herein may be practiced. The detailed description includes specific details for the purpose of providing a thorough understanding of the various exemplary embodiments of the present invention. However, it will be apparent to those skilled in the art that some aspects of the various exemplary embodiments of the present invention may be practiced without these specific details. In some instances, well-known structures and components are shown in block diagram form in order to avoid obscuring various examples of various embodiments.

Although particular aspects various exemplary embodiments are described herein, numerous variations, combinations and permutations of these aspects fall within the scope of the disclosure. Although some benefits and advantages of certain aspects are mentioned, the scope of the disclosure is not intended to be limited to particular benefits, uses or objectives.

1. Neural Networks

Some aspects of various exemplary embodiments are described by referring to and/or using neural network(s). Various structural elements of neural network include layers (input, output, and hidden layers), nodes (or cells) for each, and connections among the nodes. Each node is connected to other nodes and has a nodal value (or a weight) and each connection can also have a weight. The initial nodal values and connections can be random or uniform. A nodal value/weight can be negative, positive, small, large, or zero after a training session with training data set. The value of each of the connection is multiplied (or other mathematical operation) by its respective connection weight. The resulting values are all added together (or other mathematical operation). A bias (e.g., nodal value) can also be added (or other mathematical operation). A bias can be a constant (often −1 or 1) or a variable. This resulting value is the value of the node when activated. Another type of nodes are convolutional nodes, which can be similar to aforementioned nodal features, are typically connected to only a few nodes from a previous layer, particularly adapted to decode spatial information in images/speech data. Deconvolutional nodes are opposite to convolutional nodes. That is, deconvolutional nodes tend to decode spatial information by being locally connected to a next layer. Other types of nodes include pooling and interpolating nodes, mean and standard deviation nodes to represent probability distributions, recurrent nodes (each with connections other nodes and a memory to store the previous value of itself), long short term memory (LSTM) nodes that may address rapid information loss occurring in recurrent nodes, and gated recurrent units nodes that are a variation of LSTM node by using two gates: update and reset.

A neural network can be a feedforward network that includes multi-level hidden layers with each layer having one or more nodes. In some exemplary embodiments of the present invention, a neural network can be a recurrent neural network either forward moving only in time or bi-directional as including forward moving components and backward moving components. Some exemplary aspects of the present invention contemplate using a recursive neural network that can configure itself adaptively with different number of layers with different number of nodes for each layer depending on given training data. In some embodiments of the present invention, the recursive neural network is a configuration of a neural network created by applying the same set of weights recursively over a structured input (producing a structured prediction over variable-size input structures) or a scalar prediction on it by traversing a given structure in topological order.

In some aspects, various exemplary embodiments contemplate taking advantage of the nonlinearity of a neural network, which may cause loss functions to become non-convex. In other words, neural networks are typically trained by using training data set on iterative, gradient-based optimizers that would drive the cost function to a very low value. In some exemplary aspects of the present invention, when training data set can be preprocessed to develop characteristic by large linear regression, support vector machines with gradient descent can be used to train a neural network.

For computing the gradient (e.g., in feed-forward neural networks), in some exemplary embodiments contemplate using backpropagation, while another method such as stochastic gradient descent can be used to perform learning using this gradient. In some aspects of the present invention, the backpropagation can also be applicable to other machine learning tasks that involve computing other derivatives, e.g., part of the learning process, or to analyze the learned model.

In some exemplary embodiments, neural networks may undergo regularization (and, optionally, optimization for neural network training) during a training session using training data set. In some aspects of the present invention, regularization contemplates to be modification to the neural network to reduce its generalization error. The optimization, in some exemplary embodiments, can use continuation methods. This option can make optimization more efficient by selecting initial points causing the local optimization efforts in well-behaved regions of training data set space. In another exemplary embodiment, the optimization can use a stochastic curriculum, e.g., gradually increasing the average proportion of the more difficult examples is gradually increased, whereas in a conventional training a random mix of easy and difficult examples is presented to neural nets to be trained.

In some exemplary embodiments, supervised training or unsupervised training (or combination thereof) can be employed to train a given neural network. The unsupervised training allows a neural network to discern the input distribution/pattern on its own. In some exemplary embodiments of the unsupervised training, each layer of a neural network can be trained individually unsupervised, and then the entire network is trained to fine tune.

In some exemplary aspects of present invention, the input data are sampled so that the neural network can be more efficiently trained. In this example embodiment, sampling can be performed by using statistical methods to approximate the input distribution/pattern such as Gibbs sampling. The Gibbs sampling is an example approach in building a Markov chain, which is an example method to perform Monte Carlo estimates.

The above described various types of nodes are used in a number of different example neural network structures, such as the feedforward neural network described in connection with FIG. 1. Other example neural network structures include: a Hopfield network, a network where every neuron is connected to every other neuron; a Boltzmann machines, which is similar to the Hopfield network but with some nodes used as input/output nodes and others remain hidden nodes; and a Restricted Boltzmann machine. These three example neural network structures can include Markov chains used as preprocessors.

Another example set of neural network structures include deep convolutional neural networks and deconvolutional networks, which use the convolutional and deconvolutional nodes described above. The convolutional/deconvolutional networks can be combined with feedforward neural networks. For instance, generative adversarial networks can be formed by two different neural networks such as a combination of a feedforward neural network and convolutional neural network, with one trained to generate content related information (e.g., feature extraction) from input data and the other trained to use the content related information to determine the content (e.g., identifying objects in images).

Another example group of neural network structures includes: recurrent neural networks that use the recurrent nodes described above, LSTM use the aforementioned LSTM nodes, gated recurrent units having an update gate instead of other gate of LSTM, neural Turing machines that have memories separated from nodes, bidirectional recurrent neural networks, and echo state networks having random connections between recurrent nodes.

Yet another example group of neural network structures includes: deep residual networks which is a deep feedforward neural networks with extra connections passing input from one layer to a later layer (often 2 to 5 layers) as well as the next layer, extreme learning machines that is a feedforward neural network with random connections but not recurrent or spiking. In some implementations the deep feedforward neural network has more than five layers. Regarding a spiking neural network, liquid state machines are similar to extreme learning machines with spiking nodes, such as replacing sigmoid activations with threshold functions and each node has a memory capable of accumulating.

Other example structures include support vector machines that finds optimal solutions for classification problems, self-organizing neural networks such as Kohonen neural networks. Another example set of neural network structures includes: autoencoders configured to automatically encode information, sparse autoencoders that encode information in more space, variational autoencoders are pre-injected with an approximated probability distribution of the input training samples, denoising autoencoders that train with the input data with noise, and deep belief networks are stacked structures of autoencoders. The deep belief networks have been shown to be effectively trainable stack by stack.

In some embodiments, the neural network may include a neural network that has a class of deep, feed-forward artificial neural networks that use a variation of multilayer perceptrons designed to require minimal preprocessing and may also use hidden layers that are convolutional layers (or CNN), pooling layers, fully/partially connected layers and normalization layers. Some embodiments can be referred to as shift invariant or space invariant artificial neural networks (SIANN), based on their shared-weights architecture and translation invariance characteristics. A neural network may self-train (e.g., Alphago Zero) such as by using re-enforcement learning. Variations on this embodiment include the deep Q-network (DQN) which is a type of deep learning model that combines a deep CNN with Q-learning, a form of reinforcement learning. Unlike earlier reinforcement learning agents, DQNs can learn directly from high-dimensional sensory inputs. Variation on this embodiment include convolutional deep belief networks (CDBN) which have structure very similar to the CNN and are trained similarly to deep belief networks. These extensions exploit the 2D structure of images, like CNNs do, and make use of pre-training like deep belief networks. Further variations on this embodiment include time delay neural networks (TDNN) which allow timed signals (e.g. speech) to be processed time-invariantly, analogous to the translation invariance offered by CNNs. The tiling of neuron outputs can cover timed stages. It should be noted that the above-mentioned neural networks can be trained using training data sets using the unsupervised learning, the supervised learning, or the reinforcement learning steps.

2. Various Types of Nodal Operations

Figure 3:
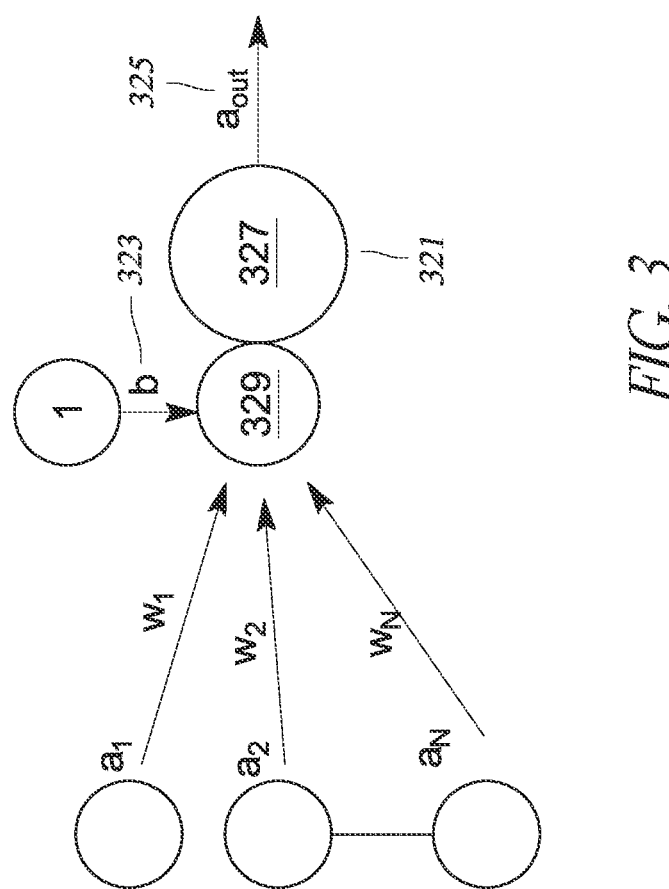
FIG. 3 is an illustration depicting a node on a nodal layer, the node receiving input from nodes from the previous nodal layer.

At each node of the input layer, a set of input is received. For nodes on hidden layers, outputs are received from nodes located on a previous nodal layer (or output from nodes from various nodal layers based on particular neural network configurations) as inputs. Each node performs an operation or operations on the received set of input. FIG. 3 illustrates nodal operations using an example of nodal coefficients (or nodal weights—nodal weights and nodal coefficients can be used interchangeably in the context of various embodiments of the present invention, and they can be shortened to coefficients or weights) for a node in a feed-forward neural network. In this particular example, there are "n" number of coefficients per a node 321 including a bias coefficient 323. The output 325, $a_{out}$, is an output of a function applied to the sum 329 (□) of (i) a bias value (1*b) and (ii) each output from the previous layer of nodes ($a_1, a_2, \ldots, a_N$ in FIG. 3) with each multiplied by a certain weight ($W_1, W_2, \ldots, W_N$ in FIG. 3) that can be a negative/positive number or zero. The function 327 (e.g., z->g) applied to the sum can be predefined. Using a set of equations, these can be expressed as:

$$Z = b + \sum_{i=1}^{N} a_i w_i$$

$$a_{out} = g(z)$$

The weights are determined by training the given neural network with a training data set, which can include multiple input and output data pairs. In some preferred embodiments, training data set is for self-learning neural networks. Although the preferred embodiment in FIG. 3 depicts a feedforward neural network structure that sums the bias and each output from the previous layer multiplied by a coefficient, and then applying a function to the sum, other preferred embodiments contemplate the use of various i) neural network structures (examples described in Section 1 above), ii) arrangements regarding which nodes on which previous layers (e.g., not just immediately previous layer but a sub-set or all previous layers) would be connected, and/or iii) other operation(s) can be used (e.g., multiplication operation instead of or in addition to the summing operation).

In one embodiment, the above-identified coefficients ($W_1, W_2, \ldots, W_N$ in FIG. 3) and output from the previous layer of nodes ($a_1, a_2, \ldots, a_N$ in FIG. 3) are floating point numbers. In such an embodiment, the operations at each node is a set of floating point calculations. Neural networks can be trained with floating point training data that result in nodes having floating point values. These neural networks can be referred to as floating point neural networks, i.e., the coefficients being in floating point values, input and output nodes receiving and generating floating point values, and each node conducting calculations using floating point values.

In another embodiment, the above-identified coefficients ($W_1, W_2, \ldots, W_N$ in FIG. 3) and output from the previous layer of nodes ($a_1, a_2, \ldots, a_N$ in FIG. 3) are integer numbers. In such an embodiment, the operations at each node is a set of integer number calculations. In these integer number calculations, some operations may include shifting of bits (e.g., integer numbers) for multiply/dividing in base-2, for example.

In certain embodiments, floating point neural networks can be converted into integer neural networks. Here, integer neural networks are those neural networks in which the coefficients are in integer values, input and output nodes are receiving and generating integer values, and each node is conducting calculations using integer values. An example of the conversion is to quantize floating point input values and coefficients into integer numbers—i.e., approximating floating points into integer numbers. In this embodiment, the operations at each node can be integer numbers calculations. In another example of the conversion, floating point coefficient values can be approximated with the nearest integer values. For input nodes of an integer neural network, they can be implemented to approximate floating point input values with the nearest integer values as well. The conversion from a floating point neural network to an integer network work can automated—i.e., auto-generated.

Another variation of the above embodiments can use a Look-Up-Table (LUT) instead of conducting multiplications at each node. That is, during the training phase, the potential input value ranges to a node can be quantized as well as the range of coefficient values, and then a LUT can be generated for each node output—in some embodiments, certain combination of nodes can share a LUT. An example LUT would contain an output value for individual combinations of quantized input levels and quantized coefficient levels. During the operation of a neural network using LUTs, each node would be associated with a LUT (e.g., a different LUT for each node and/or multiple nodes sharing a LUT). In such a neural network, for a given set of inputs, the LUT would be used to locate the output at each node. In other words, nodal operations would be finding the output from the associated LUT.

It should be noted that the embodiment using float point calculation may generate precise outputs but may take time to calculate (e.g., taking a number of calculation/clock cycles). That is, such embodiments would take more time and computing resources. The integer calculation embodiments can reduce the calculation time and computing resources at the expense of having less precisions, while the LUT embodiments could reduce calculation time while potentially reducing more precision. It should also be noted that less precision does not necessarily mean less desirable outcome, or results, for the overall goals (e.g., desired results) of a particular neural network. For instances, for some applications speedy generation of outputs is more valuable compared with more precise outputs that may take longer to generate—examples of such applications would be a fast moving vehicles/missiles in an open space or an assembly line that may perform a simple task on a fast moving components. In addition, the goals may change for a system. For example, a supersonic missile moving at a high speed may require speedy directional signals (outputs) from its navigation system initially and then, as such a missile approaches its intended target, more precision may be required. In this example, goals for the system can include accuracy and speed. Initially, during a first portion of a flight, the goal for speed may be higher than the goal for accuracy. The goals (or results) can be characterized in various ways, for example, by assigning values indicating relative importance. For instance, in this example, if these goals are weighted to have a sum of 1.0, the goal for speed may initially be set to a weighted value of 0.7 and the goal for accuracy may be set to a weighted value of 0.3, indicating that speed is initially (e.g., for a first portion of the missile flight) relatively more important than accuracy. Each value may correspond to a certain neural network structure and/or neural network coefficients, including whether the calculations are performed in floating point or integer calculation. As a result of the initial goals and these values, the system may use a first configuration of a neural network structure and neural network coefficients with integer calculations to meet the higher goal for speed. The neural network structure and/or the neural network coefficients can be configured to reflect the initial goals. For example, one of a set of neural network structures and/or neural network coefficients that correspond to these goals may be retrieved from a memory component, and implemented and operated to achieve these initial goals. As the missile approaches its intended target in a second portion of the flight and more precision is desired the goals of the system may change such that the goal for speed may have a value of 0.5 and the goal for accuracy may have a value of 0.5. The neural network structure and/or the neural network coefficients used for the second portion can be configured to reflect these changed goals. In various embodiments, the system can determine to change the goals based on a location (e.g., a GPS location, the magnetic field, a sensed location), time or a timer, an event, a received signal, or sensed information, for example, processing of one or more images or signals. Based on the change of goals, the system can use a neural network system that is configured to use floating point calculations for the second portion of the flight, increasing accuracy of the calculations. In an example, a set of neural network structures and/or neural network coefficients that correspond to these new goals may be retrieved from a memory component and implemented and operated to achieve these initial goals. In another example, the system can switch to operate from a neural network that is configured with a different neural network structure and/or neural network coefficients to meet the changed goal. In another example, a vehicle moving fast on an open country side road may require more speedy control signal, while the same vehicle moving in a crowded city environment may require more precision. Another example is a manufacturing assembly line, in which some component assemble may require speed while other component assembly may require precision. It is contemplated within the present invention that a machine (e.g., automated vehicle, missile, manufacturing assembly line) can be configured using a set of neural networks with various speeds and precisions. That is, if more precision is needed, nodal operations can be floating point based; if more speed is needed, nodal operations can us LUTs/integer numbers.

In an alternative embodiment, a neural network can include a combination of nodes with floating point operations, nodes with integer number operations, and/or nodes with LUT operations. For this alternative embodiment, during the training of such neural networks, the evaluation of speed and precision requirements would be conducted at nodes. That is, some nodes can be determined to be less precise but need to be speedy while others would need to be precise even if they would consume time in performing the nodal operations. In other words, coefficients can be floating points, integer numbers, entries in LUTs, and/or combinations thereof.

In some hardware embodiments, no processor/accelerator for conducting floating point calculations (e.g., no graphical processor/accelerator, digital signal processor/accelerator) may be present. In some of these embodiments, only integer number operations can be performed (e.g., dividing or multiplying by basis of 2 using shift registers)—on such embodiments, neural networks with nodes having integer number coefficients (and/or LUTs) can be instantiated and operational.

In some other hardware embodiments, no CPU may be present. LUTs can be used as part of nodal operations. In an LUT embodiment, LUTs can be arranged with a set of memories in which the address of a memory location is a combination of inputs and coefficients. By way of a simple example, an input value could be 1234 and coefficient could be 2, then the address is 12342—at that location the output value is stored.

3. Settings for Neural Networks

As noted above, prior art neural networks have been trained and/or employed to operate in complex and widely varying settings. A "setting" as used herein, refers generally to any particular environment or location, such as a particular condition, environment, situation and/or etc. In various embodiments of the present invention, rather than or in addition to training a neural network with ever increasing quantity of training data sets to cover various settings, a neural network coefficient set for a neural network structure is trained using a training data set collected for a particular setting. Non-exhaustive various example types of characteristics of various settings may include:

For vehicles, drones, missiles, etc.:
  Geographical environments: high population density city, medium population density city, suburbia areas, rural regions, plain regions, mountainous areas, coastal areas, etc.
  Weather conditions—raining, snowing, clear day, windy day, foggy, etc.
  Situations—amount of surrounding traffic, accident ahead, wild animals present, etc.
For speech recognition machines:
  Geographical: Midwestern, southern, north eastern, etc. in the US
  Recognizable accents: Midwestern, Northeastern, Southern, etc. in the US
For facial recognition machines:
  Geographical: continents, countries, cities, rural areas, etc.
  Ethnic background: Northern African, Sub-Saharan African, Norther European, Southern European, Eastern European, Northeast Asian, Southeast Asian, Middle Eastern, etc.
For an assembly line application:
  Type of objects to be sorted or type of operations to be performed on objects
For target identification in military applications:
  Different targets and/or in different environments or situations, some examples are: a. for targeting tanks/artillery pieces/missile launchers on the surface of desert v. in forested regions from aircraft/drones, b. for targeting drones/aircraft on a sunny day, full moon/no moon night, or rainy day/night from the surface Characteristics of a setting can also relate to conditions of the sensors that generate input to neural networks, as examples: the age of sensors; the manufacturer of sensors; or the different products lines/periods even from the same manufacturer. That is, new and many-years old sensors from the same manufacturer and same production line may give rise to having to use two different sets of coefficients and/or neural network structure. In some embodiments, a setting can include a sensor being in a non-working condition. In these example embodiments, one set of coefficients with a neural network structure can be trained under/in the setting that full collection of sensors/devices functioning optimally, and other sets of coefficients with different neural network structures trained under/in the settings when one or more sensors/devices are malfunctioning.

In various embodiments of the present invention, a training data set can be separately collected from each setting in/under which the automated machine is to operate. For example, one training data set can consist of data collected using various sensors in a setting that can be characterized as a desert area, country side, and during day time with no wild animal activities. Another setting for a training data set can be characterized as data collected from a desert area, a suburban region, and during night time with some wild animal activities. A different setting for another training data set can consist of data collected using various sensors in a large city environment, during night time, and with a large number of pedestrians. For each of these different training set, a particular neural network—setup with a neural network structure—is trained. A trained neural network results in a set of coefficients (that is each node ends up with coefficients after a training session) for the particular setting in/under which training data set is collected. It should be noted that in some preferred embodiments, in addition to having a training data set for each setting, similar settings can have the same set of coefficients and neural network structure (e.g., downtown New York City and downtown Boston can use the same set of coefficients, sand dunes in the Sahara Desert and sand dunes in the Death Valley can use the same set of coefficients, etc.).

The setting can also be factor in determining the precision level and/or the speed of nodal operations as discussed above in connection with FIG. 3. For instance, some settings may require floating point nodal operations—in which floating point coefficient nodal operations are desirable, while some setting may require speed, in which LUTs nodal operations are desirable. For some embodiments in which intermediate speed v. precision is required, integer number nodal operations may be desirable. It should be noted that the setting can also factor in the hardware limitations on which a neural network is to be instantiated and operated (e.g., no floating point accelerator, no CPU or the like as described above).

In an exemplary preferred embodiment to describe a coefficient set, a neural network can be a feedforward network and can have an input layer (e.g., five nodes), an output layer (e.g., three nodes), and five hidden layers with five nodes each. In this structure, the example neural network has 25 nodes among the hidden layers. Using the nodal coefficient example depicted in FIG. 3, each hidden layer node and each output layer node can have five weights/coefficients including a bias weight value in the example neural network. Once a set of coefficients are determined from training using the data set collected in a particular setting, such a set is associated with characteristics to the setting (as exemplified above: desert, daytime, countryside, etc.) as described below in connection with Table 1 (and also may further described in connection with Tables 2 and 3). In this preferred exemplary embodiment, all stored coefficient sets are for a feedforward network having an input layer (five nodes), an output layer (three nodes), and five hidden layers with five nodes each. To store information/data relating to a large number of different settings, a database management system can be employed. By segmenting settings, each setting may exhibit a constant/consistent environment, condition, and/or situation, and a neural network trained for a specific setting may become more accurate within the trained setting.

It should be noted that in some other preferred embodiments of the present invention, the database can include coefficient sets with different neural network structures depending on the optimal structure for different settings. For instance, a number of sets of coefficients can be for feedforward networks, while other sets can be for back propagation networks or other neural network structures such as those provided above in Section 1, for example.

In some preferred embodiments, in addition to the coefficients, the database can store:
- More information about the neural network structure such as the type of structure, the number of layers, the number of nodes on each layer, nodal connection information between and/or within each layer, and/or other information to define a neural network;
- Type(s) of nodal operations to be performed (e.g., floating points, integer numbers, and/or LUTs) and/or
- Executable modules of neural networks having the neural network structures and corresponding coefficients.

The automated machine can broadly refer to a machine that is to be controlled by a control mechanism, with some human intervention if necessary. Examples of an automated machine can be appliances (e.g., ovens, refrigerators) with automated controllers (e.g., Internet of Things, "IoT" controllers), a speech generator, a speech recognition system, a facial recognition system, an automated personal assistant (e.g., Alexa by Amazon, Inc., Siri by Apple, Inc.), an autonomous vehicle, a robot, a target recognition system (e.g., in military defense applications such as missiles and drones), and etc. Also, an automated machine does not necessarily mean a completely automated manual-less machine that requires no human intervention, but it may require a qualified person to take over the control (e.g., driving) under certain circumstances.

4. Detailed Implementation Example Embodiments

Figure 4:
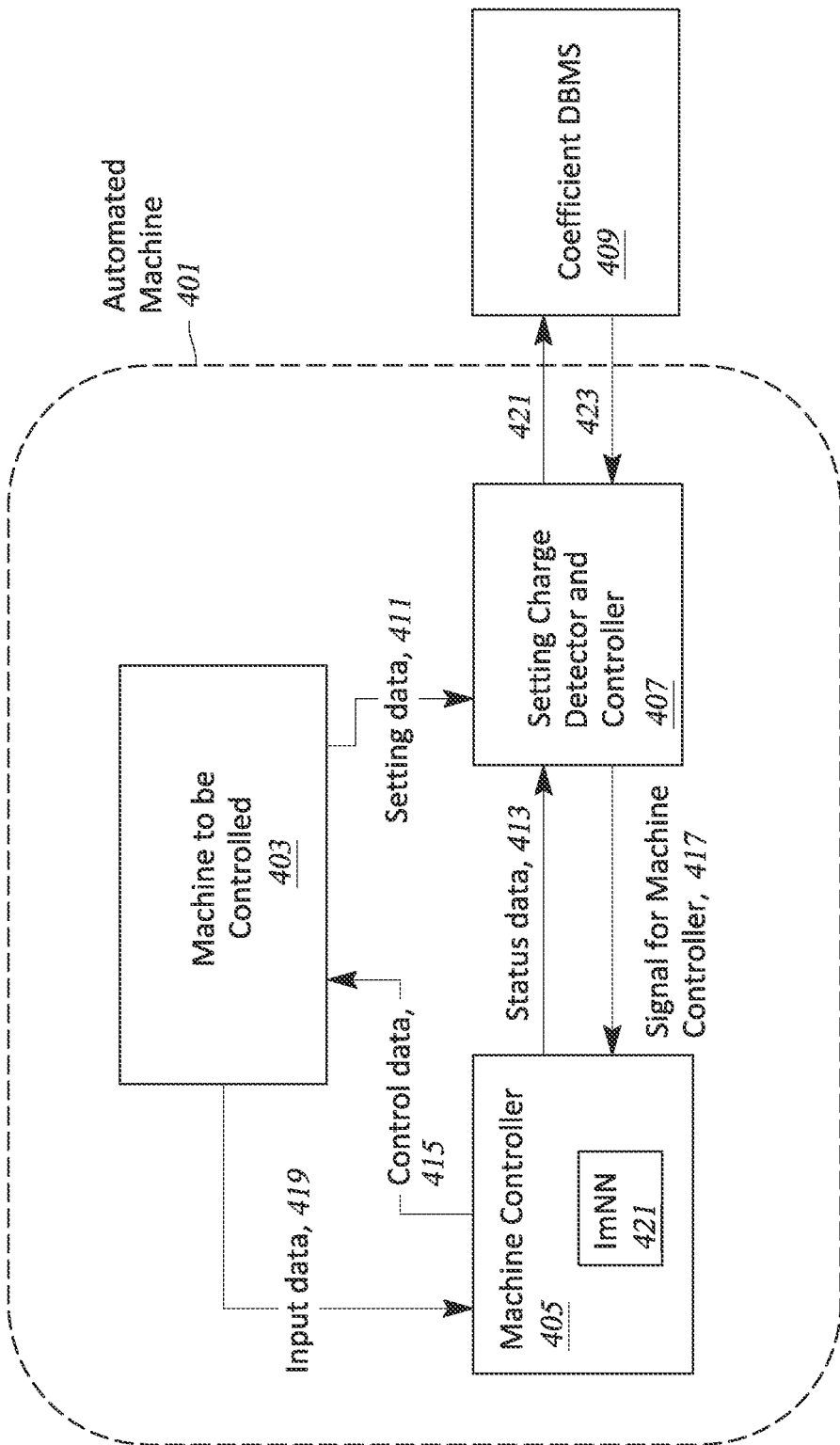
FIG. 4 is a block diagram illustrating an example preferred embodiment of an automated machine with a coefficient DBMS.

In one example preferred embodiment illustrated in FIG. 4, automated machine 401 may include a machine-to-be-controlled ("MTBC") 403, a machine controller ("MC") 405, and a setting change detector and controller ("SCDC") 407. The system illustrated in FIG. 4 also includes a coefficient database management system ("C-DBMS") 409, which is depicted as located outside the automated machine 401 while operationally coupled thereto. Note that in such an embodiment, the C-DBMS 409 can be located at a remote server and coupled to communicate with the automated machine. In some other preferred embodiments, a sub-set or the whole of the C-DBMS 409 can be co-located with an automated machine 401 or can be considered as a part of the automated machine. In yet another embodiment, the whole of the C-DBMS 409 can be co-located with the automated machine 401 and implemented on hardware or firmware for fast accesses of the information stored therein.

In FIG. 4, the MTBC 403, MC 405, SCDC 407 and C-DBMS 409 are described as individual modules. As such, they can be located remote from each other. For instance, in an example windmill embodiment, the machine can be the components of a wind-turbine, the MTBC 403 can be located proximate to or on the wind-turbine to receive input from input devices (e.g., wind speed sensor) and to control the speed of the generator, the angle of the blades, the rotation of the wind-turbine. Continuing with the windmill example, the MC 405 and the SCDC 407 can be located at the base of the windmill for the ease of access, and the C-DBMS 409 can be located at a server located remote from the windmill. It should be noted in some preferred embodiments, the MTBC 403, MC 405, SCDC 407 and C-DBMS 409 are one whole module rather than individual modules. It should also be noted that, although the MTBC 403 is named as "machine to be controlled," MTBC 403 preferably may include various interfaces to receive data from various sensors and/or devices and various interfaces to send control information to components (e.g., motors, actuators, loud speakers) in controlling the automated machine on which the MTBC 403 is to control.

It should be noted that the MTBC 403, MC 405, SCDC 407 and C-DBMS 409 can be implemented on/as hardware, firmware, software modules or combination of them. In case of being software modules, those modules can be implemented as virtual machine(s) and/or software container(s).

Input data 419 generated by the MTBC 403 is sent over to the MC 405 to be processed (e.g., inferenced) by an ImNN 421. The MC 405 generates control data 415, which is sent over to the MTBC 403. The MC 405 also generates status data 413 for the SCDC 407, and the SCDC 407 uses a signal for the MC 417 to control the life cycle of the ImNN 421 (e.g., instantiate, terminate, run, and etc.) The values of setting data 411 are sent from the MTBC 403 to the SCDC 407. In various embodiments of the present invention, the values of setting data 411 (although "of" is used, in various embodiments of the present invention, the values can be also described as "on" setting data 411 as on a data bus or obtained "from" the setting data 411 as in from shared memory) can be seen as data collected/captured/sensed by various of sensors relating to the setting (e.g., environment, condition, situation, and etc.). The values of the setting data 411 can be referred to as setting characteristic values.

In FIG. 4, the MTBC 403 is coupled with the MC 405 via the input data 419 and control data 415, the MC 405 and the SCDC 407 are coupled with the status data 413 and signal for MC 417, the MTBC 403 and the SCDC 407 are coupled with the setting data 411, and the SCDC 407 and C-DBMS 409 are coupled with two directional arrows 421 and 423—the coupling 421 sends queries from SCDC 407 to the C-DBMS 409 and the coupling 423 sends results of the queries to the SCDC 407. These above-mentioned coupling mechanisms, and those illustrated in FIGS. 11 and 12A below, provide communication mechanisms to send and/or receive data and/or control signal(s). The coupling mechanism can be implemented using, for example, shared memory, sockets (in socket communication) and/or hardware implemented data/control signal buses. In particular, the input data 419 sends data from various sensors/devices located in the MTBC 403 to the MC 405, control data 415 sends data to control various controllable components interfacing with the MTBC 405, the status data 413 sends data from the MC 405 about the status of the ImNN(s) 412, the signal for MC 417 is the data to control the ImNN(s), and the setting data 411 sends data from various sensors/devices in the MTBC 403—that is, the setting characteristic values.

With respect to the MTBC 403, it includes (or has interfaces to) various input sensors/devices, communication devices and machine control devices, such as a thermometer, pressure sensor, compass, altimeter, gyroscope, accelerometer, image sensor, cameras, video cameras, magnetometer, light detectors (e.g., visible, infra-red, ultra-violet), barometer, humidity measuring device, radiation sensor, audio/sound sensor, e.g., microphone, geographical positions system (GPS) device, ground to surface distance (GSD) device and/or etc. From these input sensors/devices various setting characteristic values can be obtained. For example, the temperature from a thermometer, air pressure (e.g., of a tire) from a pressure sensor, magnetic North from a compass, altitude from an altimeter, orientation information from a gyroscope, acceleration information from an accelerometer, images from an image sensor or camera, video frames from a video cameras, magnetic field information from a magnetometer, ambient light variation information from light detectors, atmospheric/ambient air pressure from a barometer, humidity level from humidity measuring device, radiation level from a radiation sensor, voice from audio/sound sensor, geospatial information from a GPS device.

In an autonomous land vehicle example, the MTBC 403 may include (or interfaces to) a number of sensors and internal computing devices, with the following examples, to control the vehicle while traveling in traffic with other land vehicles. Sensors for collecting external surrounding information include one more front view cameras (e.g., digital camera), a night vision camera(s), a front object laser sensor(s), front and rear millimeter radars and sensors, an ambient light sensor, pedestrian/animal detecting IR sensor (s), a side view camera(s) on each side, a night vision camera(s) on each side, a proximity sensor(s) on each side, a panoramic/wide angle view sensor(s) (e.g., 100 degrees, 180 degrees, and/or 360 degrees view digital cameras), a LIDAR sensor, a tire pressure sensor for each mounted tire, a wheel speed sensor for each wheel, a rear view camera(s) (e.g., digital camera), and/or a review view night vision camera(s). As used herein, a "camera" is a broad term and refers to any of a number of imaging devices/systems that collect data representative of an "image" (e.g., a one or multi-dimensional representation of information) with one or more sensors (e.g., film or one or more electronic sensors), unless the context of the usage indicates otherwise. The number of cameras and sensors having various views may be mounted on an autonomous land vehicle so that, preferably, there are no gaps or blind spots either going forward or backward. Sensors can also include GPS devices, gyroscopes, and etc. that give the direction, velocity, and/or location information of the automated machine.

Moreover, sensors for collecting operational information and having interfaces with the MTBC 403 include a driver drowsiness sensor, steering angle sensor, a throttle (e.g., gas pedal) pressure sensor, and/or a bread pedal sensor. In addition to sensors, the autonomous vehicle may also include communication devices to send and receive data from a network (e.g., cell phone network, Wi-Fi, GPS and/or other types of communication networks that provide secured communication method) and from other vehicles via vehicle-to-vehicle communication networks (e.g., VANETs) that provides secured communication links. These devices may also interface with the MTBC 403.

The autonomous vehicle may be configured to include or to interface with a communication device (e.g., a cell phone, radio, or the like) on its own within to interface with the MTBC 403 or include a docking system to connect to a communication device. If the autonomous vehicle includes a docking system to connect to a cell phone and has no other means of connecting to the cell phone network, such a vehicle may provide an additional anti-theft feature by disabling the automated driving function or disabling the entire driving function without being connecting to the communication network with the communication device.

Machine control devices interfacing with the MTBC 403 for the autonomous land vehicle may include (or include interfaces to) adaptive cruise control, an on-board computer(s), one or more control chips and/or control mechanisms to control the breaking, throttle, and steering wheel systems. Machine control devices interfacing with the MTBC 403 for a drone having fixed wings may include mechanisms to control elevator(s), flap(s), and/or aileron(s), in addition mechanisms to control the thrust(s) and the ruder. If a drone has rotor(s), the MTBC 403 may include (or has interfaces to) a control mechanism for the rotor(s). Machine control devices within the MTBC 403 for a missile with aerodynamic devices (e.g., canard(s), wing(s), and/or tail(s)), may include (or has interfaces to) control mechanisms for those devices. Machine control devices within the MTBC 403 for a robot may include (or has interfaces to) control mechanisms for various actuators (e.g., pneumatic actuators, hydraulic actuators, and/or electric actuators.) For a speech generator, a control mechanism (or interface thereto) may control input to loud speakers. Automated machines such as drones, missiles, robots or the like can include various types sensors/devices or interfaces thereto as described above for particular use of those machines. It should also be noted that a cell phone can be an automated machine as used herein since a cell phone can have sensors (e.g., microphone(s), camera(s)) to generate input to a facial recognition system, a finger print recognition system, a speech recognition system, or a speech generator.

Continuing on with FIG. 4, the MC 405 can include one or more implementation neural network (ImNN). At the initial stage, in a preferred embodiment, the SCDC 407 can instantiate an ImNN with a default neural network structure with a default set of coefficients—e.g., a fork ImNN process is created with a default set of coefficients with a default neural network structure, via the signal for the MC 405, as shown in FIG. 4. In this embodiment, the automated machine can start its operation with the default arrangements. As the SCDC 407 receives the setting characteristic values from the MTBC 403, it determines whether to keep the default set or to query the C-DBMS 409, which is described in more detail in connection with Table 1 (and also may be further described in connection with Tables 2 and 3).

Figure 4A:
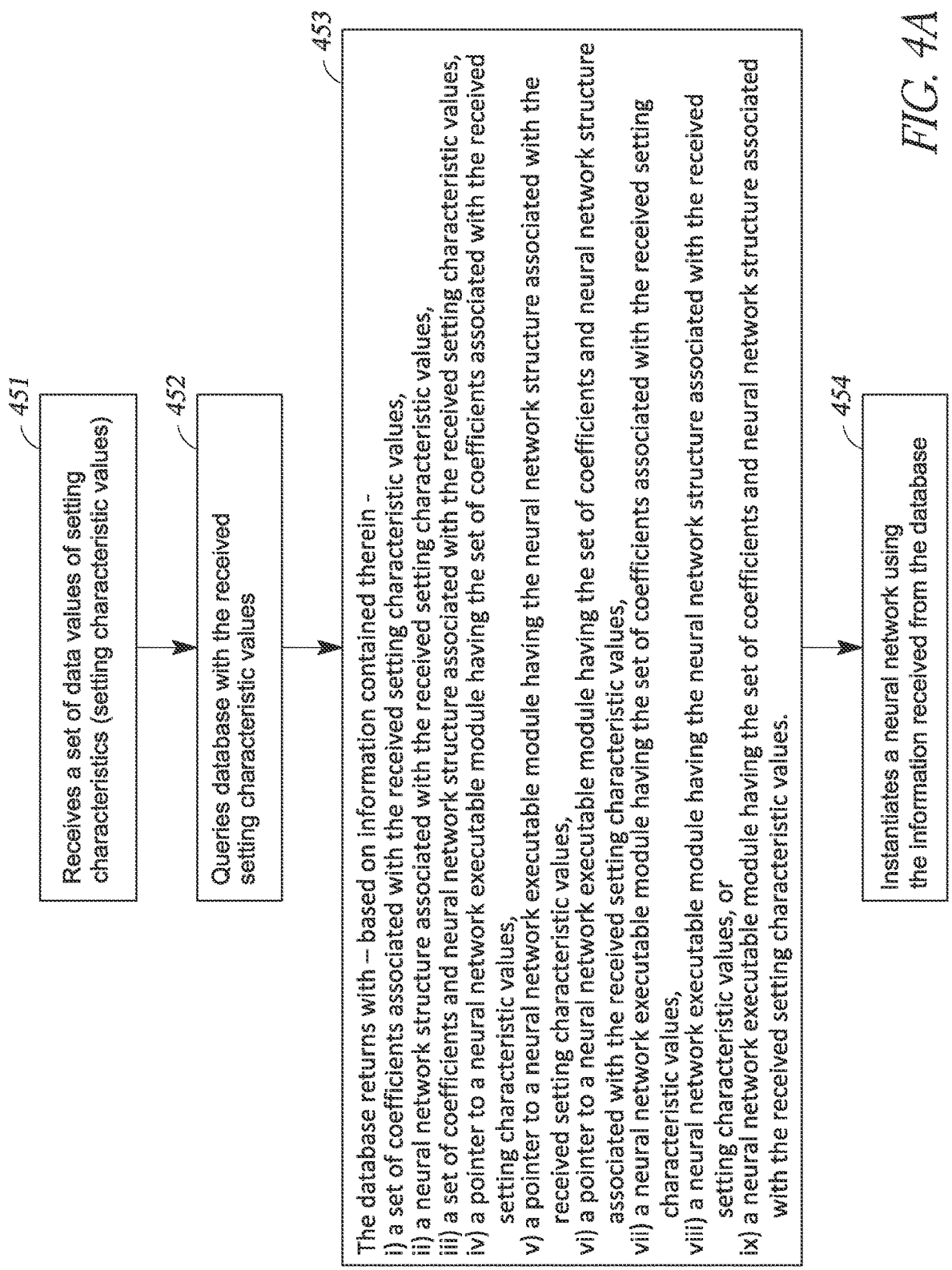
FIG. 4*a* is a flow chart diagram illustrating steps performed by a preferred example embodiment of a setting change detector and controller.

In another preferred embodiments, as illustrated in FIG. 4a, control data 415 is not sent to MTBC 403 or input data 419 is not inferenced by MC 405 until:

a. (step 451) receives values of setting data 411 relating to the setting characteristics from the MTBC 403, b. (step 452) queries the C-DBMS 409 with the received setting characteristic values which (step 453) returns A) a set of coefficients and/or a neural network structure associated with the received setting characteristic values or B) the neural network executable module (or a pointer thereto) having the structure and/or the coefficients—based on the information stored in the C-DBMS 409, c. (step 454) instantiates a new ImNN using A) the set of coefficients and/or the neural network structure or B) the neural network executable module, and d. the new ImNN becomes operational.

Various sensors/devices on the MTBC 403 can generate input data to be sent to the MC 405, which in turn use the input data to generate control data after conducting inferences on the input data. Here, all or a subset of input data can be inferenced on by the ImNN utilizing the set of coefficients and the neural network structure used in instantiating the ImNN.

Some of the sensors/devices on the MTBC 403 may generate the setting characteristic values for the SCDC 407. These sensors/devices can be the same sensors/devices, a subset of sensors/devices, or a different set of sensors/devices (that may include a subset of sensors/devices) on the MTBC 403 or elsewhere on the automated machine that generates input data. The SCDC 407 can continually or periodically (e.g., every fraction of a second, a second, a minute, or etc.) receive the setting characteristic values—individually, sub-set at a time, or all at once with/without a notice signal (e.g., an interrupt signal)—from the MTBC 403. The notice signal notifies the SCDC 407 that a set of setting characteristic values are prepared and will follow.

Subsequent to the ImNN becoming operational ("the currently operational ImNN"), the automated machine may move into or may be encountering a different geographical region, environment, or situation (e.g., the time of the day, weather, etc.). The information relating to the environment, condition, situation, and/or etc. (i.e., setting characteristic values) is received by the SCDC 407 as noted above. If a change in the setting is sensed (e.g., day turns to evening, sunny to cloudy, country side environment to suburban environment), the C-DBMS 409 is queried, using the current set of the setting characteristic values.

More specifically, in some embodiments of the present invention, the SCDC 407 may determine to query the C-DBMS 409 based on one or more sensor/device data. For example, the SCDC 407 can be prearranged such that when weather changes from warm to cold (e.g., with specific temperature threshold), the C-DBMS 409 is queried using the current set of setting characteristic values received from the MTBC 403. In another example, when output of a clock indicates a sunset time according to the seasonal and geographical location information, the C-DBMS 409 is queried using the current set of setting characteristic values received from the MTBC 403. In another example, the output from a light sensor can be used to cause the SCDC 407 to query C-DBMS 409 using the current set of setting characteristic values received from the MTBC 403. In some other preferred embodiments, the SCDC 407 can determine to query the C-DBMS 409 periodically (e.g., every minute, certain number of minutes, tens of minutes, etc.) using the current set of setting characteristic values received from the MTBC 403. In yet some other embodiments, the SCDC 407 can determine to query the C-DBMS after elapse of a certain amount of time since the last query to the C-DBMS 409 using the current set of setting characteristic values received from the MTBC 403. In some other embodiments, the SCDC 407 can determine to query each time a set of setting characteristic values are received from the MTBC with the notice signal using the current set of setting characteristic values received from the MTBC 403. Various events described above that causes querying the C-DBMS 409 can be used individually or a combination thereof.

It should be noted that, after instantiating a new ImNN and having it process through input data to start generating output may take a number of clock cycles—a transition phase. The currently operational ImNN can be designated as a to-be-terminated ImNN during the transition phase. In some embodiments, as illustrated in FIG. 4b, during the transition phase, the to-be-terminated ImNN (that can be referred to as the old ImNN) can continue to run until a new ImNN is properly initiated (e.g., another fork created and instantiated with the coefficient set) and becomes operational (e.g., receiving input data and generating output data). In these embodiments, subsequent to (or simultaneous with) the new ImNN becoming operational, the to-be-terminated ImNN can be terminated. In another embodiment, during the transition phase, the to-be-terminated ImNN can be terminated at the end of the phase but run slowly (e.g., generating output every other clock cycle)—in this example, the to-be-terminated ImNN may not generate optimal output during the transition phase.

In another example embodiments, the next setting may be predicted. Information that is used to predict the next setting (e.g., neural network coefficients) may be referred to herein as "predictive information." For example, as a vehicle moves from a country side towards a city, the SCDC 407 can be configured to predict the approaching city setting (for example, by calculating the speed of the vehicle, the direction of the vehicle, and/or location information, e.g., GPS information, location information from other radio transmitters, location information determined from discerning physical items (e.g., through image recognition), sensors or makers, another wireless system, an inertial location system, and the like) and can be configured to instantiate a new ImNN with the city characteristics before the actual arrival at the city (e.g., with A) a new neural network executable module or B) the coefficients and/or structure, queried from the C-DBMS 409—that is, queried with predicted setting characteristic values). In these example embodiments, the new ImNN can start inferencing the input data and generating output at or before the vehicle crosses the city boundary from the country side. In other words, the new ImNN may run simultaneously with the current ImNN, but the output from the current ImNN may be used to control such a vehicle, as illustrated in FIG. 4c. As the vehicle crosses from a country side into a city environment, the output from the new ImNN may be used to control the vehicle while the current ImNN (that can be referred to as the old ImNN) is terminated. The new ImNN may run until a new setting is detected or predicted. In these embodiments, the length of the transition phase can be shortened. In FIGS. 4b and 4c, time flows from the left side to the right side.

Similar embodiments to shorten the transition phase can be contemplated with, for example, changing time (e.g., predicting the day time changing to evening time or night time changing to morning time), weather (e.g., approaching storm), temperature (e.g., from weather forecast), traffic congestion (e.g., from traffic report), and etc. It should also be noted that if the approaching setting is not predictable with certainty (e.g., weather forecast), multiple ImNNs case be pre-instantiated (e.g., based on possible approaching weather patterns).

Although FIG. 4 is explicitly showing one ImNN instantiated as part of the MC 405, in various embodiments of the present invention, more than one ImNN can be instantiated and become operational. In some preferred embodiments, various ImNNs (that is, they may have same/different sets of coefficients and/or same/different neural network structures) can be connected serially such that output from one ImNN are further inferenced by another ImNN. In some other preferred embodiments, various ImNNs can be connected in parallel such that input from one input source can be inferenced by various multiple ImNNs. Intermittent between various ImNNs, there can be logic/algorithm inserted to further process data, in some preferred embodiments (e.g., adding, combining, multiplying, and thresholding outputs from the various ImNNs). In the case of multiple ImNNs, the SCDC 407 has the corresponding control mechanisms for each of the instantiated ImNN.

The C-DBMS 409 can include searchable information associated with each setting. That is, for each setting, the C-DBMS 409 can include information on ranges of setting characteristic values (which can also be referred to as setting characteristic value ranges) and an associated set of coefficients and/or neural network structure. The C-DBMS 409 can be searched based on the setting characteristic values to find a set of coefficients and/or neural network structure for a given setting characteristic values.

Table 1 below illustrates a table of searchable entries for the purpose of illustrating information that can be stored and organized into a database, such as the C-DBMS 409. Various embodiments of the present invention contemplate using one or more of the database types: text based, document based, hierarchical, relational, or object-oriented database management systems. Also, Table 1 illustrates one-to-one relationship between the sets of setting characteristic value ranges and sets of coefficients/neural network structures. Each entry is numbered as #1, #2, #3, . . . , #n. Various embodiments of the present invention allow many-to-one or one-to-many relationships between the set of setting characteristic value ranges and the set of coefficients/neural network structures.

TABLE 1

| Entry # | Time | Location | Weather | Ambient Temp | ... | Structure | Coefficient Array |
|---|---|---|---|---|---|---|---|
| 1 | Day time range | $1^{st}$ Ranges of Latitudes Longitudes | Sunny | Above freezing | | feedforward | $1^{st}$ set of coefficients [. . .] |
| 2 | Day time range | $2^{nd}$ Ranges of Lats + Longs | Cloudy | Above freezing | | feedforward | $2^{nd}$ set of coefficients [. . .] |
| 3 | Night time | $3^{rd}$ Ranges of Lats + Longs | Rain | Above freezing | | Back propagation | $3^{rd}$ set of coefficients [. . .] |
| ... | | | | | | | |
| n | Evening twilight | $N^{th}$ Ranges of Lats + Longs | Sunny | Freezing | | Restricted Boltzmann | $N^{th}$ set of coefficients [. . .] |

Although Table 1 illustrates various pieces of information (e.g., setting characteristic value ranges, coefficients, and structure) that are placed in one location (that is, Table 1), various embodiments of the present invention contemplated other embodiments in which the pieces of information can be located in remote locations from each other but linked for the database to function.

Table 1 above depicts various information that can be stored in C-DBMS 409. The top row lists example setting characteristic types: time, location, weather, ambient temperature. The top row also lists descriptive names for other columns: structure and coefficient array. The top row is provided for the ease of explaining various columns of information. In this example, the Time refers to input from a clock, the location refers to latitude and longitude from a GPS device, the weather refers to information from a barometer, a light sensor and/or a moisture sensor, and the ambient temperature refers to input from a thermometer.

The descriptive names "Structure" refers to a neural network structure, and "Coefficient Array" refers to a set of nodal coefficients for the neural network structure. In various preferred embodiments, the information contained in the columns of Coefficients Array and Structure combined is sufficient to instantiate corresponding neural network(s) for the associated setting.

In first example preferred embodiments, each of the entries has a neural network structure, which may include a pointer to an executable module in a library of compiled sets of executable modules of neural networks. For instance, a library for Table 1 could include pointers to the executable modules of neural networks for feedforward, back propagation, and Restrict Boltzmann types (although other types can be also included). For a specific example, using entry #1, the "feedforward" in the column designated as the Structure can be a pointer to a particular version of a feedforward neural network executable module trained with training data set from the associated setting. The SCDC 407 can use the executable module and the set of corresponding coefficients in entry #1 to instantiate the feedforward neural network.

In second example preferred embodiments, the executable neural network modules may could already have been compiled with a specific set of nodal coefficients. For these example executables, the column in Table 1 designated as Coefficients Array may not be necessary—the pointers to the associated neural network executable module may be sufficient to instantiate the specified neural network, since these modules already have the coefficients compiled therein. Although the first and second examples of preferred embodiments above have been described in terms of computer programs/libraries, the library of neural networks can be implemented in hardware, firmware or combinations of hardware, firmware and software modules. In addition, instead of pointers, the modules themselves can be stored on the database as entries.

In various other preferred embodiments, the entries for the Structure entry may include information relating to the type of neural network and its basic layout, for example, nodal layers—input, output, hidden—and types of nodes, such as input node, hidden node, memory node, different memory node, convolutional node, probabilistic node, and etc. sufficient to generate automatically the corresponding executable neural network module—which then can be instantiated with the corresponding set of coefficients. In some of such preferred embodiments, the generated executable module then can be stored in the C-DBMS 409 for later use. It should also be noted that some executable neural network modules can be compiled with their corresponding coefficients, while other executable neural network modules can be complied without coefficients already specified (for these embodiments, the entries in the "Coefficients Array" may be needed. It should be noted that a database (e.g., the C-DBMS 409) can be configured to store a mixture of entries that have pointers to neural network modules with/without coefficients already compiled therein, neural network modules rather than pointers, or information sufficient to generate executable neural network modules.

Returning back to Table 1, for each of numbered entries, ranges of values are provided for each setting characteristic type. For example, the time has a range (e.g., day time or night time), the location has ranges of latitudes and longitudes to indicate a particular region (e.g., a desert area bound by a set of latitudes and longitudes that can be compared with GPS data from the MTBC 403). In other words, for each entry (e.g., an entry representing a setting) each type of characteristics (e.g., Time, Location, Weather, and Temperature) of a setting is defined with a range of setting characteristic values, which can be referred to as a range of values.

Various sensors/devices on the MTBC 403 may generate setting characteristic values which are matched with each entry—determining if the values received on setting data 411 fall within the ranges provided. For example, the setting characteristic values can be: a clock indicates 10 AM, a GPS may input latitudes and longitudes that fall within the 1$^{st}$ ranges, a light detector may indicate sunny, and a thermometer inputs 10 degrees Celsius. In this example the received values on setting data 411 fall within the setting characteristic value ranges of the first entry. In this case, the associated set of neural network coefficients is the 1$^{st}$ set of coefficients and the associated neural network structure is a feedforward neural network of the entry designated as #1. Another set of setting characteristic values may match with one of ranges defined for entries #2, #3, . . . , #n.

In sum, Table 1 can be described as each entry (e.g., #1, #2, #3, . . . , #n) having setting characteristic value ranges that corresponds to characteristics of a setting. For example, if the 1$^{st}$ Ranges of Latitudes Longitudes may cover a desert area boundaries, this means the characteristics of entry #1 can be a setting that is a desert area, daytime, above freezing and sunny.

Although the selection process is described above as using the setting characteristic values and the setting characteristic value ranges, in other various embodiments of the present invention, the selection process can be performed by probabilistic algorithms. That is rather than search only for the entry that the setting characteristic values fall within the setting characteristic value ranges, proximity to those ranges can be calculated. The entry being the closest (e.g., having the largest number of the setting characteristic values fall within the given setting characteristic value ranges) to the setting characteristic values can then be selected.

Even though, the setting characteristic values are defined using numerical ranges of values in Table 1, in other preferred embodiments, other methods can be used to represent ranges. For example, in some embodiments image(s) can be used to represent the ranges (e.g., images of grey sky to represent the ranges of cloudy sky). In this example, the images representing the ranges can be further processed to turn them into a set of numerical values or use them as images in matching images received from a camera.

In some embodiments of the present invention, a subset of the setting characteristics can be used to locate the coefficient arrays. In another preferred embodiment, more types of setting characteristic values from different sensors/devices can be added as indicated by the column with " . . . " (e.g., traveling speed, language spoken, ethnic group, and etc.)

Also, in some embodiments, the column for the structure may not be necessary if all neural networks to be employed have the same structure.

In some preferred embodiments, the C-DBMS 409 can also include a process map for each setting. In various embodiments of the present invention, a process map can be a neural network workflow, a neural network schema, or a neural network descriptive document. In an example, a process map can include multiple ImNNs (each with a corresponding A) sets of coefficients and/or a neural network structure associated with the data values or B) the neural network executable modules (or pointers thereto) having the structure and/or the coefficients) connected serially, in parallel, or in combination with possible intermittent logic/ algorithm, as illustrated with an example in Table 2 (that is, the "n" entry therein). In these preferred embodiments, the C-DBMS 409 query results in a process map. The SCDC 407 interprets the process map and instantiates neural networks in accordance with the process map.

TABLE 2

| Entry # | Time | Location | Weather | Ambient Temp | . . . | Structure | Coefficient Array |
|---|---|---|---|---|---|---|---|
| 1 | Day time range | 1$^{st}$ Ranges of Latitudes Longitudes | Sunny | Above freezing | | feedforward | 1$^{st}$ set [. . .] |
| 2 | Day time range | 2$^{nd}$ Ranges of Lats + Longs | Cloudy | Above freezing | | feedforward | 2$^{nd}$ set [. . .] |
| 3 | Night time | 3$^{rd}$ Ranges of Lats + Longs | Rain | Above freezing | | Back propagation | 3$^{rd}$ set [. . .] |
| . . . | | | | | | | |
| n | Evening twilight | N$^{th}$ Ranges of Lats + Longs | Foggy | Above freezing | | Map: Input to two feedforward neural networks Sum the output from the two nets then the sum to a back propagation | Array for the first feedforward Array for the second feedforward Array for the back propagation |

In some embodiments, the entries that populate the C-DBMS 409 are made in such a way that there is i) no overlap between the possible setting characteristic values between different settings and ii) no null space between or outside the possible setting characteristic values between different settings. In these embodiments, when a query is made to the C-DBMS 409 by the SCDC 407 with the received setting characteristic values from the MTBC 403, one entry will be matched among the entries on the C-DBMS 409 and the information (e.g., A) the pointer to one matching neural network executable module or B) the values of a set of the coefficients and neural network structure thereof) will be sent back to the SCDC 407. An example of these embodiment is entries for 48 contiguous States—each entry defining the ranges of longitudes and latitudes for a State. In this embodiment output from a GPS device should fall into one of the 48 entries, and there is no null space between the ranges for the States. If the GPS is to operate within the 48 States, there is no null space outside thereof.

In some other embodiments, there can be some null spaces between or outside the possible setting characteristic values. An example of these embodiments is an entity training neural networks for automated machines that are to operate within large cities. Such a set of entries may have null spaces outside the large cities. In these embodiments a null value will be sent back to the SCDC 407, when a set of setting characteristic values falls into a null space. The SCDC 407 in turn can instruct the currently operational ImNN to continue to operate. There can be other instructions such as stop operating the entire automated machine, or send a signal for an augmented manual operation. More on the input sample data being outside the input sample space is described below in connection with FIG. 11A.

In some other embodiments, there can be overlaps between the possible characteristic values. The overlaps can be partial or complete. If the C-DBM 409 is queried with a set of setting characteristic values that falls within such an overlap, the C-DBMS 409 can return more than A) one neural network executable modules or B) one set of coefficients and neural network structures. An example of these embodiments is an entry for large cities and entry for the downtown of the large cities. These two entries could overlap. In these embodiments, the SCDC 407 can determine to use one of the more than one set returned from the C-DBMS 409. In one example, the SCDC 407 can use the set that cover the largest geographical area or use the set that cover the smallest geographical area. This feature of using geographical setting characteristic value ranges to address overlaps can be applied to other setting characteristics and/or a combination thereof.

In some embodiments, a neural network confidence level for each entry can be included as another column to, e.g., Table 1. The confidence level for each entry represents the confidence level for the neural network that is instantiated. For ease of reference, this confidence level is referred to as a neural network (NN) confidence level, which is different from an output confidence level. As noted above, an output confidence level is the confidence level of the selected class (i.e., output) for given input data being the correct one based on the scores of other classes. An NN confidence level can be determined based on probabilistic analysis of the training data set. For example, training data set having a narrow distribution among input sample values may be given a higher NN confidence level compared with another training data set having a broad distribution among its input sample values or vice versa depending on settings and/or applications. In another example, in some embodiments a training data set is associated with a testing data set. The NN confidence level can be the score of correct outcomes of a particular neural network after inferencing with such a testing data set. In yet another example, a neural network with floating point nodal operations (and/or the output therefrom) may be assigned to a higher confidence level compared with a neural network with integer number nodal operations or a neural network with LUT nodal operations (which may be assigned to have the lowest confidence level).

In the embodiments with NN confidence levels, the entries returned by the C-DBMS 409 because of the overlap may also have the NN confidence levels. The SCDC 407 can use the values of the NN confidence levels, e.g., pick the entry with the highest NN confidence level.

It should be noted that different parts of the embodiments of the present invention can be implemented by different manufacturing entities. That is, the sensors and various components on the MC 405 can be manufactured by one or more entities, while the C-DBMS 409 entries can be populated by other manufacturing entities. In other words, this allows some manufacturers to concentrate on improving sensors and such, while allowing other manufacturers/entities to concentrate on improving the accuracies of ImNNs. For these example embodiments, the electronic format of the entries for the C-DBMS 409, the type of database management system used, and others may be specified (e.g., standardized) such that the C-DBMS 409 can be populated, queried, receive results of queries, and updated by different entities. Another aspect of these advantages of the present invention may be that the user of the SCDC 407 is allowed to test the accuracy of the entries in the C-DBMS 409 to accept or reject after testing. In some embodiments, an NN confidence level can be assigned to each of the entries in the C-DBMS 409.

Without storing the coefficients for different settings on a database management system, numerous neural networks can be deployed on the automated machine (i.e., the coefficients already fixed for each deployed neural network as in example embodiments described above in connection with Table 1). However, such arrangement requires numerous neural networks and may not be adaptable to new settings without updates to the deployed neural networks.

Figure 5:
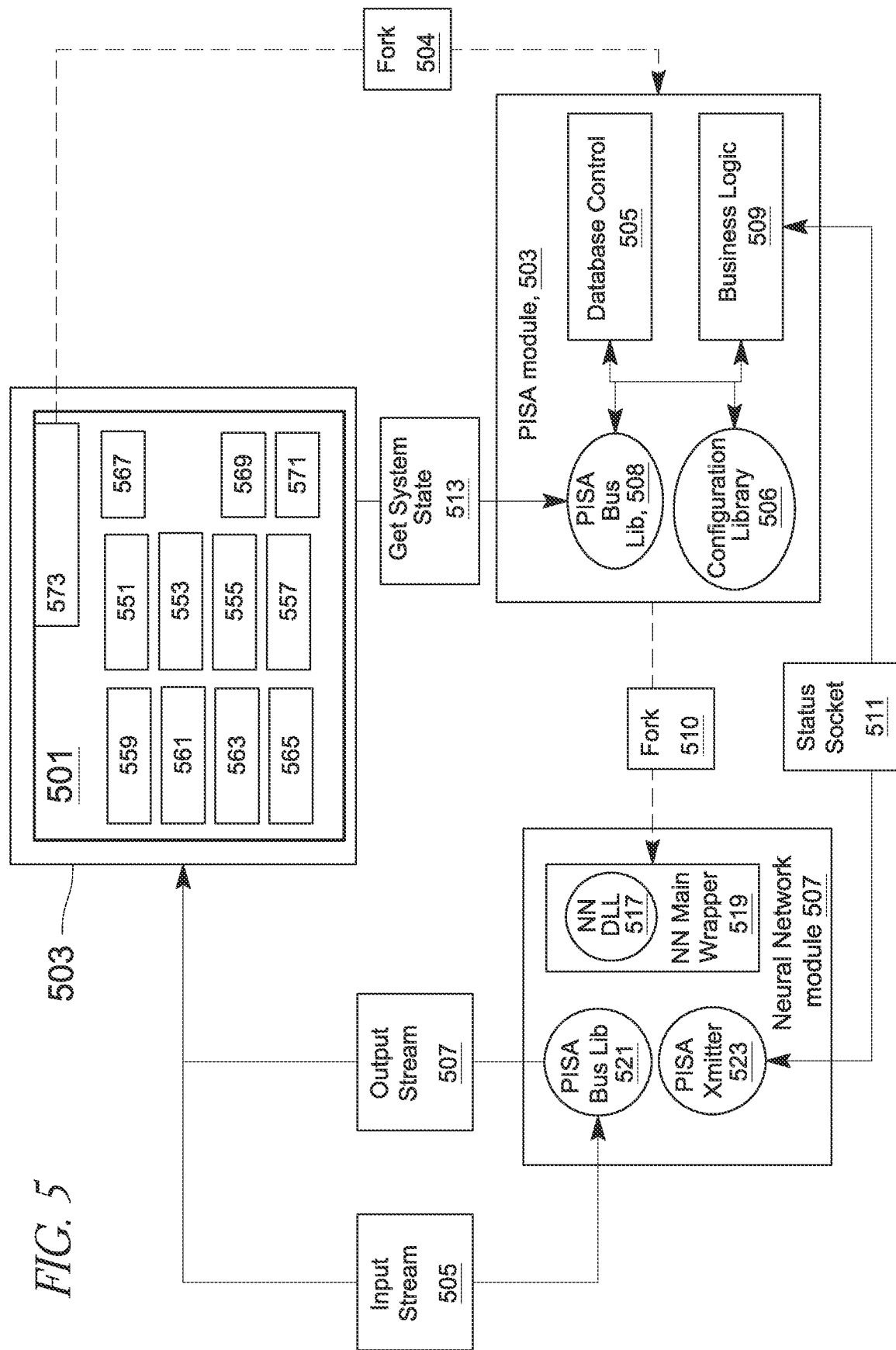
FIG. 5 is a block diagram illustrating an example preferred embodiment of a controller that can allow a plug-in architecture.

In some embodiments, the controllers—MC 405, SCDC 407, and C-DBMS 409 can be setup as standalone processes communicating with inter-process communication (IPC) protocols, as described in more detail below in connection with FIG. 5.

5. Plug-In Smart Architecture (PISA)

Various preferred embodiments described above can be implemented on a computing machine, for example, as a set of modules on a processor. FIG. 5 illustrates such an example preferred embodiment, which is described in terms of modules created using various memory spaces on a processor and in terms of various aspects of the operations of the modules. Each module can be considered as an individual machine when being operational (e.g., executing stored instructions) on a processor. In particular, a system module 501 (an example embodiment of the MTBC 403) may initiate a PISA module 503, which is an example implementation of the SCDC 409. This initiation can be performed by creating a fork 504 by a control process 573, which in some embodiments control the status and/or the operations of the PISA module 503 and the neural network module 507. The system module 501 can also initiate the input data stream 505 and initiate the output data stream 507 with a handle (e.g., a pointer) for the input stream 505 and another handle for the output stream 507, respectively.

The system module 501 created in memory space 503 can include interfaces to send/receive input/output to/from various sensors/devices such as a light-detecting and ranging radar (LIDAR) 551, global positioning system (GPS) 553, inertial measurement unit (IMU) 555, camera sensors 557 or the like. The system module 501 can have its own controlling algorithms relating to sensing 559 (receiving data from various input sensors/devices, perception 561 that analyzes the received data, decision 563 for making decisions based on the perceptions, and/or planning 565 to carry out the decisions. Output from all or subparts of the controlling algorithms can form a part of the input data stream 505, in addition to various sensors/devices with which the system module 501 is configured to interface. The various steps can be performed on real-time operating system (OS) 567 and on a Graphical Process Unit (GPU) 569 and/or Floating Points Graphical Accelerator (FPGA) 571.

The PISA module 503 may perform the following tasks:
a. Gets the System State 513 (e.g., the values of the current setting characteristic values in FIG. 4) through, for example, the PISA Bus Library 508, which can be a library of interfaces that allows the PISA module 503 to interface with the Neural Network module 507 and the system module 501 in carrying out various functions/algorithms/routines as described in this Section.

b. PISA Database Control 505 is configured to interface with (including querying) a Configuration Library 506 (e.g., C-DBMS 409). The Configuration Library 506 contains various neural network Coefficients Array and Structures (e.g., Table 1). Based on the System State values, the corresponding neural network coefficients and/or neural network structure(s) are retrieved from the Configuration Library 506. In turn, the retrieved neural network coefficients and/or neural network structure(s) are used to instantiate a neural network module 507.

c. PISA Business Logic 509 can send/receive the status information of the neural network module 507 (e.g., the MC 405). The neural network module 507 can be created by a fork 508 in a new memory space as well as assigned with a listening socket 511. This socket 511 can be used to share current status of the neural network module 507 with the PISA module 503.

d. PISA Bus Lib 508 may continually poll for the current System State
  i. If the System State changes to a different state (that is, the setting changes) from the previous state, the following may occur:
    1. The PISA (Business Logic) 509, which contains various functions/algorithms/routines as described in this Section, initiates a kill process through the status socket or
    2. The PISA (Business Logic) 509 initiates a suspend process through the status socket or
    3. The PISA (Business Logic) 509 initiates an update system configuration process through the status socket.
    4. Step b above may be followed by the above 1 or 2 or 3 processes.
  ii. If the System State does not change, no action is taken.

e. PISA (Business Logic) 509 can review the status from the Neural Network module 507 and communicates status to the System module 501 via the PISA Bus Lib 508.

Neural Network module 507 (instantiated via a fork 510 from the PISA module 503) may perform the following tasks:

a. The Neural Network module 507 initiates a neural network dynamically linked library (NN DLL) 517 (e.g., ImNN in FIG. 4) within the module's memory address space;

b. The PISA Bus Lib 508 establishes connection to System Input Stream 505;

c. The PISA Bus Lib 508 establishes connection to System Output Stream 507;

d. PISA Xmitter 523 establishes the Status Socket 511 back to the PISA module 503;

e. The NN DLL 517 may perform the following:
  i. The NN DLL 517 processes data from System Input Stream 505 to generate results for System Output Stream 507 via the PISA Bus Lib 508 (that is, performs inferences on the Input Stream);
  ii. NN DLL 517 pushes status via the PISA Xmitter 523 through the Status Socket 511 on regular intervals to the PISA module 503;
  iii. NN DLL 517 processes requests from the PISA module 503 as requested to include:
    1. Kill current NN DLL 517 process
    2. Suspend current NN DLL 517 process
    3. Update system configuration It should be noted that in some preferred example embodiments, the PISA Bus Lib 508, the PISA Bus Lib 521 and another PISA Bus Lib (not shown) on the system module 501 can be the same set of interface routines/managers. In other example preferred embodiments, the PISA Bus Lib on the system module can have the largest set, a subset of which is included in the PISA Bus Lib 508, and in turn a subset of which is included in the PISA Bus Lib 521.

Figure 6:
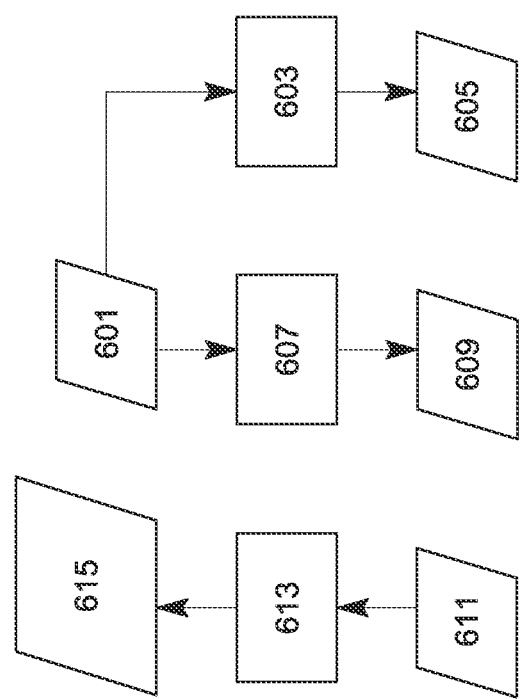
FIG. 6 is a flowchart illustrating various process steps for the system level shown in FIG. 5.

FIG. 6 illustrates various preferred steps performed by the system module 501. In step 601, raw data (as received from the system module 501 but the system module 501 may have performed some operations the data) from various sensors/devices are collected. In step 603, system state is generated (predefined output data from various sensors and/or devices interfacing with the system module 501). In step 605, the stored system state becomes available to be shared with other modules. In step 607, system input data is generated (predefined output data from various sensors and devices interfacing with the system module 501, and not necessarily the same data compared with the system state generated in step 603). In step 609, the input data stream is generated, which is the system input stream 505 in FIG. 5. In step 611, the output data stream (the system output stream 507 in FIG. 5) is obtained from the neural network module 507. In step 613, system output data is generated. In step 615, the generated system output data is processed to be used in controlling various components interfacing with the system module 501.

Figure 7:
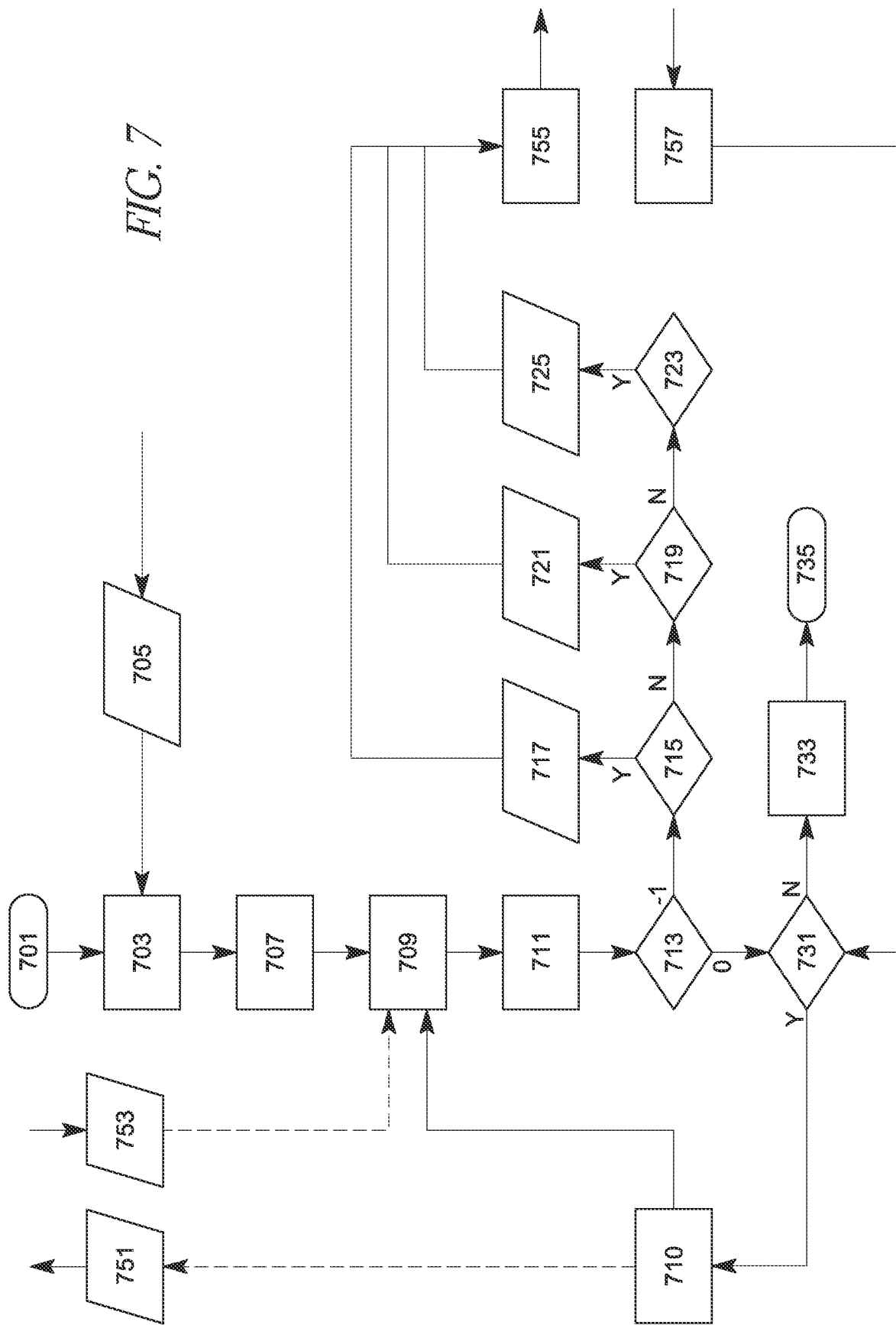
FIG. 7 is a flowchart illustrating various process steps for the neural network shown in FIG. 5.

FIG. 7 illustrated various preferred steps performed by the neural network module 507, with step 701 as a starting point. In step 703, information is read for the neural network to be instantiated such as neural network coefficients and/or neural network structure(s). The neural network coefficients/structure(s) can be part of the signal for MC 417, illustrated in FIG. 4, and can be stored in memory as in step 705. A neural network can be initiated with the read the neural network coefficients/structure(s) in step 707—in the example of FIG. 5 only one neural network is instantiated that is designated as NN DLL and designated as ImNN in FIG. 4. Once initiated, the NN DLL starts its operations—including reading input data stream (step 709). The input data stream (step 753) is received from the system module 501, for example. The NN DLL then performs the function of inferencing (step 713) on the input data stream. After each inferencing performed on each set of input data stream, the NN DLL can issue a status to indicate the inference was normal or not.

When the status of the inferencing performed is checked in step 713, if it is not a normal operation (the branch marked with "−1" for step 713), the status is checked for an error in step 715. If there is error, the error code is written out, step 717. The error code is sent over the status socket 511 in step 755. If there is no error code, the status is checked for a warning code, step 719. If there is a warning code, the warning code is written out, step 721. The warning code is sent over to the status socket 511 in step 755. If there is no warning, the status is checked from information to be sent back to PISA 503. If there is information, the information is written out, step 725. The information is sent over to the status socket 511 in step 755.

When the status of the inferencing performed is checked in step 713, if it is a normal operation (the branch marked with "0" for step 713), an operational flag is checked (step 731). The operational flag set based on the "set action" 757 received from the PISA. If the operational flag is set to be on, the "Y" branch is taken and the NN wrapper writes the output of the instantiated neural network as output data stream (step 710) to be read by the system 501 (step 751). If the operational flag is set to be off, the "N" branch is taken and the NN is terminated in step 733, which ends the operation of the NN wrapper in step 735. Here, an example of an error code is generated when an unrecoverable error has occurred and the NN DLL 517 is to be terminated. An example of a warning code is generated when a recoverable error has occurred and a warning message is to be sent to the PISA module 503. An example of an information code is when the NN DLL 517 completes a task without an error.

Figure 8:
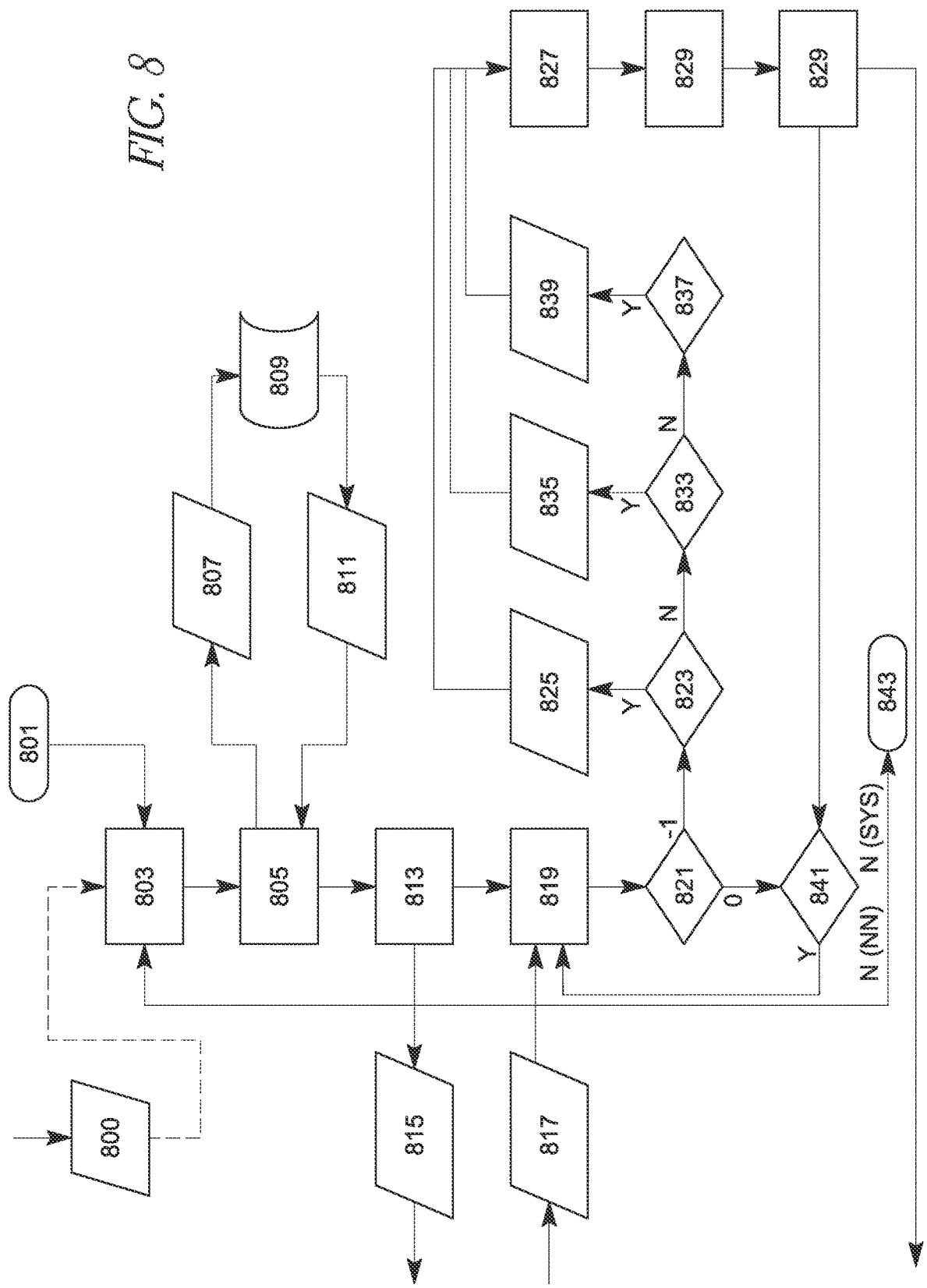
FIG. 8 is a flowchart illustrating various process steps for the PISA module shown in FIG. 5.

FIG. 8 illustrated various preferred steps performed by the PISA module 503 with step 801 as a starting point. The box 800 depicts a set of system state values that are read when the Get System State 513 is performed. In step 803, the input system state (e.g., setting characteristic values) is read. The input system state includes the set of system state values (box 800) and status information from the NN wrapper in step 755. If it is determined that a new set of neural network coefficients and/or structure are needed based on the input system state, then in step 805 is performed—that is, the values of the input system state is sent (in step 807) to the coefficient DBMS (step 809) which outputs the neural network coefficients and/or neural network structure associated with the input system state, in step 811. An instruction to instantiate is sent over to the neural network module (in step 813) along with the aforementioned coefficients and/or structure information 815. The neural network module then sends a status information 817, which is received in step 819.

When the status is checked in step 821, if it is not a normal operation (the branch marked with "−1" for step 821), the status is checked for an error in step 823. If there is error, the error code is written out, step 825. The error code is written as a system status in step 827. If there is no error code, the status is checked for a warning code, step 823. If there is a warning code, the warning code is written as a system status in step 827. If there is no warning, the status is checked from information code. If there is information code, the information is written as a system status in step 827. Here, an example of an error code is generated when an unrecoverable error has occurred and the NN DLL 517 is to be terminated. An example of a warning code is generated when a recoverable error has occurred and a warning message is to be sent to the PISA module 503. An example of an information code is when the NN DLL 517 completes a task without an error.

The system status is interpreted to determine an action in step 829, and the determined action is sent in 831 to determine if the neural network module is to continue to inference—and to the NN Module. If it is determined to continue, the PISA module continues to execute. If it is determined to terminate, then the PISA module is terminated.

The pseudo-computer program provided in the section below (at the end of this disclosure) is an example preferred implementation of the present invention. In particular, PISAController performs the following steps:

a. determines, using the command line arguments, the NN implementation class name and potentially a setting/co-efficient set database implementation class name.

b. initializes a class called PISANN. Note that the implementation class name which is capable of both inheriting the PISANN class and implementing the PISAInterface. This ensures that access to the methods is available to the PISAController main section and ensures that the correct methods are completely implemented by the dependent section(s).

c. dynamically loads the primary NN and if specified, the setting/co-efficient set database. The resulting dynamic allocation does not require pre-compiled knowledge of the class. Also, PISAController has no need to have the insight into the inter-workings of the dynamically loaded neural network (NN).

d. determines if the PISANN has been pre-trained or trained on instantiation. If not, the main class is exited since the incoming NN needs to be trained prior to execution in this embodiment.

e. determines if the PISANNDatabase is available and connects to the NN database. If not available, in this embodiment, a default database is provided to the PISANNDatabase for use during operations.

f. initiate PISAInputDataHandler based on the command line arguments. All input data can be pulled directly from the PISAInputDataHandler. This class can be modified to support multiple sources (e.g. database, files, real-time feeds, sensor feeds).

g. initiate PISAOuputDataHandler based on the command line arguments. All output data can be pushed directly into the PISAOutputDataHandler. This class can be modified to support multiple sources (e.g. database, files, real-time feeds, sensor feeds).

h. initiate PISAEvent based on the command line arguments. This class can be modified to support multiple system event types (e.g. change in settings from location-based sensors or GPS, change in settings from temperature sensors, etc.). The PISAEvent can be evaluated at any time during system processing. In this embodiment, the PISAEvent is check on each iteration of new input data.

i. runs through input data gathered from the PISAInputDataHandler performing inference with the PISANN where inference results are placed into the PISAOutputDataHandler. For each iteration, the PISAEvent is checked for an updated status. If a PISAEvent has a changed status, new coefficients are retrieved from the PISANNDatabase, applied to the PISANN, and processing continues with the current PISAInputDataHandler and PISAOutputDataHandler. If no coefficients are available, the PISAController terminates. In this example embodiment, the PISAController continues to run until the data provided stops being produced from the PISAInputDataHander.

6. Boundary Conditions of Input and Output Spaces

Figure 9B:
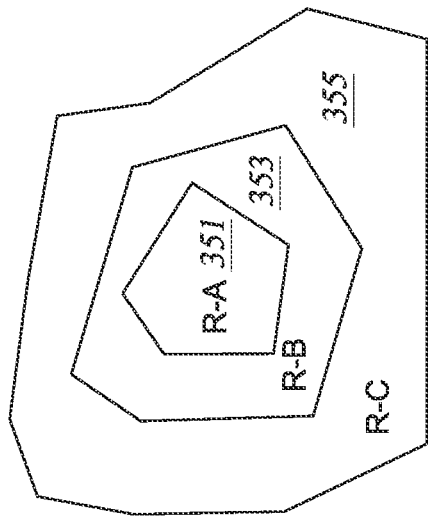
FIG. 9*b* is a diagram illustration a two-dimensional decision space with multiple boundary condition regions.
Figure 9A:
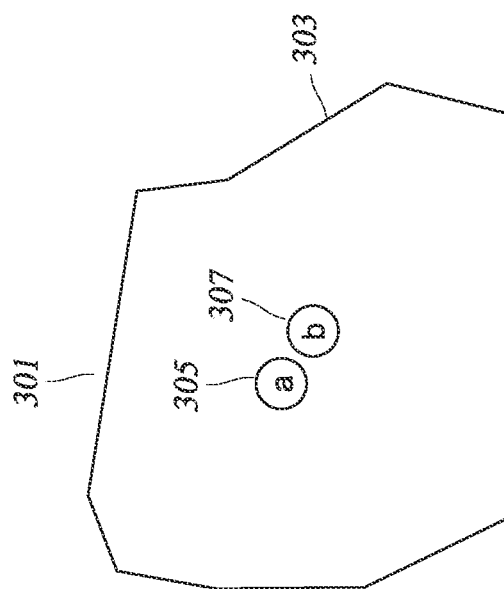
FIG. 9*a* is a diagram illustrating a two-dimensional decision space with two potential classification groupings.

FIG. 9a graphically illustrates a simplified decision-making space 301 that shows both the input data space and output results from neural networks. In particular, outer polygonal boundary 303 may depict the entire input sample space (e.g., the decision-making space) in two dimensions, and two smaller circles, 305 and 307, located therein may depict validated output classes. A neural network can be constructed (e.g., instantiated having a given set of coefficients and a particular neural network structure) and trained using sample input data, either supervised or unsupervised, to classify input data into output categories. It should be noted that in some preferred embodiments, output can be generated from a node(s) of an output layer or a node(s) from a layer between an input layer and an output layer. Here, structuring a neural network includes selecting an appropriate neural network structure (e.g., convolutional neural network, CNN) and providing an adequate number of nodes and layers of nodes for the given classification goal. In one example embodiment, the sample space may represent two features from a set of images, the polygon 303 representing the entire range in which values of those two features can take for the sample images. Continuing with the example, one class 305 can be images that have pictures of cats, and the other class 307 can be images that have pictures of dogs. Here, a neural network can be constructed and trained using training sample images to inference (e.g., classify) whether an image contains a picture of a cat, a dog, both, or neither. The input space bound by 303 can be considered for the entire sample space of one particular setting. In one example, a different setting may have input sample space that does not overlap with the space 303. Under this example, the input samples themselves may indicate a different setting that requires A) a new neural network executable module or B) a new set of coefficients and/or neural network structure—that is, when examining input samples, if it is outside the sample space for a given setting, this may indicate a need to query a database (e.g., C-DBMS 409). In one example, the input space 303 may represent the entire input space for images collected in a desert setting. In such an example, when the setting changes to a forested region, the images collected in the forested region may not fall within the input space 303.

Figure 10A:
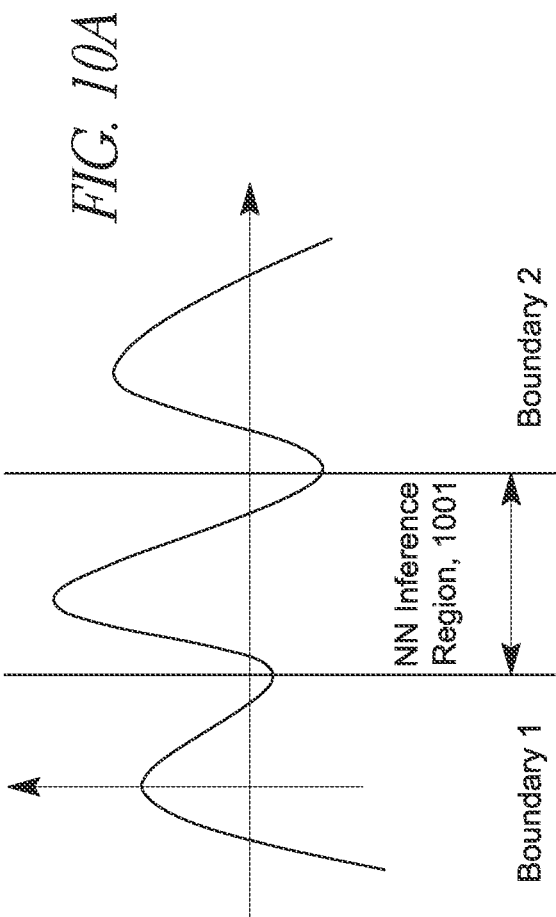
FIG. 10*a* is a diagram illustrating a one-dimensional decision space with two potential classification groupings.
Figure 10B:
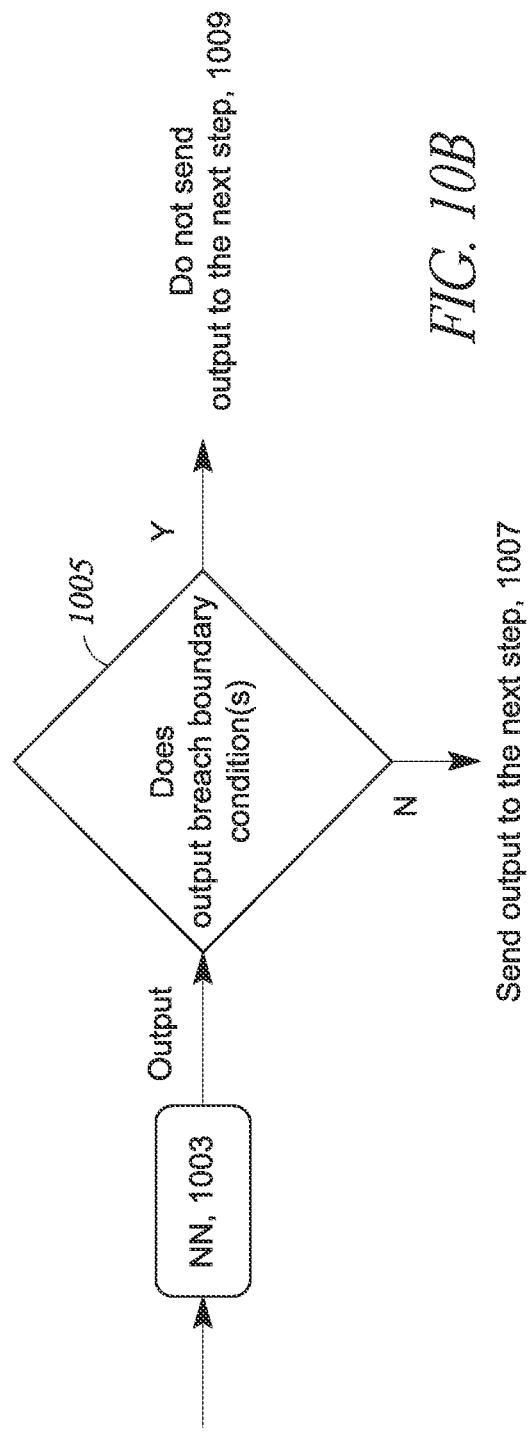
FIG. 10*b* is a flow chart illustrating a set of steps in using boundary conditions in a control system.

In some embodiments of the present invention, boundary conditions in the output space is used in operating/controlling neural networks, ImNNs. In connection with FIG. 9*b*, a set of boundary conditions can be described as allowing the output of a neural network to be only within a certain range—e.g., Region A 351, although the input data can be anywhere within the entire sample space as depicted in FIG. 9*a*. Referring back to FIG. 9*b*, if an output from a neural network constructed and trained to inference classes located within Region A, the output can be used in a subsequent processing, described below in connection with FIG. 12A below. However, if output of such a neural network is outside of Region A (e.g., Region B 353 or Region C 355 of FIG. 9*b*), the output can be discarded and not used. In another simplified depiction of FIG. 10*a*, the decision-making can be illustrated as a function in a one-dimensional space. In this simplified version, the boundary conditions are depicted as a range 1001 in which an output from a neural network is checked against.

Continuing on with the above output space description, in a simplified example, a neural network 1003 structured to inference input data 1002 to generate output can be instantiated. The output can be checked to determine against the output breach boundary cognition(s). If "no," the output is forwarded to the next step 1007 to be used by a machine to be controlled (e.g., MTBC 403). If "yes," this can be considered an event to query the C-DBMS and/or the output is not forwarded to the next step.

The step of determining the severity of breaching the boundary conditions can be illustrated in connection with FIG. 9*b*. That is, in some embodiments of the present invention, multiple sets of boundary conditions can be imposed. In the preferred example embodiment of shown in FIG. 9*b*, three regions are shown. The first region is referred to as Region A 351, in which the output from a neural network would have been forwarded to the next step in the processing chain. Output falling within Region A 351 is considered as not breaching the boundary conditions and/or satisfying the boundary conditions. The second region is referred to as Region B 353, in which the output could be considered as breaching (e.g., violating or exceeding) the boundary conditions but not harmful to the machine or anyone/anything surrounding the machine. In this case, the output can be ignored/discarded and not forwarded to the next step in the processing step. The third region is referred to as Region C 355, in which the output breaches the boundary conditions to such an extent that it could cause harm to the machine or to someone/something surrounding the machine. In such a case, the machine can be shut down immediately or the user can be notified that the machine needs to be used in its manual mode. In another example embodiment of the present invention, if the boundary condition is severely breached as Region C 355, a presumption can be made that the machine to be controlled is in a new setting. In this example, a database (e.g., the C-DBMS 409) can be queried to obtain A) a set of coefficients and/or a neural network structure associated with the received data values or B) the neural network executable module (or a pointer thereto) having the structure and/or the coefficients from the database that may match with the current setting characteristic values.

In an exemplary embodiment, a speech generator can be equipped with various features of the present invention. In particular, an exemplary preferred speech generator can be coupled to a user identifier such as a speech recognition system. Initially, the speech generator can be set to generate using a default setting (e.g., the predominant language of the geographical location in which the generator is placed) or a previous setting (e.g., the language spoken by a previous user). During the operation, the speech recognition system can be configured to determine the speech of the current user. If the language used by the current user is different from the default/previous setting (that is, outside the input sample space for the predominant language or the language of the previous user), the speech recognition system can be further configured to identify the language the user (e.g., English, German, French, etc.). If the user is speaking in a language different from the default/current setting, the C-DBMS 409 can be queried for the user's language, selected and loaded for generating speech in the language of the user. In some embodiments, the C-DBMS 409 can be queried for each new user.

Similarly, a facial recognition system can be set to identify a user by using a default setting (e.g., the predominant ethnic group in the geographical location in which the facial recognition system is placed) or a previous setting (e.g., the ethnic group of a previous user). During the operation, the facial recognition system can be configured to determine the ethnic background of the current user. If the ethnic background of the current user is different from the default/previous setting (that is, outside the input sample space for the predominant ethnic group or the ethnic group of the previous user), the facial recognition system can be further configured to identify the ethnic background of the current user. If the current user belongs to an ethnic group different from the default/current setting, the C-DBMS 409 can be queried for the current user's ethnic group, selected and loaded for facial recognition. In some embodiments, the C-DBMS 409 can be queried for each new user. A neural network trained with training data set for a narrowly defined setting (e.g., ethnic groups for facial, language, and/or regional accents in speaking languages) may yield more accurate results than a neural network trained with broad, disparate settings.

Some embodiments of the speech generator may include an implementation neural network constructed and trained to generate signals/data that can become human understandable phrases, sentences, and etc. when played on a loudspeaker. That is, when the ImNN of the speech generator outputs one of forbidden words, the trigger event detector recognizes it as a forbidden word (e.g., outside output boundary condition), and does not forward the output of the speech generator to a loudspeaker and/or terminates the currently running ImNN and instantiates a new ImNN having a different set of coefficients and/or different neural network structure.

Although boundary conditions have been illustrated in connection with one-dimensional decision space, two-dimensional decision space, speech generation, facial recognition contexts, the use of boundary conditions can be also expressed in terms of triggering events (that is a triggering event being a form of breaching a boundary condition), in terms of hard operating limitations of the machine being controlled, and/or in terms of using output confidence levels of the outputs of neural networks for given settings. In addition to expressing boundary conditions as triggering events, boundary conditions can also be viewed as expressions of the competence range in which a given neural network is constructed and trained to operate per a particular setting. Also, a different way to define boundary conditions can be in term of the output confidence level in connection with a given output from a neural network. In one example preferred embodiments, if the output confidence level of an output of a neural network falls below a predetermined level (e.g., below 60%), such an output can be discarded and/or A) a new neural network executable module or B) a new set of coefficients and/or structure can be searched and selected. In another example preferred embodiments, if the output confidence levels of two or more outputs of a neural network are similar (e.g., the same or only different marginally as in less than 5%), such a set of outputs can be discarded and/or A) a new neural network executable module or B) a new set of coefficients and/or structure can be searched and selected.

7. Triggering Event Detector

Figure 11A:
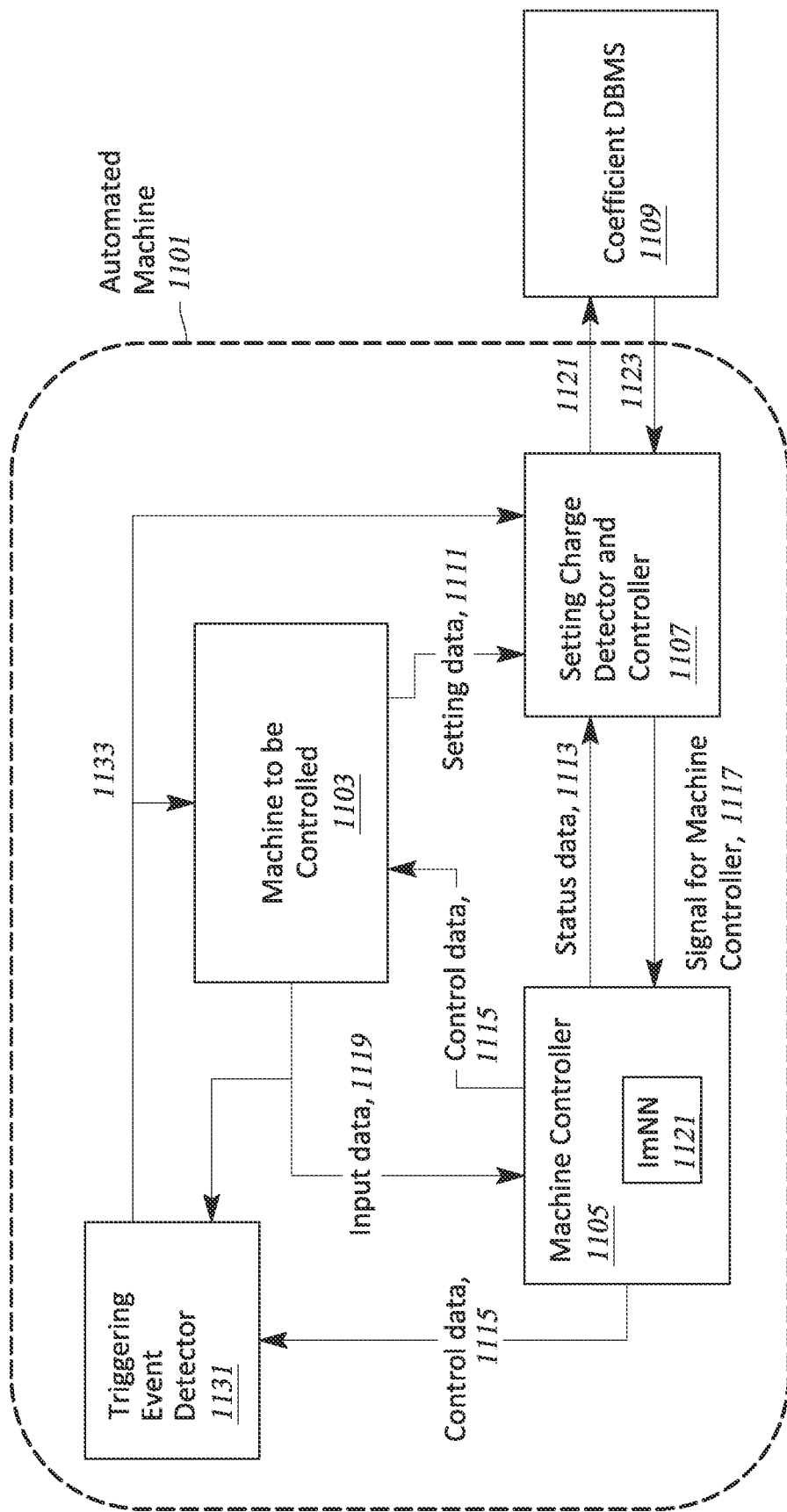
FIG. 11A is a block diagram illustrating an example preferred embodiment of an automated machine with a triggering event detector.

As shown in FIG. 11A, in some preferred embodiments of the present invention, a triggering event detector (TED) 1131 is included. In these embodiments, an MTBC 1103, an SCDC 1107, an MC 1105, an ImNN 1121, and a C-DMBS 1109 have features/functions/capabilities of the MTBC 403, the SCDC 407, the MC 405, the ImNN 421, and the C-DMBS 409, respectively, as described above in connection with FIG. 4. Also coupling mechanisms can be included such as: input data 1119 (two paths shown in FIG. 11A), control data 1115 (two shown in FIG. 11A), status data 1113, a signal for MC 1117 have features/functions/capabilities input data 419, control data 415, status data 413, a signal for MC 417, respectively, as described above in connection with FIG. 4. In addition, the MTBC 1103, the SCDC 1107, the MC 1105, the ImNN 1121, and the C-DMBS 1109 (and the coupling mechanism) are configured to work with the TED 1131 as described below.

The TED 1131 receives the input data from the MTBC 1103 and control data from the MC 1105. In various embodiments of the present invention, the input data and control data sent to TED 1131 can be synchronized. That is, the input data to the MC 1105 that caused certain control data to be generated by the MC 1105 after a process delay can be sent to the TED 1131 at the same time (or associated with each other) to be processed by the TED 1131. A triggering event can relate to input sample(s) being detected to be outside the input sample space for a particular setting and/or output data breaching the boundary conditions (either for a particular setting or a universal breach). In FIG. 11A, if a triggering event is detected, a signal 1133 send a notice to the MTBC 1101 and/or SCDC 1107. The notice can be an instruction to discard the output (synchronized with the input that caused the triggering event), or the notice can be an instruction to lower the NN confidence level that is instantiated on the ImNN 1121 (e.g., the SCDC 1107 notifies the CDMS 1109 to store the lowered confidence level for the corresponding A) neural network executable module or B) set of coefficients and/or its structure. In another preferred embodiment, upon receiving such a signal, the MTBC 1103 collects the setting characteristic values and sends them to the SCDC 1107, which in turn queries the C-DBMS 1109. In another preferred embodiment, upon receiving such a signal from the TED 1131, the SCDC 1107 uses the setting characteristic values to query the C-DBMS 1109.

Figure 11B:
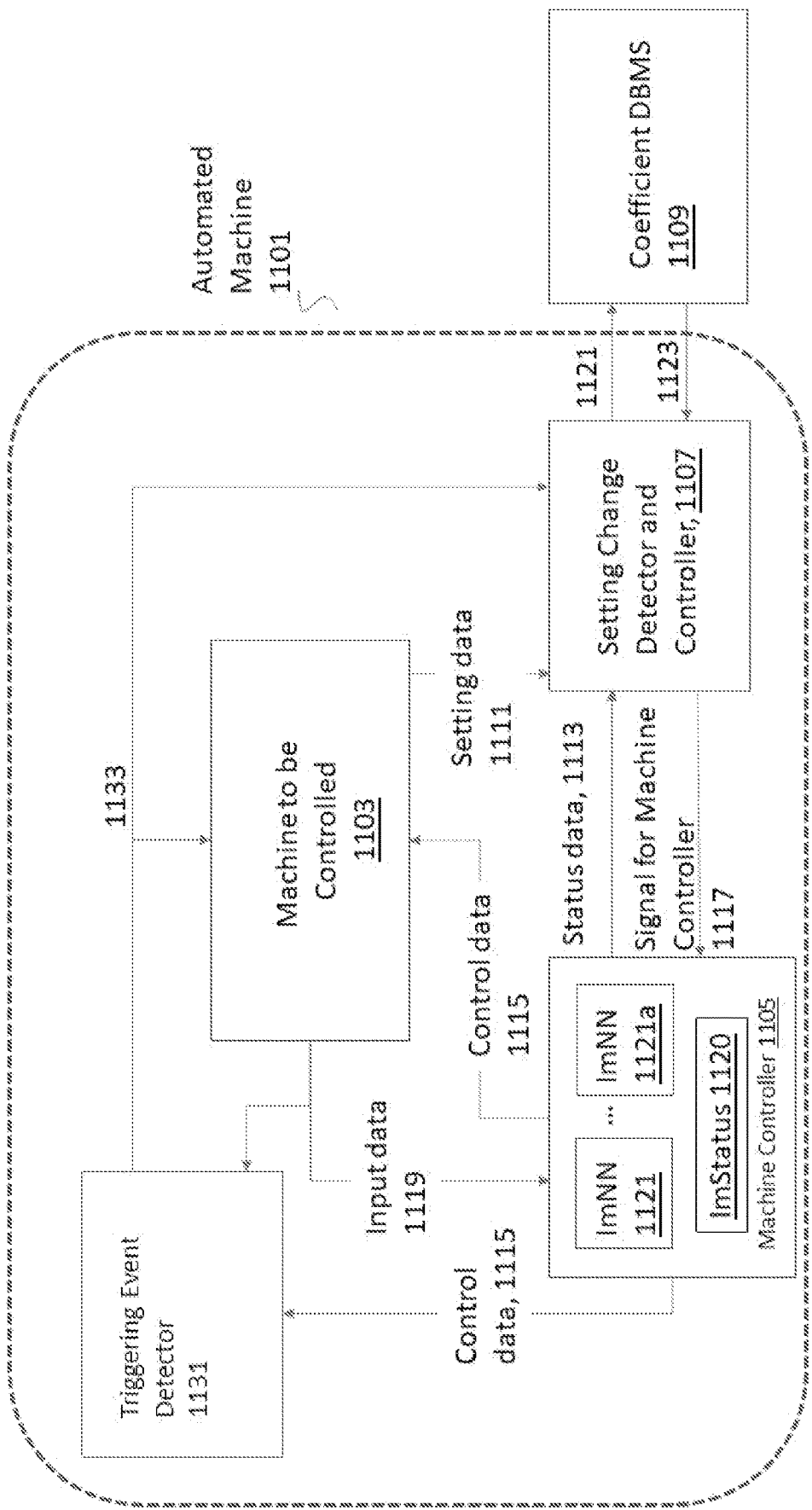
FIG. 11B is a block diagram illustrating an example preferred embodiment of the automated machine depicted in FIG. 11A with additional implementation neural network(s)

In some example embodiments, the MC 1105 may include additional ImNN 1121a and ImStatus 1120 in communication with the ImNNs 1121 and 1121a, as illustrated in FIG. 11B. Although one additional ImNN 1121a is depicted in FIG. 11B, the present invention contemplates embodiments with more ImNN(s) 1121a. Each instantiated ImNNs 1121a and 1121 can be identical to each other—that is, each can have identical set of coefficients and neural network structure being trained with an identical training data set. In other embodiments, some of the instantiated ImNNs 1121a and 1121 can have different sets of coefficients and neural network structures with different training data sets.

As such, a trigger event detector is an example of mechanism(s) in detecting/sensing boundary conditions. In some embodiments, the triggering event detector is implemented using a neural network that is constructed and trained to detect one or more of triggering events or a type of events. In other embodiments of the present invention, a set of logical steps in algorithms/heuristics can be used to detect one or more triggering events or a type of events. In some preferred embodiments, similar to the input sample space, the output space can also be defined by range of values. In these embodiments, logic to detecting a triggering event determines if the control data (i.e., output of the MC 1105) is outside the predefined output space. In yet some embodiments, the TED 1131 can have a neural network and a set of logical steps.

TABLE 3

| Entry # | Time | Location | Weather | Ambient Temp | Input Sample space | Boundary Conditions | ... | Structure | Coefficient Array |
|---|---|---|---|---|---|---|---|---|---|
| 1 | Day time range | $1^{st}$ Ranges of Latitudes Longitudes | Sunny | Above freezing | Input ranges | Output ranges AND/OR structure & coefficient array | | feedforward | $1^{st}$ set [...] |
| 2 | Day time range | $2^{nd}$ Ranges of Lats + Longs | Cloudy | Above freezing | Input ranges | Output ranges AND/OR structure & coefficient array | | feedforward | $2^{nd}$ set [...] |
| 3 | Night time | $3^{rd}$ Ranges of Lats + Longs | Rain | Above freezing | Input ranges | Output ranges AND/OR structure & coefficient array | | Back propagation | $3^{rd}$ set [...] |
| ... | | | | | | | | | |
| n | Evening twilight | $N^{th}$ Ranges of Lats + Longs | Sunny | Freezing | Input ranges | Output ranges AND/OR structure & coefficient array | | Restricted Boltzmann | $N^{th}$ set [...] |

As illustrated in Table 3 above, in some preferred embodiments, setting characteristic value ranges can also be associated with input sample space (e.g., defined by the ranges of input sample values) and output boundary conditions. In particular, an input space ranges is defined for a given neural network of Coefficients Array and Structure. The input ranges are used as described in connection with FIG. 11A (and not necessarily the output boundary conditions in that figure). Various preferred embodiments described below in connection with FIG. 12A, the input boundary conditions and output boundary conditions may be used.

Figure 12A:
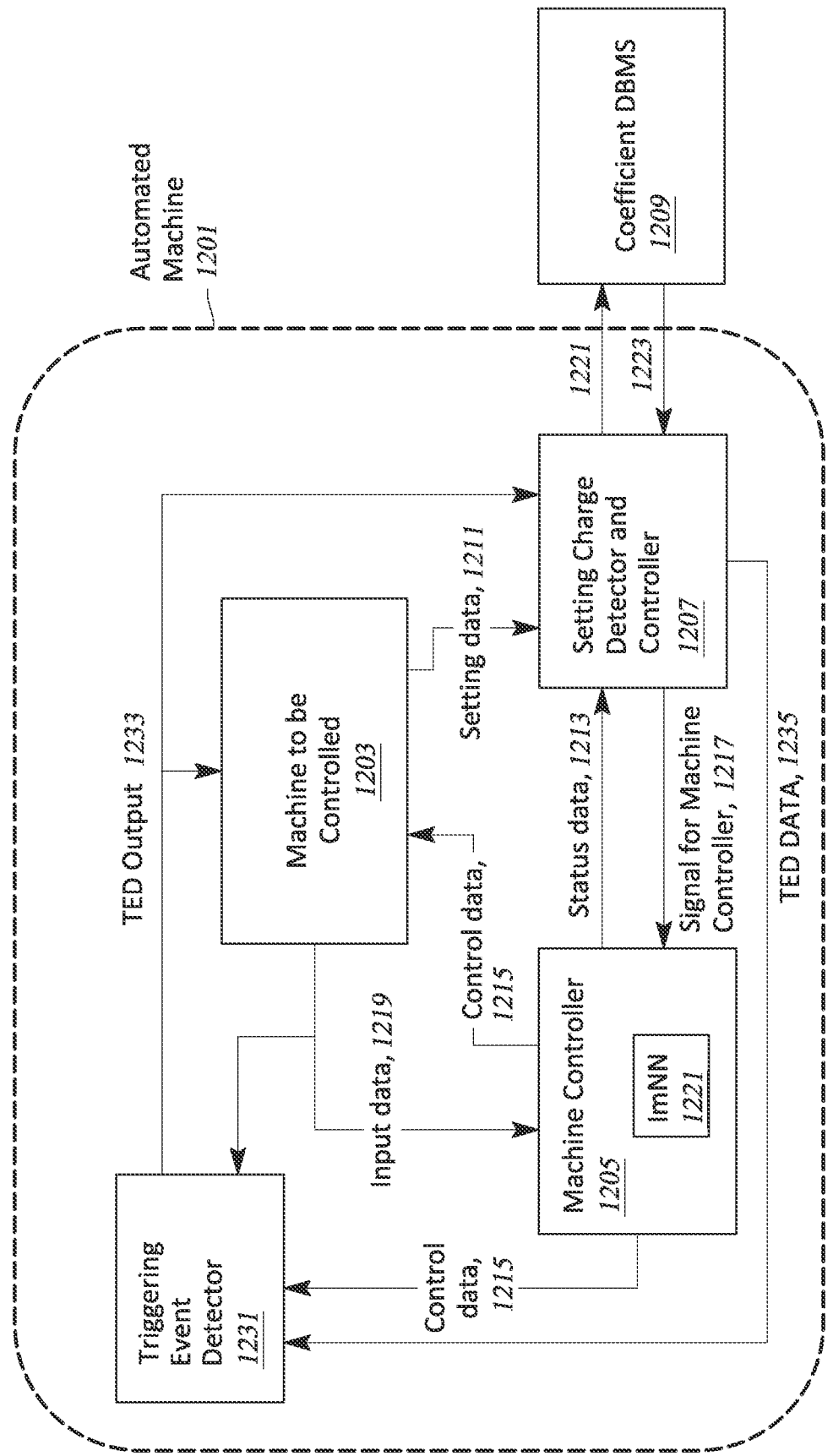
FIG. 12A is a block diagram illustrating an example preferred embodiment of an automated machine with a triggering event detector with the TED signal from the SCDC.

In particular, the preferred embodiments in connection with FIG. 12A may include an MTBC 1203, an SCDC 1207, an MC 1205, an ImNN 1221, and a C-DMBS 1209 have features/functions/capabilities of the MTBC 1103, the SCDC 1107, the MC 1105, the ImNN 1121, and the C-DMBS 1109, respectively, as described above in connection with FIG. 11B. Also coupling mechanisms can be included such as: input data 1219 (two paths shown in FIG. 12A), control data 1215 (two shown in FIG. 12A), status data 1213, a signal for MC 1217 have features/functions/capabilities input data 419, control data 415, status data 413, a signal for MC 417, respectively, as described above in connection with FIG. 4. In addition, the MTBC 1103, the SCDC 1107, the MC 1105, the ImNN 1121, and the C-DMBS 1109 (and the coupling mechanism) are configured to work with the TED 1131 as described below. In addition, the MTBC 1203, the SCDC 1207, the MC 1205, the ImNN 1221, and the C-DMBS 1209 (and the coupling mechanism) are configured to work with the TED Data 1235 and data on TED Output 1233 as described below.

While A) the neural network executable module or B) the coefficients and structure are used by the SCDC 1207 to instantiate the ImNN 1221 in the MC 1205 for a particular set of setting characteristic value ranges, the corresponding input space ranges and output boundary conditions can be loaded on to the TED 1231 (via the TED Data lines 1235 shown in FIG. 12A). In the embodiments that use a neural network, the coefficient set and the neural network structure to be used in the TED 1231 are also sent to the TED 1231. Upon receiving the data from the SCDC 1207, TED 1231 can implement specific configurations. Preferred exemplary embodiments contemplate, triggering event as:

Incorrect/abnormal type: Output(s) being out of operating bounds/limitations—examples:
In a refrigerator controller, the controller attempts to raise the temperature of fridge above the recommended operational temperature
In an oven the controller attempts to raise the temperature above a recommended operational temperature
In an oven and/or stove, turn on the oven and/or stove during a time or condition when it has been designated for non-use (for example, between 1 am and 6 am, or when no one is at home, e.g., when a sensor determines that no one is home)
In a speech generator, curse words or other inappropriate words are generated
In a controller for a driverless car, the controller issues a lane change command after receiving a proximity warning
In an image generator, inappropriate images are generated
In an image display apparatus, inappropriate images are displayed
In a controller for a robot, a command to harm a human being is created
In a printer controller, a counterfeit currency or counterfeit signature is generated
Security breach type:
In a controller for a refrigerator (or another system for example a video camera system) repeated information requests to particular websites
An authorized access to personal information
An attempt to adjust or replace or otherwise modify the controller
An attempt to cause a denial of service attack on a remote device
While running two virtual machines on an autonomous machine with substantially identical ImNNs on each virtual machine, one set of ImNNs start generating output data deviating from the output of the other set of ImNNs
Unauthorized usage level type: In an automated personal assistant embodiment, when a user is assigned to a G-rated search results only, the personal assistant generates results that are in R-rated category.

Referring again to FIG. 12A, when a triggering event is detected, the TED 1231 sends a signal over TED Output 1233 to the MTBC 1203 and/or the SCDC 1207. This signal indicates that a triggering event is detected and an action is required to be taken. In one preferred embodiment, upon receiving such a signal, the MTBC 1203 collects the setting characteristic values and sends them to the SCDC 1207, which in turn queries the C-DBMS 1209. In another preferred embodiment, upon receiving such a signal from the TED 1231, the SCDC 1207 uses the setting characteristic values to query the C-DBMS 1209. In other embodiments, if a triggering event is detected, TED Output 1233 send a notice to the MTBC 1201 and/or SCDC 1207. The notice can be an instruction to discard the output (synchronized with the input that caused the triggering event), or the notice can be an instruction to lower the NN confidence level that is instantiated on the ImNN 1221 (e.g., the SCDC 1207 notifies the CDMS 1209 to store the lowered confidence level for the corresponding A) neural network executable module OR B) the coefficients and/or its structure.

In some preferred embodiments, when such a triggering event signal is received the SCDC 1207 keeps the information about the entry of the C-DBMS 1209 that caused the triggering event. SCDC 1207 then updates that entry in the C-DBMS 1209. The updates can include lowering the NN confidence level of the entry (if the entry has an NN confidence level column as described above in connection with the C-DBMS 1209), remove the entry, and/or mark it for evaluation manually off-line.

Figure 12B:
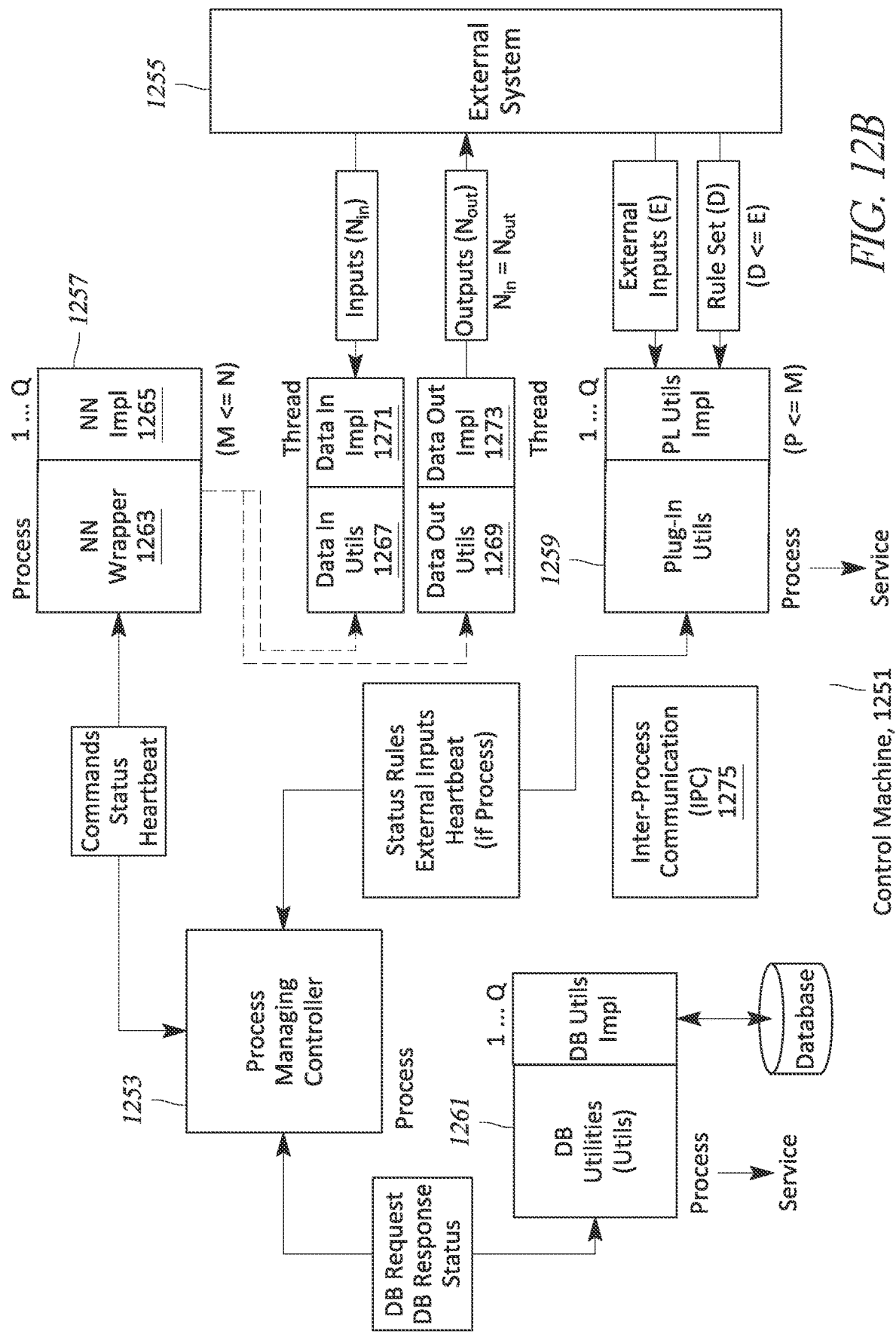
FIG. 12B is a block diagram illustrating an example preferred embodiment of an automated machine with a triggering event detector.
Figure 12C:
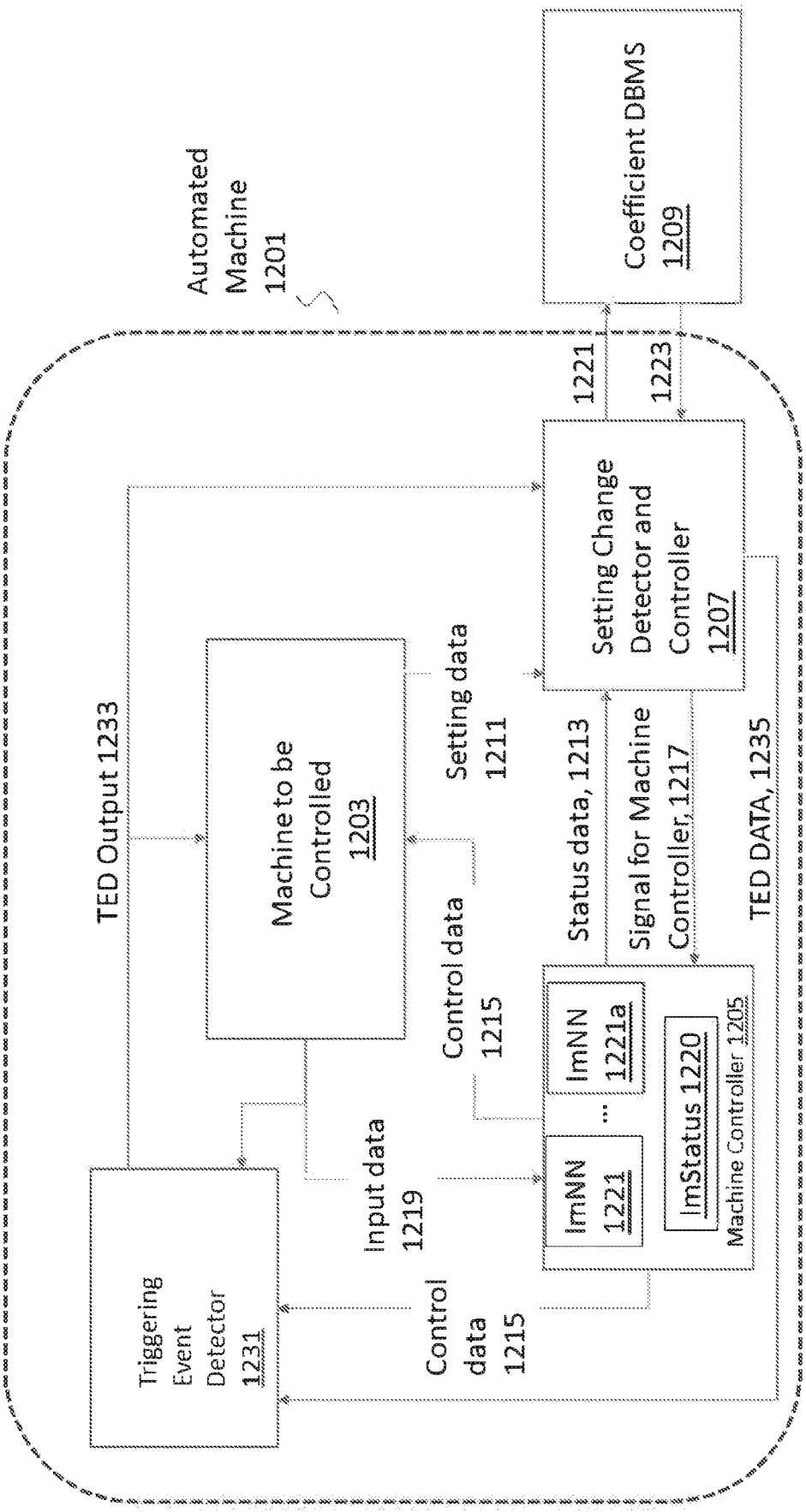
FIG. 12C is a block diagram illustrating an example preferred embodiment of the automated machine depicted in FIG. 12A with additional implementation neural network(s)

In some example embodiments, the MC 1205 may include additional ImNN 1221a and ImStatus 1220 in communication with the ImNNs 1221 and 1221a, as illustrated in FIG. 12C. Although one additional ImNN 1321a is depicted in FIG. 12C, the present invention contemplates embodiments with more ImNN(s) 1221a. Each instantiated ImNNs 1221a and 1221 can be identical to each other—that is, each can have identical set of coefficients and neural network structure being trained with an identical training data set. In other embodiments, some of the instantiated ImNNs 1221a and 1221 can have different sets of coefficients and neural network structures with different training data sets.

As noted above, the ImStatus 1120 communicates with the ImNNs 1121 and 1121a, and the ImStatus 1220 communicates with the ImNNs 1221 and 1221a. Various example embodiments of the ImStatus 1220 functioning with the ImNNs 1221 and 1221a are described below, while the present invention contemplates the ImStatus 1120 and the ImNNs 1121 and 1121a having similar/identical embodiments.

One example embodiment of the ImStatus 1220 may include a comparator and a counter. The ImStatus 1220 could be configured to send the output from one of the ImNNs (e.g., ImNN 1221) to the TED 1231 for the TED 1231 to use it, among other signal and data, in controlling MTBC 1203, so long as: a) the comparator compares the output data from various ImNNs 1221 and 1221a. b) the comparison results show that the output data from various ImNNs 1221 and 1221a are identical to each other, or at least similar to each other within a minimum difference value. c) if the counter counts NO more than a certain number of instances, within a given time period, that the comparison results in the output data from ImNN 1221 dissimilar over the minimum difference value. Here, the minimum difference value, the certain number of instances, and the given time period are parameters for the ImStatus 1220 that can be set depending on the integrity and/or accuracy requirements. In other words, if the Input data 1219 are highly sensitive subject to noises, the parameters for ImStatus 1220 can be relaxed, for example, the minimum difference value can be 10% over the average of the output data from the various ImNNs 1221 and 1221a, assuming the output data yields numerical values, the certain number of instances can be more than 10, and the given time period could be one millisecond. However, in an example embodiment in which accuracy and precision are important, the parameters for ImStatus 1220 can be adjusted as: the minimum difference value can be 0.1% over the average of the output data from the various ImNNs 1221 and 1221a, assuming the output data yields numerical values, the certain number of instances can be no more than 1, and the given time period could be one millisecond or even one second or longer.

In an example operational scenario, if the output data from ImNNs 1221 and 1221a vary more than the certain number of instances over the minimum different value within the given time period, the ImStatus 1220 stops sending the output data from the ImNN 1221 to the TED 1231 and, some embodiments, the output data from ImNN 1221a are sent to the TED 1231. In such instances, the ImStatus 1220 communicates via the Status Data 1213 the determination to stop sending the output data from ImNN 1221 to the TED 1231.

In some example embodiments, data integrity is an important feature for information transfers and information enhancement. In general, data integrity can refer to the accuracy and/or consistency of data. The logical integrity of data-driven processes verifies whether decisions made by neural network(s) are correct and accurate in a specific context over a time period. The accuracy of a neural network can be determined by obtaining the difference between an inferenced decision and a reference "true" solution. The consistency of a neural network is the number of times the difference (or accuracy) between an inferenced decision and the reference solution falls within a pre-defined error bound.

In an exemplary embodiment of the MC 1205, the ImNN 1221 can perform inference on a stream of video input data. At a defined sampling rate, the ImNN 1221a can perform inference on a sub-sample of the same input data. In this instance, both ImNNs 1221 and 1221a had been trained on identical training data set with an identical neural network structure. It is also assumed that the ImNNs 1221 and 1221a should generate similar results when inferencing on the same exact stream of input data. Data integrity can be a measure of the difference between output data from ImNNs 1221 and 1221a over time (accuracy) and the number of times ImNNs 1221 and 1221a disagree on a solution.

In an exemplary embodiment, both ImNNs 1221 and 1221a determine whether 2 frames of motion video correspond spatially meaning that a user-define percentage of video frame 1 is in video frame 2. The inference result of the either ImNNs 1221 or 1221a can be either "yes" or "no" and the confidence of the result. Note that the "confidence level of result" here is difference from the "confidence level of an entry" described above in connection with Tables 1 and/or 3.

An approach in determining data integrity, the difference between the ImNN 1221 result confidence and the ImNN 1221a result confidence can be measured first. This provides a basis for accuracy. In this example, to create the accuracy component, the confidence is averaged over the number of sub-sampled times that both of the ImNNs 1221 and 1221a provide an inference solution. The number of times that the ImNNs 1221 and 1221a agree is determined. In this example, when ImNNs 1221 and 1221a agree on a solution, an agreement is tallied up. In this example, to create the consistency component, the agreement tally is divided by the number of total sub-samples to create an average. The data integrity calculation is the weighted average of the accuracy and consistency component where the weights are defined at a system level.

In another exemplary embodiment, the MC 1205 processes input data through an inference ImNNs 1221 and 1221*a* and provides control data. At intervals, the input data is processed by the ImNNs 1221 and 1221*a* and the ImStatus 1220 which can have its own neural network (ImStatus NN, not shown). The difference between the ImNNs 1221 and 1221*a* result confidence and the ImStatus NN result confidence is determined. If the difference is greater than a system threshold, the results are deemed to be inconsistent; otherwise, it is deemed as consistent. The absolute value of the difference is stored as an accuracy. At some system specified interval, status data is sent to setting controller. The information contained the status data message includes the following:

System Integrity
Process Errors
Process Warnings
Process Information

System integrity is comprised of confidence and consistency metrics. The confidence is defined as the following:
$C_x = \Sigma (C_i - C_c)/N_{ic}$ where $C_i$ is confidence of inference solution and Cc is confidence of control solution and $N_{ic}$ is number of times $C_i$ and $C_c$ are compared.
The consistency is defined as the following:
$C_y = \Sigma N_p/N_{ic}$ where $N_p$ is the number of times $|C_i - C_c|$ is less than the system confidence threshold.
The status data sent to the setting controller consists of the following data structures.

```
struct Integrity {
    double confidence;
    double consistency;
};
Struct Process {
    int processID;
    int processIndex;
    char message[256];
};
struct Status {
    Integrity integrity;
    Process errors;
    Process warnings;
    Process info;
};
```

FIG. 12B illustrates an example control machine (CM) 1251 that includes computer program implemented machines to show various machine components can be created and linked together in run-time. This example depicts an example implementation of several of components in FIGS. 11 and 12A. The CM 1251 can include four components: (a) Process Managing Controller (PMC) 1253, (b) Neural Network sub-system (NN) 1257, (c) Plug-In Utilities sub-system (PI) 1259, and (d) Database sub-system (DB) 1261. The PMC 1253 communicates with an external system 1255 (e.g., various controllers for the automated machine 1201). For instance, the PMC 1251 can receive information and dependencies from the external system 1255. In particular, the external system 1255 can define and deliver the inference input data as well as define and accept inference results from the NN 1257. The CM 1251 can be configured to interact to perform autonomous functioning and decision-making.

The PMC 1253 can be the central process for controlling all other processes within the CM 1251. Specifically, the PMC 1253 can be started as an independent process (usually by the external system 1255) with its own memory space. The PMC 1253 can initiate three additional processes—namely, the NN 1257, PI 1259, and DB 1261 processes. Each sub-system, potentially multiple NNs, PIs, and DBs, can be independent processes with their own memory space to minimize single points of failure that may cause a system crash. As an example, an NN process could crash because of poorly formatted input from the external system. However, the entire system will be allowed continue to operate and potentially recover with the re-instantiation of the failing NN sub-system process. After initiation, the PMC 1253 then can communicate directly with these sub-systems through, for example, Inter-Process Communications (IPC) 1275.

The Neural Network (NN) sub-system 1257 can be the process that converts heterogeneous input data into decisions. The NN process can include a NN Wrapper 1263, a NN Implementation 1265, and Data In/Out Utility (DIO) threads. The NN process can be initiated with start-up information from the PMC process via IPC to include:
  (a) NN Implementation (e.g. structure, weights);
  (b) Handles or pointers to the input data from the External System; and/or
  (c) Handles or pointers to the output data to the External System.

The NN process can include a NN Wrapper class and a NN Implementation. For all instances of the NN Implementation, the NN Wrapper can be the same and can be considered the base class. The NN Wrapper has multiple functions that can be implemented by the NN Implementation to include data handling (in/out) and status reporting (e.g. percent complete, errors, and warnings). The NN Wrapper can have multiple functions to include:
  (a) Initiating and maintaining the process and memory space;
  (b) Instantiating the CM—this could be accomplished in a variety of ways to include:
    a. Shared library call;
    b. Dynamic code generation;
    c. Dynamically named shared classes; and/or
    d. Statically generated neural networks added (e.g. using #ifndef) during compile time
  (c) Starting the data in and out utilities threads. These methods are utilized to standardize the input and output into and out of the NN Implementation. These methods can be initiated as threads that exist in the process and memory space of the NN process. For every DataIn thread, there can be a DataOut thread and vice versa. Like the NN Implementation, the DataIn and DataOut can be instantiated within the Data In/Out Utilities using a variety of methods to include:
    a. Shared library call;
    b. Dynamic code generation; and/or
    c. Dynamically named shared classes This can be an important step, in this example, because there can be a variety of ways that the external system can present input or receive outputs to include shared memory, sockets, shared files, or web services.

Once the NN process has initiated to include the instantiation of (a) the NN Implementation, (b) the data handlers (in/out), and (c) the connections to the external system, the inference process can begin. The NN process can have the task of feeding input into the NN Implementation via the Data In Utilities 1267, sending results back to the external system via the Data Out Utilities threads. Additionally, the NN process can periodically communicate to the PMC process via an IPC message. This message can be a "heartbeat" to communicate to the PMC that the specific NN process is alive and running. Additionally, the NN process communicates to the PMC process on various milestones (e.g. percent complete) or if NN Implementation errors or warnings occur. All information can be filtered back to the PMC for further processing.

The Plug-In (PI) sub-system 1259 can be the process that converts external system inputs into messages for the CM 1251. The PI 1259 process can include a PI Wrapper (e.g., Utils or Utilities) and a PI Implementation with connections to the external system. The PI process can be initiated with start-up information from the PMC process via IPC to include:

(a) PI Implementation (e.g. protocol); and/or (b) Handles or pointers to the input data from the External System.

The PI process can include a PI Wrapper class and a PI Implementation. For instances of the PI Implementation, the PI Wrapper can be the same and can be considered the base class. The PI Wrapper can have multiple functions that could be implemented by the PI Implementation to include data handling (in/out) and status reporting (e.g. errors, warnings).

The PI Wrapper may have multiple functions to include:

(a) Initiating and maintaining the process and memory space;

(b) Instantiating the PI Implementation—this could be accomplished in a variety of ways to include:

a. Shared library call b. Dynamic code generation c. Dynamically named shared classes; and/or (c) Initiating the external system data in connection. This method is used to (a) determine the rules governing which NN will be implemented and (b) defining the external inputs used per the rules.

Once the PI process has initiated to include the instantiation of the PI Implementation, and connection to the external system, data processing begins. The PI process has the task of ingesting input from the external system and providing the information to the PMC. Additionally, the PI process can periodically communicate to the PMC process via an IPC message. This message can be a "heartbeat" to communicate to the PMC that the specific PI process is alive and running. Additionally, the PI process communicates to the PMC process on various topics (e.g. new external inputs, rule changes) or if implementation errors or warnings occur. All information can be filtered back to the PMC for further processing within the CM.

To note, the PI sub-system can be made to be easily adaptable to a web service implementation where the PI process is called via REST or SOAP messaging vice the standard IPC calls. This is an operational fielding decision that is easily implemented and switched during the CM build process (i.e. compile and link stage).

The DB process 1261 consists of a DB Wrapper class and a DB Implementation. For all instances of the DB Implementation, the DB Wrapper is the same and can be considered the base class. The DB Wrapper has multiple functions that must be implemented by the DB Implementation to include data handling (in/out) and status reporting (e.g. errors, warnings).

The DB Wrapper has multiple functions to include:

(a) Initiating and maintaining the process and memory space (b) Instantiating the DB Implementation—this could be accomplished in a variety of ways to include:

a. Shared library call;

b. Dynamic code generation;

c. Dynamically named shared classes;

(c) Initiating the database connection. This method is used to determine the NN given the rules and external inputs provided from the external system.

Once the DB process has initiated to include the instantiation of the DB Implementation and connection to the database, data processing can begin. The DB process has the task of ingesting the request from the PMC and providing the relevant NN information back to the PMC. Additionally, the DB process can periodically communicate to the PMC process via an IPC message. This message can be a "heartbeat" to communicate to the PMC that the specific DB process is alive and running. This ensures that the database is available to respond to changes in the external rules and/or external inputs from the external system. Additionally, the DB process works through a request and reply method and can report when errors or warnings occur. All information can be filtered back to the PMC for further processing within the CM.

To note, the DB sub-system is easily adaptable to web service implementation where the DB process is called via REST or SOAP messaging vice the standard IPC calls. This is an operational fielding decision that is easily implemented and switched during the CM build process (i.e. compile and link stage).

Various components/devices of the SCDC and MC (described above in connection with FIGS. 4, 11 and 12) can be implemented on a chip, a chip-set, ASIC, AI server (e.g., DGX-1 by Nvidia), and/or firmware. This is, for example, to prevent a potential security breach (e.g., a virus attack) and/or to provide a baseline from which to re-boot. In other words, in some exemplary embodiments, the logic and/or neural network(s) located in the SCDC is not modifiable or adjustable by or at the autonomous machine, but only re-deployable, modifiable, and/or adjustable by an authorized system of the original manufacturer of the autonomous machine. It should be noted in some embodiments, such a SCDC can run on one thread (e.g., on one virtual machine), while ImNN(s) can run on another thread (e.g., another virtual machine) on a general-purpose processor or a graphical accelerator/processor (e.g., implemented on solid-state devices such as a chip, a chip-set, ASIC).

In various embodiments of the present invention, the SCDC and the ImNN(s) can be co-located on a device (e.g., a general-purpose computer, a controller chassis, an ASIC, chipset, etc.). Although the implementation of some of the preferred embodiments are described in terms of solid-state devices (e.g., semiconductor chips), portions of some preferred embodiments being implemented on an optical computer device or quantum computing device is also contemplated. It should be noted that the SCDC can also be implemented on an AI server (for example, DGX-1 by Nvidia), and/or firmware deployed on a server computer, a processor specifically adapted to allow efficient running of neural networks also referred to as neural network processors. The ImNN(s) can also run on a processor (e.g., a general-purpose processor, or graphical accelerator/processor, digital processor or processors specifically adapted to allow efficient running of neural networks also referred to as neural network processors). As noted above, the SCDC can be implemented (e.g., on a server) remotely located from the ImNN(s) (e.g., on a client(s)).

In some embodiments of the present invention, the structure(s) of the ImNN(s) are not modifiable once deployed on an automated machine, for security reasons and/or for efficiency. In such an embodiment, only the coefficients for the nodes are stored in the C-DMBS and would be used by the SCDC to modify the ImNN(s). In other words, the information relating to the structures (e.g., type of neural network, number of nodes and layers, and nodal connection information) is not needed to be stored in the C-DMBS for these embodiments, since the neural network structure of the ImNN(s) is not modifiable. The structures of the ImNN(s) for these embodiments can be implemented on fixed hardware/firmware that cannot be changed once deployed.

8. Adaptively Controlling Groups of Automated Machines

In some embodiments of the present invention, automated machines in groups can cooperate with each other and/or operate adaptively as the settings change (e.g., environment in which the automated machines operate changes) to achieve a common goal more efficiently. As used herein, a "goal" can refer to a desired classification result having a characteristic. The desired classification result may be, for example, to achieve a certain classification result having a certain accuracy, speed, false positive rate, false negative rate, and the like. Selection of a neural network structure and the neural network coefficients affects the operation of the neural network for achieving a desire goal. Thus, the selection of a certain neural network structure and a certain set of neural network coefficients can correspond to a particular goal. A number of automated machines having a common goal can be divided into groups. Each of the automated machines in a group can use neural networks having the same neural network structure and the same set of neural network coefficients, while different groups may use different neural network structures and neural network coefficients. As an example, if there are three groups of automated machines, each group can use different neural network from the other two groups—in total three neural networks are used (that is, three different neural network structures and corresponding three different sets of coefficients). It should be noted that the three group arrangement is provide as an example, automated machines having a common goal can be divided into numerous groups—one or more automated machines can belong to each of the groups.

While in operation, each group of automated machines evaluates and/or is evaluated with the results of operations in attempting to achieve the common goal. Note that the common goal can be a permanent feature of the automated machines or can be temporary to be replaced with a new common goal. The results to be evaluated and/or evaluation criterion/criteria can change over time, depending on the setting and/or the common goal to achieve. Examples of the results and evaluation criterion/criteria are provided using various implementations later.

Each group of automated machines likely yield different results because each group is using a neural network different from the neural networks of other groups. A server or some or all of the automated machines themselves (or a combination thereof) can evaluate the results from the automated machines based on a criterion/criteria. If one group of automated machines is determined to yield better results based on the criterion/criteria in achieving the common goal compared with the results from the other groups of automated machines, that information can be used to rearrange the groups. That is, the automated machines belonging to other groups can migrate to start using the neural network structure and coefficients that the automated machine used in the group that yielded better results. In other words, automated machines belonging to the other groups can be migrated over to the group that yielded better results. This way, after an evaluation event, a majority or substantially all automated machined can belong to the group that yielded better results, which make the groups as whole to be more efficient in achieving the common goal.

It should be noted that, although a majority or substantial all of the automated machines can migrate over, some automated machines can form separate groups—each group with old or new neural network structures and coefficients. This may ensure that the groups as a whole can continue to explore more efficient ways to achieve the common goal by repeating the process of evaluating, migrating and rearranging of the automated machines. These processes can continue periodically or as a change of the setting is detected. It should be noted that the processes of evaluating, migrating and rearranging can be performed by a server, by some or all of individual automated machines, or a combination thereof.

With respect to storing the information about various neural networks to be used by automated machines, the structures and corresponding coefficients along with other information can be stored in various DBMS embodiments as described in the previous sections.

With respect to passing the information about various neural networks to be used by automated machines, the structure and corresponding coefficients along with other information can be passed unencrypted or encrypted. Encrypted transmission can include techniques such as RSA (Rivest-Shamir-Adleman) or FHE (homomorphic encryption) where RSA solutions would require decryption keys at the automated machine level while FHE processing (with associated FHE math libraries) would require no decryption keys at the automated machine.

By way of an implementation example, a number of drones flying towards a target (e.g., a particular ship, building, location, or etc.) can be divided into groups. The common goal for the drones can be to arrive at the target from one or more remote locations. This is an example of a temporary common goal that can be replaced in the middle of flight to the target (e.g., assigning a different target) or replaced after arriving at the target. The automated machines (in this case, drones) having the common goal (in this case, arriving at the target) can be divided into multiple groups, one or more automated machines belonging to each group. Drones in each group use neural networks having the same network structure and coefficients that may be, for example, selected based on the goal.

Since each group is using a different neural network structure and coefficients, each group would generate different results bases on various evaluation criteria, e.g., distance from the target, survival rate, following the target if it moves, be on the path of the target if it is a projectile to intercept it, and etc. In other words, one group may be closer to the target than other groups of drones, one group may have more survivors if the drones are attached from the target location, one group may be more successful in locating the target if the target is being evasive, and etc. A server connected to the drones may evaluate the results using one or more evaluation criteria and decide to rearrange the groups so that a majority of the drones start using the neural network structure and coefficients of the group that yielded better results compared with results yielded by other groups, that is to conduct an evaluation using a criterion or more than one criterion.

For example, the server can evaluate the average locations of the drones in each of the groups flying towards the target. The group that has achieved the shortest distance to the target on average can be considered as yielding better results compared with other groups.

In another example, should drones be attacked from the target location, counting the number of surviving drones in each group would identify the group with the best (that is, better than other groups) survival rate because the group was controlled by a neural network that caused the drones in that group to take evasive flight maneuvers.

In yet another example, should the target start putting up evasive actions (e.g., generating smoke, moving around, etc.), the general directions of the drones can be obtained compared with the actual target—assuming the server would have more accurate information about the location of the target. The server can evaluate which group has the highest number of drones heading toward the actual target, which would identify the best group (that is, a group that is better than other groups).

In another embodiment, instead of a server, a select set of drones can communicate with all other drones having the common goal to conduct an evaluation as the examples provide above and determines to change the group neural network structure and coefficients to use the neural network of the group having the best survival rate.

The evaluation can take place periodically or as a change in settings is detected. Continuing with the drone implementation example, as drones fly towards the target from one or more remote locations, the setting may change. In particular, an early flight setting can be when drones are a long distance away from the target in which target approach speed might be valued more than precisely locating the target. In this example, the early flight setting, less computationally intense neural network structures can be used to control the flight paths of the drones (e.g., processing navigations information such as GPS information, image/magnetic sensor(s) to determine the current locations of the drones, and/or controlling the flight controls such as pitch, roll and yaw). Also, integer arithmetic can be used to speed up computations where all coefficients and parameters are represented by integers. As the drones approach closer to the target, the setting changes and more precise neural networks can be deployed such as neural networks having been trained to locate the target in inclement weather conditions and/or in smoke (natural or man-made). The neural networks deployed to control the flight pattern may be trained to follow a target if it is a mobile target and/or trained to conduct evasive maneuvers should the drones be attacked at the target location. By using different neural networks for a number of groups, the chance for some of the drones to achieve the common goal of arriving at the target may increase.

In another implementation example, a number of automated machines (that is, cyber security machines can be assigned to achieve a common goal of protecting computer networks from cyber security threats such as virus/malware attacks, bot disinformation campaigns, credit frauds, credit information misuses, and/or the like. This common goal of protecting computer networks is an example of a goal that can be permanent.

Further describing these example embodiments, a number of cyber security machines can be added to/installed on a computer network. The cyber security machines (e.g., virtual machines, hardware/firmware implemented machines, etc.) can be installed on or a part of a gateway to a computer network. The cyber security machines can be divided into groups, each group using the same neural network structure and coefficients in detecting and/or neutralizing the detected security threats via a cyber-security gateway. In one type of example evaluation, one group can be evaluated to be more successful, that is better than other groups, in detecting security threats (e.g., by counting the detection of potential threats such as failed logins, phishing e-mail, and database injections). A majority (or substantially all) of the cyber security machines in less successful groups can start the successful group's neural network structure and coefficients, while the other cyber security machines be assigned to different groups—each group using different neural networks. The evaluation, migration, and rearrangement of groups can continue be repeated. In some embodiments, if the security threat increases, the cycle of evaluation, migration, and rearrangements can occur in shorter periods of time until the overall security threat lowers.

Turning to another implementation example, in cellular technology, it is known to model the physical layer channel over a signal path with a neural network and implement a transmitter-receiver using the neural network—e.g., as described in *An Introduction to Deep Learning for the Physical Layer* by Tim O'Shea and Jakob Hoydis. To provide additional context, in the so-called $4^{th}$ generation cell phone networks, the Orthogonal Frequency Division Multiplex (OFDM) method of transmitting/receiving is used at the physical level.

In this example, a number of mobile communication devices (that is, cell phones) can be implemented to include neural networks, each network having been trained to model a different physical layer communication channel (e.g., a different signal path between transmitter and receiver). These cell phones may have the common goal of achieving speedy transmitting/receiving data with minimal amount of errors (an example of a permanent common goal). In particular, a number of neural network can be trained to be transmitter-receiver over various settings (e.g., differing signal paths with varying degrees of signal blocking/reflecting objects such as from none to having buildings, mountains, etc.). The trained neural networks (with the information about the structure and coefficients) for each of the settings can be stored in database management system (locally on phones, at base stations, at a server location or a combination thereof). A base station has a database management system that includes, among others, a set of neural networks with their structure and corresponding coefficients to be used within the geographical coverage for the base station. A cell phone entering into the base station may already have the information about the set of neural networks to be used within the newly entering base station or may be downloaded from the base station. The set of neural networks to be used within a base station's geographical coverage may be divided into geographical regions (e.g., signal path that has no, few, many obstacles or completely blocking obstacles) and each cell phone entering a given geographical region can be assigned to use the neural network trained to be effective (e.g., yields a low error rate, which can be one or a combination of bit error rates, packet error rates, block error rates, signal to noise ratios, picture quality, and similar measures) within the geographical region. Note that there can be one or more geographical region within a base station geographic coverage area.

It should be noted that, initially, the base station can divide cell phones located within a particular geographical region into groups of cell phone—each group having a different neural network assigned thereto. By determining the group with the better results compared with other groups (e.g., comparing the average error rates of cell phone transmissions for each group of cell phones), the base station can identify the neural network to be used in that particular geographical regions. Subsequent to the initial setup, the evaluation can continue. For instance, cell phones entering a geographical region can be divided into groups of cell phones—cell phones within a group using one neural network while different groups are assigned to use different neural networks by the base station. The evaluation criterion is to measure the error rates. The evaluation criterion may also include components of data volume, time of day, seasonal variations, and local weather. In an example embodiment, the base station can determine the group that results in the lowest error rate (that is, better results compared with other groups) and start assigning the neural network of that group to cell phones entering the particular geographical region. Since the condition over the geographical region may not stay the same (e.g., changing weather, building more obstacles, building more roads, etc.), dividing cell phones into groups for determining the least error rate yielding neural network can be repeated.

Although the drone, cyber security machine, and cell phone implementations are described above as examples of the adaptive groups of automation machines, other automated machines (e.g., robots, automated driving vehicles, multiple assembly lines, etc.) can also be implemented similarly in groups to improve the overall efficiency of achieving a common goal.

Figure 13:
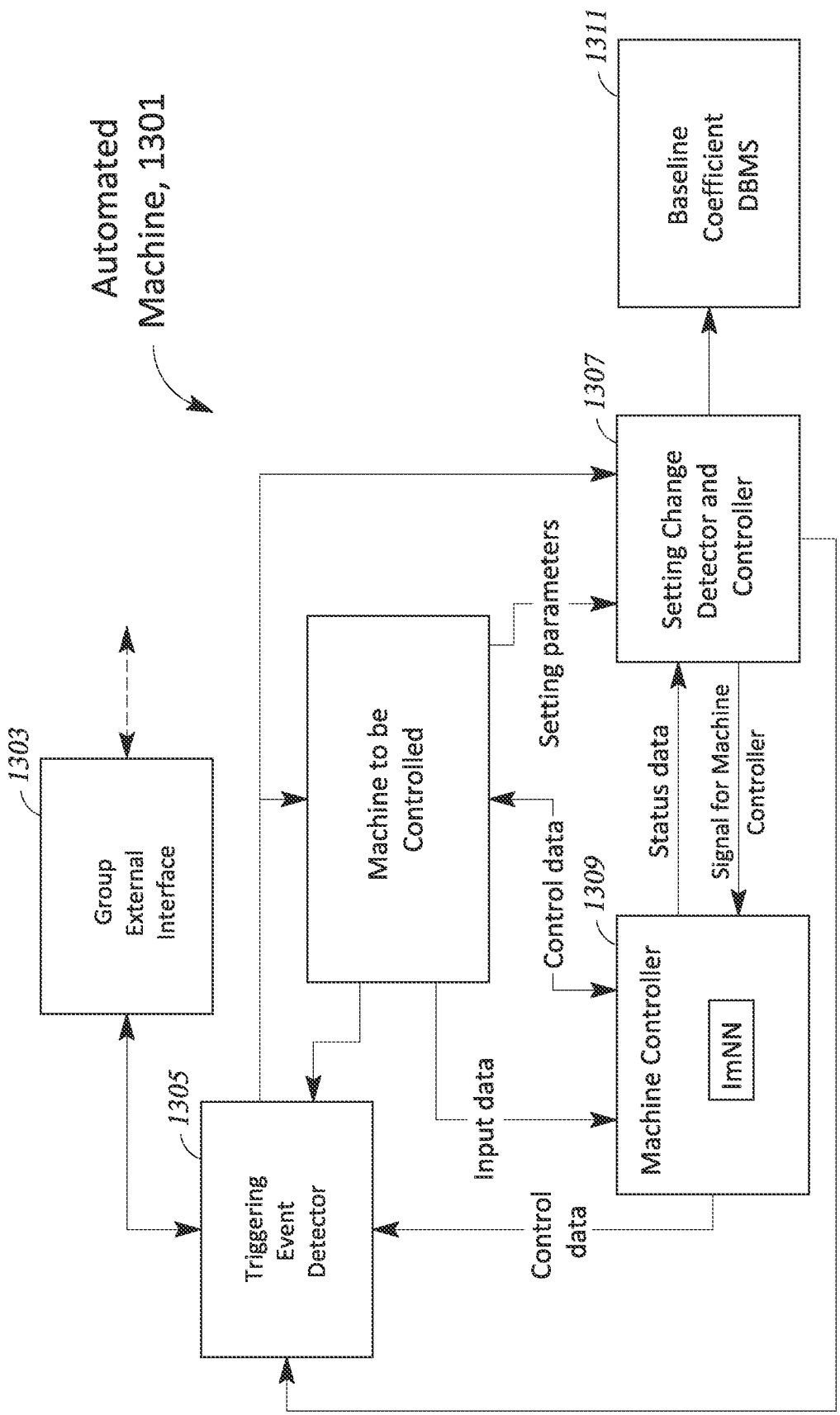
FIG. 13 is a block diagram illustrating an example preferred embodiment of an automated machine to be used in a group setting.

The above examples of adaptive groups of automated machines are further described using figures. In the example embodiment shown in FIG. 13, an automated machine 1301 includes the components as depicted, for example, in FIGS. 12A, 12B, and/or 12C, and described in connection with these figures, but also can include certain modifications. In particular, the modifications include an additional component, an extern interface 1303, and components with additional features such as triggering event detector 1305, setting change detector and controller 1307, machine controller 1309 and baseline coefficient DBMS 1311.

The communications with external devices can be conducted via the external interface 1301, which can use inter-process communication (IPC) protocol, peer-to-peer (P2P), shared memory, e-mail, asynchronous messaging, cell phone network, TCP-IP, military communications protocol (e.g., SIMPLE, Link-16) and/or others known in the art. Each automated machine is implemented to communicate with a server and/or other automated machines. The transmitted/received information can include the location information of the automated machine and information about the neural network being used by the automated machine. If a server is connected, the received information can include instruction to use a new neural network and information thereof.

The received information can be sent the triggering event detector 1305, which can include the additional features of processing the received instruction as a triggering event and notify the setting change detector and controller 1307. In embodiments with no server connection, triggering event detector 1305 can also periodically conduct an evaluation information received from other automated machines to determine the group with better results to join. The triggering event detector can send a notification to the setting change detector and controller 1307 in order to change the neural network being used by the machine controller 1309.

The notification can include the information to identification of the neural network to use if such a neural network is stored in the baseline coefficient DBMS 1311. If the external interface 1303 received neural network information such as neural network structure and coefficients, that information can be sent to the setting change detector and controller 1207 as a part of the notification from the triggering event detector 1305. The setting change and detector and controller 1307 include additional features that would change the neural network being used by ImNN in the machine controller 1309 to the newly received neural network, upon receiving the notification described above. The structure and coefficients of the newly received neural network can be from the baseline coefficient DBMS 1311 or from the triggering event detector 1305.

The baseline coefficient DBMS 1311 can store an initial set of neural networks (e.g., a few basic neural networks with structures and coefficients). It can continue to store new neural networks as they are received from the server and notified by triggering event detector 1305.

Figure 14:
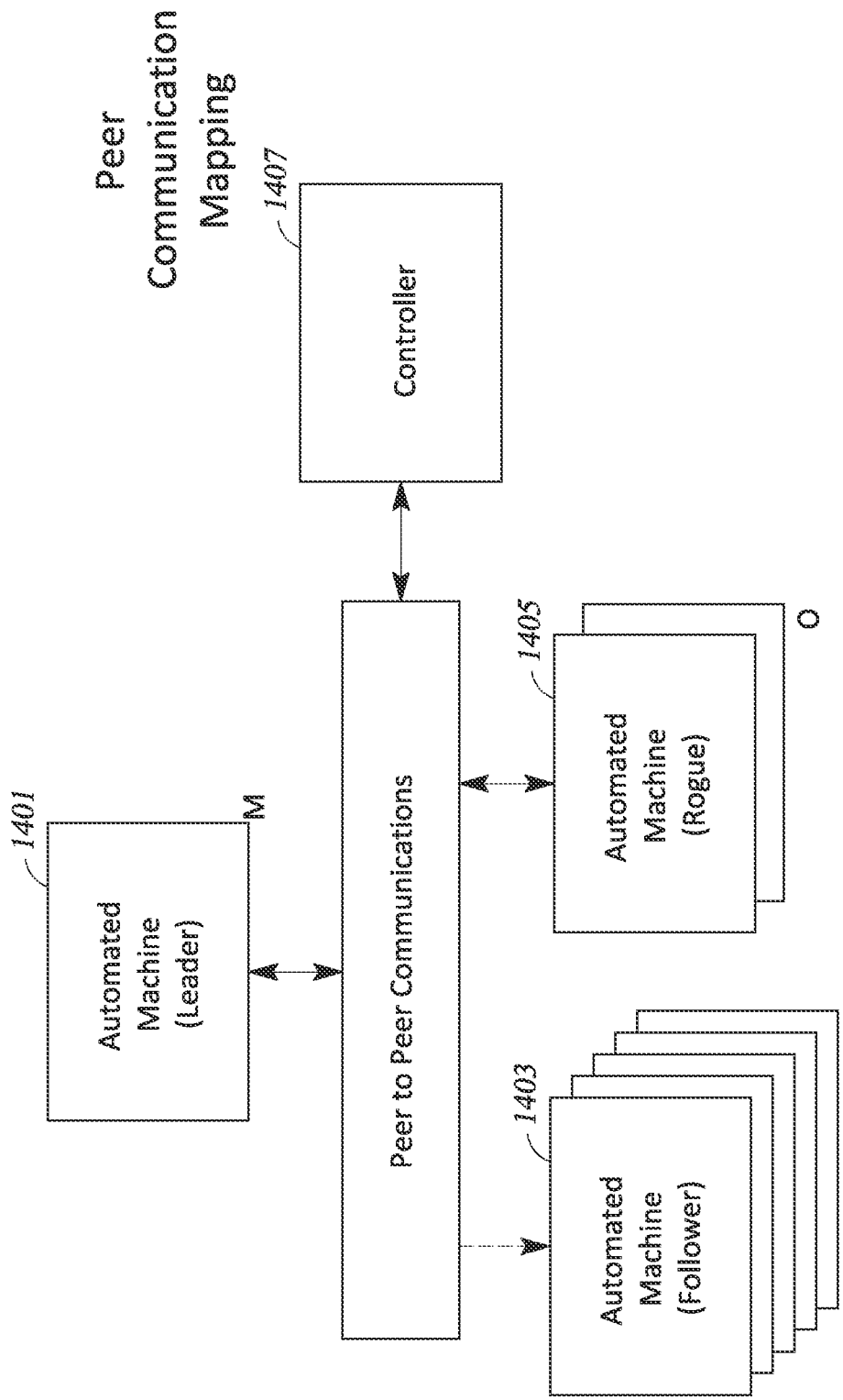
FIG. 14 is a block diagram illustrating groups of automated machines operating to achieve a common goal.

In the example depicted in FIG. 14, each group is shown to have one automated machine, although each group can have more one automated machines. The group having the better results compared with other groups in achieving a common goal is designated as a Leader 1401 and other groups of automated machines that have migrated over to the Leader group are designated as Followers (there are N integer number of them) 1403. There are also O integer number of Rogue units of automated machines 1405 that are assigned to use neural network structures and coefficients that are different from those of the Leader group 1401 and different from each other. In the example embodiment depicted in FIG. 14, an automatic controller 1407 assigns neural network structures and coefficients to various groups via P2P communication link. It should be noted that the automated controller 1407 conducts a new evaluation periodically (e.g., every fraction of a second, a second, a minute, 10 minutes, and etc.). As a new evaluation takes place, based on the new results, the automated controller 1407 can assign one of the Rogue group 1405 as a new Leader group and reassign neural networks to various groups to copy the new Leader group's neural network, while keeping or making a new set of Rogue groups that do not use the new Leader's neural network. The old Leader group's neural network can be discarded or kept as one Rogue group's neural network. The purpose of having Rogue groups is to test various configurations of neural networks in a new setting to determine which one may yield better results compared with the current Lead group of automated machines. In one example, the portion of the automated machines using the Lead group's neural network can be 90% to 99% of the total number of automated machines for a particular mission having one goal (e.g., drones assigned to arrive at a certain target, cyber security machined added to a computer network to provide security, or cell phones within a geographical coverage region of a base station).

The controller can be located remote from the automated machines as shown in FIG. 14. In this example, the controller can be a part of a server. In other embodiments, the controller can be located on a subset of the automated machines to conduct the evaluation, migration, and rearrangement on its own.

9. Implementations

Any module, routine or any apparatus configured to perform the functions recited by means described herein or may be performed by any suitable means capable of performing the corresponding functions. The means may include various hardware and/or software component(s) and/or module(s), including, but not limited to, a circuit, an application specific integrated circuit (ASIC), or processor. Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

As used herein, the term "determining" encompasses a wide variety of actions. For example, "determining" may include calculating, computing, processing, deriving, investigating, looking up (e.g., looking up in a table, a database or another data structure), ascertaining and the like. Further, "determining" may include receiving (e.g., receiving information), accessing (e.g., accessing data in a memory) and the like. In addition, "determining" may include resolving, selecting, choosing, establishing and the like.

Also, as used herein, phrases neural network executable modules, executable modules of neural network, executable neural network modules mean the same.

The various illustrative logical blocks, modules, processors and circuits described in connection with this disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general-purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

As one of skill in the art will appreciate, the steps of a method or algorithm described in connection with the present disclosure may be embodied directly in hardware, in a software module executed by a processor, or in a combination of the two. A software module may reside in any form of storage medium that is known in the art, including memory that may be part of a microprocessor or in communication with a microprocessor. Some examples of storage media that may be used include, but are not limited to, random access memory (RAM), read only memory (ROM), flash memory, erasable programmable read-only memory (EPROM), electrically erasable programmable read-only memory (EEPROM), registers, a hard disk, a removable disk including removable optical media, and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein may include one or more steps or actions for achieving a described method. The method steps and/or actions may be interchanged with one another without departing from the scope of the invention. In other words, unless a specific order of steps or actions is specified, the order and/or use of specific steps and/or actions may be modified without departing from the scope of the disclosure. The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor (e.g., image processor) may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or general register files. Although the various components discussed may be described as having a specific location, such as a local component, they may also be configured in various ways, such as certain components being configured as part of a distributed computing system.

In some embodiments, the processing system may be configured as a general-purpose processing system with one or more microprocessors providing the processor functionality and external memory providing at least a portion of the machine-readable media, all linked together with other supporting circuitry through an external bus architecture. In some embodiments, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functionality described throughout this disclosure. In some embodiments, the processing system may comprise one or more neuromorphic processors for implementing the neuron models and models of neural systems described herein. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from another storage medium when a triggering event occurs. During execution of the software module, the processor may load some of the instructions into cache to increase access speed. When referring to the functionality of a software module below, it will be understood that such functionality is implemented by the processor when executing instructions from that software module.

Some embodiments may comprise a computer program product for performing the operations presented herein. For example, such a computer program product may comprise a computer-readable medium having instructions stored (and/or encoded) thereon, the instructions being executable by one or more processors to perform the operations described herein. If implemented in software, functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. Thus, in some embodiments a computer-readable media may comprise non-transitory computer-readable media (e.g., tangible media). Combinations of the above should also be included within the scope of computer-readable media.

Example Embodiments

A first embodiment, Embodiment A, includes a method of controlling a machine, the method comprising storing at least two sets of neural network coefficients, each being different from the others; associating each of the at least two sets of neural network coefficients with one or more characteristics of a setting; receiving first data from one or more input devices of the machine; selecting one from the at least two sets of neural network coefficients based on the first data and the one or more characteristics of the setting; instantiating a neural network with the selected one from the at least two sets of neural network coefficients; conducting a nodal operation at each node of the instantiated neural network; and controlling an aspect of the machine using an output from the instantiated neural network.

Embodiment B includes the method of Embodiment A, wherein said each of the one or more characteristics of a setting is defined with a range of values. Embodiment C includes the method of any one of Embodiments A or B, further comprising storing information relating to a neural network structure associated each of the at least two sets of neural network coefficients. Embodiment D includes the method Embodiments C, wherein each the neural network structure is one of a convolutional neural network, a feed forward neural network, a neural Turing machine, Hopfield neural network, or a Boltzmann machine neural network. Embodiment E includes the method of any one of Embodiments A-D, wherein the setting is one of a temperate urban region, a desert rural region, a forested mountain region, and a coastal city. Embodiment F includes the method of any one of Embodiments A-E, wherein selecting one from the at least two sets of neural network coefficients further comprises matching the first data with the one or more characteristics of settings. Embodiment G includes the method of Embodiment F, wherein said matching further comprises: comparing the first data with the one or more characteristics of settings, wherein each of the one or more characteristics of settings is defined with a range of values; and identifying the selected one of the one or more characteristics of settings that the first data fall within the range of values. Embodiment H includes the method of Embodiment G, wherein the neural network coefficients matched with the selected one are generated by using training data set collected within the corresponding particular setting.

Embodiment I includes the method of any one Embodiments A-H, wherein the first data includes data from a Global Positioning System. Embodiment J includes the method of any one of embodiments A-I, wherein information relating to the at least two sets of neural network coefficients is stored in a standardized format to allow access by electronic devices manufactured by different manufacturers. Embodiment K includes the method of any one of Embodiments A-J, further comprising: storing a set of one or more input range values associated each of the at least two sets of neural network coefficients; comparing the first data with the one or more input range values associated with the selected one from the at least two sets of neural network coefficients; and selecting a new set among the at least two sets of neural network coefficients if the first data is outside the input range values. Embodiment L includes the method of any one of Embodiments A-K, further comprising: storing a set of one or more output range values associated each of the at least two sets of neural network coefficients; comparing the output with the one or more output range values associated with the selected one from the at least two sets of neural network coefficients; and selecting a new set among the at least two sets of neural network coefficients if the output is outside the output range values.

Another innovation, Embodiment M includes an apparatus for controlling a machine, comprising a database management system storing at least two sets of neural network coefficients being different from each other, at least one setting having one or more characteristics, and each of the at least two sets of neural network coefficients being associated with the at least one setting having one or more characteristics; and a controlling device that is coupled to receive first data from one or more input devices of the machine, arranged to select one from the at least two sets of neural network coefficients based on the first data and at one least one setting having one or more characteristics, and arranged to instantiate a neural network with the selected one from the at least two sets of neural network coefficients and to conduct a nodal operation at each node of the instantiated neural network, wherein the neural network is configured to generate an output being used to control an aspect of the machine.

Embodiment N includes the apparatus of Embodiment M, wherein each of said at least one setting having one or more characteristics is defined with a range of values. Embodiment O includes the apparatus of either Embodiment M or N, wherein the database management system further stores information relating to a neural network structure associated each of the at least two sets of neural network coefficients. Embodiment P includes the apparatus of Embodiment O, wherein the neural network structure is one of a convolutional neural network, a feed forward neural network, a neural Turing machine, Hopfield neural network, or a Boltzmann machine neural network. Embodiment Q includes the apparatus of any one of Embodiments M-P, wherein the at least one setting is one of environment, condition, or situation in which the machine operates. For various embodiments, the at least one setting can includes setting or two or more of environment, condition, or situation in which the machine operates. Embodiment R includes the apparatus of any one of Embodiments M-Q, wherein the database management system is configured to match the first data with one of at least one setting having one or more characteristics. Embodiment S includes the apparatus of Embodiment R, wherein the database management system is configured to compare the first data with the at least one setting having one or more characteristics defined with a range of values and to identify the selected one of the at least one set among one or more ranges of values that has the first data fall within its ranges of values. Embodiment T includes the apparatus of any one of Embodiments M-S, wherein the machine controlled is one of a robot, a vehicle, or a drone. Embodiment U includes the apparatus of any one of Embodiments M-T, wherein the information relating to the at least two sets of neural network coefficients is stored in a standardized format to allow access by electronic devices manufactured by different manufacturers. Embodiment V includes the apparatus of any one of Embodiments M-U, wherein the database management system further stores a set of one or more input range values associated each of the at least two sets of neural network coefficients and the instantiated neural network with the selected one from the at least two sets of neural network coefficients further configured to receive first data, and wherein the database management system further includes a trigger event detector arranged to compare the first data with the one or more input range values associated with the selected one from the at least two sets of neural network coefficients and to send a signal to the controlling device to select a new set among the at least two sets of neural network coefficients if the first data is outside the input range values. Embodiment W includes the apparatus of any one of Embodiments M-U, wherein the database management system further stores a set of one or more output range values associated each of the at least two sets of neural network coefficients, and further includes a trigger event detector arranged to compare the output with the one or more output range values associated with the selected one from the at least two sets of neural network coefficients and to send a signal to the controlling device to select a new set among the at least two sets of neural network coefficients if the output is outside the output range values.

Another innovation, Embodiment X includes an apparatus for controlling a machine, comprising a database management system stored with at least two sets of neural network coefficients being different from each other, at least one setting having one or more characteristics of a setting, and each of the at least two sets of neural network coefficients being associated with the at least one setting having one or more characteristics; and means for, coupled to receive first data from one or more input devices of the machine, selecting one from the at least two sets of neural network coefficients based on the first data and at one least one setting having one or more characteristics, instantiating a neural network with the selected one from the at least two sets of neural network coefficients and conducting an nodal operation at each node of the instantiated neural network, wherein the neural network is configured to generate an output being used to control an aspect of the machine. Embodiment Y includes the apparatus of Embodiment X, wherein each of at least one setting having one or more characteristics is defined with a range of values. Embodiment Z includes the apparatus of any of Embodiments X or Y, wherein the database management system is configured to further stores information relating to a neural network structure associated each of the at least two sets of neural network coefficients. Embodiment AA includes the apparatus of any one of Embodiments X-Z, wherein the neural network structure is one of a convolutional neural network, a feed forward neural network, a neural Turing machine, Hopfield neural network, or a Boltzmann machine neural network. Embodiment AB includes the apparatus of any one of Embodiments X-AA, wherein the database management system is further configured to match the first data with one of at least one setting having one or more characteristics. Embodiment AC includes the Embodiment of AB, wherein the database management system is configured to compare the first data with the at least one setting having one or more characteristics defined with a range of values and to identify the selected one of the at least one set among one or more ranges of values that has the first data fall within its range of values.

Example of Pseudo-Computer Program

The pseudo-computer program provided in the section below (at the end of this disclosure) is an example preferred implementation of the present invention. In particular, PISAController performs the following steps:

```
/* Main driver program for TOPController */
import java.lang.reflect.Constructor;
import java.lang.reflect.Method;
import java.util.*;
public class PISAController {
  public static void main(String[ ] args) {
    // Initialize the input NN, NN database
    String inputNNClassName = null;
```

```
        String inputNNDatabaseName = null;
        boolean hasDatabase = false;
        // Check the main arguments
        if (args.length > 2) {
            inputNNClassName = new String(args[1]);
            inputNNDatabaseName = new String(args[2]);
            hasDatabase = true;
        } else if (args.length > 1) {
            inputNNClassName = new String(args[1]);
            inputNNDatabaseName = new String("DDB.class");
        } else {
            System.out.println("PISA requires class name.");
            System.exit(-1);
        }
        try {
            // Initialize primary PISA NNs
            PISANN pisaNN = null;
            PISANNDatabase databaseNN = null;
            // Generate the PISA NN object from the ClassLoader
            PISAClassLoader pisaCL = new PISAClassLoader( );
            pisaNN = pisaCL.invoke(inputNNClassName,
"getNN");
            // Get default trained NN
            if (!(pisaNN.getNNtrained( ))) {
                System.out.println("PISA requires a trained network.");
                System.exit(-1);
            }
            // If PISAController configuration has a database,
            // create an instance of database and connect.
            // Generate PISANNDatabase object from the ClassLoader
            PISAClassLoader pisaCL = new PISAClassLoader( );
            databaseNN = pisaCL.invoke(inputNNDatabaseName,
                    "getDB");
            // Connect to the database using the default class name
            // which contains the name of the database connection.
            try {
                databaseNN.connectDB( );
            }
            catch (Exception e) {
                e.printStackTrace( );
                System.exit(-1);
            }
            // Initialize PISA input data
            PISAInputDataHandler inputData = new
                    PISAInputDataHandler(args[0]);
            // Check on the input data class
            if (inputData == null) {
                System.out.println("PISA requires an input data stream.");
                System.exit(-1);
            }
            // Check on size of input data stream.
            if (inputData.getInputSize( ) <= 0) {
                System.out.println("PISA requires an input data stream.");
                System.exit(-1);
            }
            double[ ] inputs = new double[inputData.getInputSize( )];
            // Initialize PISA output data
            PISAOutputDataHandler ouputData = new
                    PISAOuputDataHandler(args[0]);
            // Check on the output data class
            if (ouputData == null) {
                System.out.println("PISA requires an output data stream.");
                System.exit(-1);
            }
            // Check on size of input data stream.
            if (outputData.getOutputSize( ) <= 0) {
                System.out.println("PISA requires an output data stream.");
                System.exit(-1);
            }
            double[ ] outputs = new double[ouputData.getOuputSize( )];
            int cycleIndex = 0;
            // Initialize PISA settings change events
            PISAEvent pisaEvent = new
                    PISAEvent (args[0]);
            // Initialize output data
            double[ ] outputNN = null;
            // Continually loop over input data
            //    Output results to the outputData handler.
            //    until end of input data or
            //    until pisaEvent has changed
            //    if pisaEvent, then
            //        get new coefficients
            //        if new coefficients possible
            //            update the NN
            //        else
            //            terminate NN and exit
            //        continue
            while (cycleIndex >= 0) {
                // Get input data
                inputs = inputData.getInput(cycleIndex);
                try {
                    // Perform inference using pisaNN
                    outputs = pisaNN.inferenceNN(inputs);
                    // Perform setting check
                    if (pisaEvent.hasChanged( )) {
                        // Pull new coefficients based on the new event
                        // apply the coefficients to the NN
                        double[ ] coefficients;
                        try {
                            coefficients = databaseNN.getCoefficients(
                                    pisaEvent.getEvent( ),
                                    pisaEvent.getEventDetails( ));
                        }
                        catch (Exception e) {
                            //No coefficients found for event and
                            // settings change
                            e.printStackTrace( );
                            System.exit(-1);
                        }
                        try {
                            pisaNN.setCoefficients(coefficients);
                        }
                        catch (Exception e) {
                            // Coefficients are not a match for NN
                            // Or error applying coefficients to the NN
                            e.printStackTrace( );
                            System.exit(-1);
                        }
                    } else {
                        outputData.setOuput(outputNN);
                    }
                }
                catch (Exception e) {
                    e.printStackTrace( );
                }
                cycleIndex++;
                if (cycleIndex > inputData.getCycleMax( )) {
                    cycleIndex = 0;
                }
            }
        }
        // Catch all errors.
        catch (Exception e) {
            e.printStackTrace( );
            System.exit(-1);
        }
    }
}
```

What is claimed is:

1. A controller for an autonomous machine coupled to a plurality of sensors generating input data, the controller comprising:

a first neural network deployed on the autonomous machine, trained with a first training data set and configured to generate first output data after processing a set of input data;

a second neural network deployed on the autonomous machine, trained with a second training data set and configured to generate second output data after processing said set of input data, the first and second neural networks being executed simultaneously; and a comparator receiving and comparing the first output data and second output data, the comparator configured to detect a minimum difference between the first and second output data and produce a result, wherein the controller controls the autonomous machine using input that includes the first output data and the result of the comparator.

2. The controller of claim 1,
wherein
said controller further comprises: a counter for counting instances of the comparator detecting the minimum difference between the first and second output data, wherein the controller stops using the first output data to control the autonomous machine when the counter counts more than a predetermined number during a predetermined time period.

3. The controller of claim 2, wherein the first and second training data sets are identical to each other.

4. The controller of claim 2, wherein the predetermined number is one.

5. The controller of claim 2, wherein the predetermined time period is one millisecond.

6. The controller of claim 2, wherein the controller uses the second output data to control the autonomous machine when the counter counts more than the predetermined number during the predetermined time period.

7. The controller of claim 2, wherein the first and second output data are numerical values and the minimum difference is 0.1% of an average of the numerical values.

8. The controller of claim 1, wherein the autonomous machine is an autonomous land vehicle.

9. A method of controlling an autonomous machine coupled to a plurality of sensors generating input data, comprising the steps of:
    inferencing to generate first output data on a first neural network deployed on the autonomous machine and trained with a first training data set;
    inferencing to generate second output data on a second neural network deployed on the autonomous machine and trained with a second training data set, wherein the first output data and second output data are being generated simultaneously;
    detecting a minimum difference between the first output data and second output data and producing a result; and
    controlling the autonomous machine using input that includes the first output data and the result of the detecting step.

10. The method of claim 9, further comprising the steps of:
    counting the detection of the minimum difference between the first and second output data, wherein the controller stops using the first output data to control the autonomous machine when the counting steps results more than a predetermined number during a predetermined time period.

11. The controller of claim 10, wherein the first and second training data sets are identical to each other.

12. The controller of claim 10, wherein the predetermined number is one.

13. The controller of claim 10, wherein the predetermined time period is one millisecond.

14. The controller of claim 10, wherein the controlling step uses the second output data to control the autonomous machine when the counter counts more than the predetermined number during the predetermined time period.

15. The controller of claim 10, wherein the first and second output data are numerical values and the minimum difference is 0.1% of an average of the numerical values.

16. The controller of claim 9, wherein the autonomous machine is an autonomous land vehicle.

17. A controller for an autonomous machine coupled to a plurality of sensors generating input data, the controller comprising:
    a first neural network deployed on the autonomous machine, trained with a first training data set and configured to generate first output data after processing a set of input data;
    a second neural network deployed on the autonomous machine, trained with a second training data set and configured to generate second output data after processing said set of input data, wherein the first and second neural networks being executed simultaneously; and
    a comparing means for comparing the first output data and second output data, the comparing means configured to detect a minimum difference between the first and second output data and produce a result, wherein the controller controls the autonomous machine using input that includes the first output data and the result of the comparator.

18. The controller of claim 17, wherein
said controller further comprises a counting means for counting instances of the comparator detecting the minimum difference between the first and second output data, wherein the controller stops using the first output data to control the autonomous machine when the counter counts more than a predetermined number during a predetermined time period.

19. The controller of claim 18, wherein the first and second training data sets are identical to each other, and wherein the predetermined number is at least one.

20. The controller of claim 18, wherein the predetermined time period is at least one millisecond, and wherein the first and second output data are numerical values and the minimum difference is 0.1% of an average of the numerical values.

* * * * *